US012723380B2

(12) United States Patent
Senanayake

(10) Patent No.: US 12,723,380 B2
(45) Date of Patent: Sep. 1, 2026

(54) PROTECTION SYSTEMS

(71) Applicant: 2MT MINING PRODUCTS PTY LTD, Queensland (AU)

(72) Inventor: Mahinda Palitha Senanayake, Queensland (AU)

(73) Assignee: 2MT MINING PRODUCTS PTY LTD, Queensland (AU)

( * ) Notice: Subject to any disclaimer, the term of this patent is extended or adjusted under 35 U.S.C. 154(b) by 100 days.

(21) Appl. No.: 18/115,139

(22) Filed: Feb. 28, 2023

(65) Prior Publication Data

US 2023/0220654 A1 Jul. 13, 2023

Related U.S. Application Data

(63) Continuation of application No. 17/629,556, filed as application No. PCT/AU2020/050722 on Jul. 13, 2020.

(30) Foreign Application Priority Data

Jul. 24, 2019 (AU) ................................ 2019902616
Apr. 8, 2022 (AU) ................................ 2022202367

(51) Int. Cl.
*E02F 9/28* (2006.01)
*E02F 9/26* (2006.01)

(52) U.S. Cl.
CPC .............. *E02F 9/2883* (2013.01); *E02F 9/26* (2013.01); *B65G 2207/48* (2013.01); *E02F 9/2816* (2013.01); *E02F 9/2891* (2013.01)

(58) Field of Classification Search
CPC ......... E02F 9/28; E02F 9/2883; E02F 9/2858; E02F 9/2833; E02F 9/2808; E02F 9/285; E02F 3/815; E02F 3/8152
See application file for complete search history.

(56) References Cited

U.S. PATENT DOCUMENTS 1,220,186 A * 3/1917 Chambers ............. E02F 9/2825
37/454
1,944,307 A * 1/1934 Spoon .................. E02F 3/8152
172/764

(Continued)

FOREIGN PATENT DOCUMENTS

WO 2011127536 A1 10/2011
WO 2011156834 A1 12/2011

(Continued)

OTHER PUBLICATIONS

International Search Report and Written Opinion Received for the PCT Application No. PCT/AU2020/050722, mailed on Sep. 23, 2020, 17 pages.

(Continued)

*Primary Examiner* — Christopher J Sebesta
*Assistant Examiner* — Audrey L Lusk
(74) *Attorney, Agent, or Firm* — Amster, Rothstein & Ebenstein LLP

(57) ABSTRACT

A protection system includes a mount for attachment to a wear panel of equipment. The mount includes a first portion which engages the wear panel to be protected and a second portion extending from the first portion which engages an adjacent face to be protected. The second portion has a passage which allows sliding movement of a bolt along the passage. A wear part is releasably mounted to the mount and has a first portion that slidingly engages the first portion of the mount and a second portion that engages the second portion of the mount. The second portion of the wear part has a passage arranged to align with the passage through the second portion of the mount when the wear part and the mount are engaged. A bolt extends through the aligned passages to secure the wear part to the mount via a locking member.

18 Claims, 45 Drawing Sheets

(56) References Cited

U.S. PATENT DOCUMENTS

| | | | | | |
|---|---|---|---|---|---|
| 3,736,664 | A * | 6/1973 | Black | E02F 9/2883 | 37/446 |
| 4,398,607 | A * | 8/1983 | Reichardt | B65G 33/265 | 403/349 |
| 5,055,336 | A * | 10/1991 | Davis | B65G 11/166 | 428/167 |
| 5,063,695 | A * | 11/1991 | Briscoe | E02F 9/28 | 403/381 |
| 5,241,765 | A * | 9/1993 | Jones | E02F 9/2883 | 172/772 |
| 5,433,033 | A * | 7/1995 | Rickards | E02F 9/2816 | 175/391 |
| 5,564,508 | A * | 10/1996 | Renski | E02F 9/2883 | 37/456 |
| 5,913,605 | A * | 6/1999 | Jusselin | E02F 9/28 | 403/380 |
| 6,041,529 | A * | 3/2000 | Ruvang | E02F 9/2833 | 172/772 |
| 7,770,310 | B2 * | 8/2010 | Keech | E02F 3/8155 | 37/455 |
| 8,561,326 | B2 | 10/2013 | Ruvang | | |
| 9,499,958 | B2 * | 11/2016 | Serrurier | E02F 9/2841 | |
| 10,428,494 | B1 * | 10/2019 | Lombardo | E02F 9/2883 | |
| 11,220,806 | B2 * | 1/2022 | Lombardo | E02F 9/2883 | |
| 2005/0229442 | A1 * | 10/2005 | Jones | E02F 9/2883 | 37/452 |
| 2014/0173949 | A1 * | 6/2014 | Karlsson | E02F 9/2833 | 37/455 |

FOREIGN PATENT DOCUMENTS

| | | | |
|---|---|---|---|
| WO | 2015054741 | A1 | 4/2015 |
| WO | 2015105798 | A1 | 7/2015 |
| WO | 2018157189 | A1 | 9/2018 |

OTHER PUBLICATIONS

IPRP and Written Opinion for the Application No. PCT/AU2020/050722, issued on Jan. 25, 2022, 9 pages.

* cited by examiner

SECTION A-A

SECTION B-B

SECTION C-C

SECTION D-D

SECTION C-C

SECTION B-B

SECTION D-D

SECTION E-E

PROTECTION SYSTEMS

CROSS-REFERENCE TO RELATED APPLICATIONS

This patent application is a Continuation-in-Part of U.S. patent application Ser. No. 17/629,556, filed Jan. 24, 2022, which claims priority to International Application No. PCT/AU2020/050722, filed on Jul. 13, 2020, which claims priority to Australian application no. 2019902616, filed Jul. 24, 2019, the contents of which are incorporated herein by reference in their entireties. This patent application also claims priority under 35 U.S.C. § 119(a) to Australian application no. 2022202367, filed Apr. 8, 2022, the content of which is incorporated herein by reference in its entirety.

FIELD OF INVENTION

This invention relates to protection systems for earthmoving, mining, conveying, crushing, and processing equipment and the like. In particular, the invention relates to protection systems for protecting faces of machinery which would otherwise be contacted by abrasive material moving relative thereto.

DESCRIPTION OF PRIOR ART

Such faces include the inside faces of conveyor chutes, the faces of face shovel buckets and excavator buckets and dragline buckets especially the outside bottom faces and the outside corners where the sidewalls join the bottom wall (or floor) of the bucket (sometimes referred to as "heel shrouds"), the upper face of haul truck beds, and various faces of many other types of machinery which would otherwise be subject to abrasive wear or wear by other component contact.

Some known face protection systems typically incorporate two main components, the first component being a mount which rests on the face of the item to be protected and is retained by welding it onto the item to be protected and the second being a wear plate, wear pad (or runner), heel shroud or the like which is removably mounted, secured, or locked to the mount.

For example, in the case of a face shovel, the bottom face of the shovel bucket normally engages the work face from which overburden, coal, iron ore or some other material is being taken (referred to generally herein as spoil) and consequently needs to be protected from abrasive wear.

A typical protection system includes a plurality of adjacent wear plates, wear pads or wear parts which are removably mounted on a corresponding plurality of mounts which are welded to the outer face of the bottom wall of the bucket or whichever panel is subject to wear, the wear pads thereby effectively covering or almost covering the entire bottom face of the bucket or wear face of the panel.

In the case of the corners of an excavator bucket where the side walls meet the bottom of the bucket (or the floor) the wear parts typically cover or shroud an edge portion of the floor and an edge portion of the side wall. The wear part or shroud typically includes two portions substantially at right angles to each other which are arranged so that one portion covers the edge portion of the floor and the other portion covers the edge portion of the side wall or rear wall as the case may be. In cases where the side walls are not at right angles to the floor but perhaps diverge away from the floor, the heel shrouds would likewise have diverging portions to accommodate such a different inclination.

When the wear pads wear to a predetermined extent, the wear pads are removed from the mounts and replaced by new wear pads on the same mounts. Eventually the mounts also become too worn and then must be removed and replaced by new mounts.

In this specification, the term "wear panel" is intended to encompass panels of equipment or machinery such as side walls and bottom walls (or floors) of face shovels, excavator buckets, dragline buckets, walls of conveyor chutes and similar panels unless the context clearly requires a different meaning. The term may also extend to other components such as rigging components which might be subject to abrasive wear.

One of the difficulties faced by protection systems is that wear pads and other types of wear parts can loosen on their respective mounts which results in an increased wear rate of both the wear parts and their respective mounts. Such loosening can be the result of wear between the wear part and the mount or loosening of the locking or securing mechanism due to abrasive wear of the locking mechanism itself or in the case of buckets, continual changing of movement of the bucket in various directions such as changing from the forward direction to the backward direction and vice versa and also because of side forces on a bucket in cases where it is being slewed. Various attempts have been made to overcome or ameliorate problems associated with protection systems, but problems still remain.

The present invention is aimed at providing a protection system which is relatively simple and effective.

SUMMARY

In this specification, unless the context clearly requires a different meaning, the term forward and its derivatives are to be understood as being in the direction of movement of the bucket, blade or other working part when digging, filling or transferring spoil. Terms such as upper, lower, side, front, rear, and the like are to be understood in the context of the bucket, blade or other working part so that the leading-edge of the bucket is the edge of the bucket at the front where spoil enters the bucket or the leading edge of the blade where contact is initially made with the spoil. In the case of a working part such as a chute, the entry point of the spoil would be the leading edged or end although terms like entry point or exit may be used.

With the foregoing in view, the invention resides broadly in a protection system including: a mount adapted to be fixed to a wear panel of equipment or machinery, said mount having a lower face adapted to rest against a face of the wear panel to be protected and an upper face spaced from said lower face; a wear pad or part adapted to be releasably mounted on or to said mount; a locking member adapted to lock said wear pad or part to said mount; said mount and said wear pad or part having complementary engagement means adapted to allow relative sliding movement between said mount and said wear pad or part from a release position in which said wear pad or part can be pushed onto or pulled off said mount to an engaged position in which said wear pad or part cannot be pulled from said mount; said mount and said wear pad or part each having an opening or recess therein adapted to receive said locking member at least partially therein, said recess and said opening being arranged to at least partially align when said mount and said wear pad or part are in the engaged position such that said locking member extends from said opening or recess in said wear pad or part into said recess or opening in said mount so as to prevent sliding movement of said wear pad or part relative to said mount towards the release position; said mount further having at least one passage extending from said lower face into said opening or recess and adapted to receive therein a bolt; said locking member also including at least one passage, said at least one passage being aligned with said at least one passage in said mount, whereby a bolt extending through said at least one passage in said mount may also extend through said locking member; and one or more bolts extending through said at least one passage in said mount and said at least one passage in said locking member to secure said locking member to said mount.

In another aspect, the invention resides broadly in a mount for a protection system, said mount including: a first portion having a lower face adapted to rest against a face of the wear panel to be protected and an upper face spaced from said lower face; one or more protuberances extending from said first portion on opposite sides thereof, each of said protuberances having a face which tapers upwards or outwards or upwards and outwards from said lower face towards one end of said first portion and terminates at said upper face; said first portion having an opening or recess therein and at least one passage extending from said lower face into said opening or recess, said at least one passage having a relatively narrow end portion and a larger portion contiguous with said narrow end portion, said narrow end portion being selected to slidably receive the shank of a bolt (or the locking portion of a bolt head) for lateral movement thereof relative to the first portion and the larger portion being selected to axially receive the head of the bolt, whereby a bolt may be fitted to the mount from above by pushing the head through the larger portion and then sliding the bolt laterally into the end portion where the head of the bolt may then engage the lower face of the first portion adjacent the passage.

In yet another aspect, the invention resides broadly in a wear pad or part for a protection system, the wear pad or part including: a wear portion having an upper face adapted to bear against ore or spoil to be moved and a lower face spaced from said upper face and adapted to rest on or adjacent a mount secured to a wear panel to be protected, said wear portion having at least one passage extending therethrough from said upper face to said lower face, the upper face being defined at least in part by an outer portion extending substantially about said passage; and two spaced apart side portions extending or depending from said wear portion on opposite sides thereof to define a space therebetween and one or more protuberances extending from each of said side portions towards the opposite side portion and spaced from said lower face, each of said protuberances having a face which tapers upwards or inwards or upwards and inwards towards said lower face and extending towards one end of said wear portion, said one or more protuberances being spaced laterally away from said at least one passage.

Preferably, the upper face of the wear pad or part is defined at least in part by a perimeter portion and a channel or valley portion between said perimeter portion and said at least one passage and extending substantially about said passage, said channel or valley portion being shaped and sized to achieve a predetermined wear pattern.

Preferably said wear pad or part includes wear indication means for indicating when the wear pads or parts have worn to a predetermined state so that they can be replaced by new wear pads or parts at an appropriate time. In a preferred form, the indication means are provided by blind passages extending from the lower face of the perimeter portion towards the upper face of the perimeter portion. It will be appreciated that as the perimeter portion of the wear portion wears, the upper face will become closer and closer and closer and eventually the blind passages will open to the upper face and be visible thereby indicating it is time to replace the pads or parts.

Preferably, said at least one passage extending from said lower face into said opening or recess includes a portion adapted to receive therein the head of the bolt, the depth of such portion being selected so that the head of the bolt does not protrude beyond the lower face of the mount. It is also preferred that the bolts selected are plow bolts and that the shape and size of the head portion of the recess be shaped to suit the size and shape of the head portion of the plow bolt.

It is also preferred that said at least one passage in said mount is a single passage having relatively narrow end portions and a larger intermediate portion, the narrow end portions being selected to slidably receive the shank of the bolt (or the locking portion of the bolt head) for lateral movement and the intermediate portion being selected to axially receive the head of the bolt, whereby a bolt may be fitted to the mount from above by pushing the head through the intermediate portion and then sliding the bolt laterally towards either end portion where the head then engages the lower face of the mount adjacent the passage. It will be appreciated that in such form, each of the narrow end portions can accommodate a bolt each of which can be fitted through the intermediate portion and in such case, said at least one passage in said locking member can be two passages or a single long slot.

In a preferred form, the width of the narrow end portions is selected to engage with the square locking portion of the bolt or bolt head to prevent the bolt turning relative to the passage as is well known in the use of plow bolts. It is also preferred that the depth of the head portion of the recess be such as to ensure that the locking portion of the bolt head is retained in the narrow end portion so that a suitable nut can be screwed onto the bolt without the bolt turning. In a preferred form the nuts selected are security lock nuts.

Preferably the mount has one or more openings extending therethrough to provide suitable locations for welding the mount to the panel to be protected. In such form, it is preferred that at least two openings extending laterally across the mount be provided, one being near one end of the mount and the other near the opposite end. Advantageously, positioning of the openings in such manner allows lateral welds to be made near to each end so that the mount is less likely to peel from the underlying panel by any load is applied to the wear pad or part secured to the mount.

Preferably, the at least one passage or passages in said locking member includes a portion adapted to receive therein the nut of the bolt or bolts as the case may be, such portion being sufficient to accommodate a suitable spanner or socket for tightening or loosening the nut as the case requires.

Preferably the locking member has recesses in each end and/or each side for engagement by a removal tool such as a lever or a lifting hook. Alternatively, the locking member may have a threaded jacking passage therein by which a jacking bolt may be screwed into the locking member so as to bear against the mount or the wear panel below to which the mount is secured such that the locking member can be jacked out by screwing in a suitable jacking bolt.

Preferably, said complementary engagement means include a tapered portion or portions and a complementary tapered recess or recesses, the tapers being arranged to force the wear pad or part towards the panel being protected, that is, into closer face to face engagement with the mount towards a transition or interference fit as the wear pad or part is slid from the release position into the engaged position. It is also preferred that the complementary engagement means include tapered portions arranged to tighten the wear pad or part onto the mount against lateral movement or twisting or pivoting movement as the wear pad or part is slid from the release position to the engaged position. In a more preferred form, the complementary engagement means incorporates a tapered portion or portions and complementary recesses which achieve both desired functions.

Preferably said mount includes at least two protuberances extending from each side of said first portion, said protuberances on each side being spaced apart in a direction from end to end. In a more preferred form, the mount includes three protuberances extending from each side of said first portion and preferably the protuberances are arranged in pairs, one protuberance of each pair being directly opposite its corresponding protuberances on the other side.

In another aspect, the invention resides broadly in a protection system including: a mount adapted to be fixed to a wear panel of equipment or machinery, said mount including a first portion having a face adapted to rest against or engage a face of the wear panel to be protected and a second portion extending from said first portion and adapted to engage an adjacent face to be protected, said second portion having at least one passage therethrough configured to allow entry of a bolt and sliding movement of the bolt therealong to a predetermined position along said passage; a wear part adapted to be releasably mounted to said mount, said wear part having a first portion adapted to slidingly engage said first portion of said mount and a second portion adapted to engage said second portion of said mount, said second portion of said wear part having one or more passages or recesses therein and arranged to at least partially align with respective ones of said one or more passages through said second portion of said mount when said wear part and said mount are in the engaged position; and one or more bolts adapted to extend through said at least one passage respectively in said mount and said at least one passage in said second portion of said wear part to secure said wear part to said mount.

In another aspect, the invention resides broadly in a mount for a protection system, said mount including: a first portion having a face adapted to rest against or engage a face of the wear panel to be protected and a second portion extending from said first portion and adapted to engage an adjacent face inclined to the face to be protected, said second portion having at least one passage therethrough and adapted to receive a bolt therein, the at least one passage being configured to allow entry of at least one bolt and subsequent sliding movement of the at least one bolt therealong to a selected predetermined position along said passage; and whereby one more bolts may enter one or more of the at least one passage and slide along the passage to a selected predetermined position.

In another aspect, the invention resides broadly in a wear part for a protection system, the wear part including: a first wear portion and a second wear portion extending from said first wear portion, said first wear portion having a mounting face adapted to engage a first face of a mount secured to a wear panel to be protected, and said second wear portion including a mounting face inclined to the mounting face of said first wear portion and adapted to engage a second face of said mount inclined to said first face of said mount; said first wear portion having two spaced apart side portions defining a space therebetween and one or more protuberances extending from each of said side portions towards the opposite side portion and spaced from said mounting face, said protuberances being adapted to engage complementary protuberances or recesses of the mount to which the wear part is to be fixed and configured such that the wear part can slide onto said mount from a disengaged position to an engaged position to locate the wear part on the mount; and said second wear portion having one or more passages extending therethrough, the one or more passages being adapted to receive respective bolts for locking the wear part to the mount.

Preferably, said first portion of said mount includes one or more protuberances adapted to slidably engage complementary protuberances of a wear part.

Preferably, said second wear portion includes a recess adapted to receive therein at least part of the second portion of the mount to which the wear part is to be fixed when in the engaged position.

In another aspect, the invention resides broadly in a mount including a first portion with a first face and a second face spaced from said first face and an elongate passage extending through said first portion from said first face to said second face, said elongate passage being configured to slidingly receive a preselected bolt therein, the preselected bolt having a shank and a head, and at least one of said first and second faces being configured to engage the head of the selected bolt, said elongate passage being configured to allow entry of the preselected bolt and sliding movement of the bolt therealong to a preselected position along the passage.

In yet another aspect, the invention resides broadly in a mounting system including a mount and a bolt, the mount having a portion with a first face and a second face spaced from said first face and an elongate passage extending through said portion from said first face to said second face; said bolt having a head and a shank, said elongate passage being configured to allow entry of the bolt to said elongate passage and sliding movement therealong to a predetermined position along the passage; and one of said first and second faces being configured to engage the head of the bolt to prevent the head of said bolt passing through said elongate passage and said passage being configured to prevent rotation of said bolt about its longitudinal axis when in the predetermined position.

Preferably, in the mounting system described earlier one of said first and second faces is configured to engage the head of said bolt to prevent the head passing through said elongate passage and at least one of said faces and/or said passage is configured to prevent rotation of the bolt about its longitudinal axis at least when the bolt is in the predetermined position.

In still yet another aspect, the invention resides broadly in a method of fixing a wear part to a mount including: providing a mount, a bolt and nut, and a wear part; said mount having a portion with a first face and a second face spaced from said first face and an elongate passage extending through said portion from said first face to said second face; said bolt having a head and a shank extending from said head and said wear part having a hole therein adapted to receive the shank of said bolt; said wear part having a first face adapted to engage the first face of said mount and a second face adapted to bear against ore or spoil and a bolt hole or recess extending from said first face to said second face and adapted to receive the shank of the bolt therethrough; said elongate passage opening at one end to allow entry of the shank of said bolt to said elongate passage and being configured to allow sliding movement of said shank therealong in a substantially perpendicular orientation relative to said elongate passage; and sliding said bolt along said elongate passage to a predetermined position, fitting said wear part to said mount with the shank of said bolt extending through said bolt hole in said wear part and screwing a nut onto the shank of said bolt to secure the wear part to the mount.

In yet another aspect, the invention resides broadly in a spacer adapted to be fitted to a slot to retain a plow bolt in a predetermined position in the slot, the plow bolt having a head with a conical face and a plurality of flat faces and a shank extending from the head, the spacer having two spaced apart side faces and one or more end faces, at least one of said one or more end faces being shaped to engage with a flat face and a portion of the conical face of the bolt head.

Preferably, the at least one of the one or more end faces is shaped to also engage with a portion of the shank of the bolt.

Preferably, the spacer also includes an outer face adapted to be engaged by a machine component such as a wear part.

In yet another aspect, the invention resides broadly in a device for fitting a heel shroud to earthmoving machinery, for example, an excavator bucket, the device including: attachment means for releasably attaching a wear part such as a heel shroud thereto; and connecting means for connecting lifting means thereto, for example, a chain or cable for lifting the device with a wear part such as a heel shroud attached thereto in any one of a plurality of desired orientations about a horizontal axis.

In order that the invention may be more readily understood and put into practical effect, reference will now we need to the accompanying drawings wherein:

BRIEF DESCRIPTION OF THE DRAWINGS

FIG. 14*g* is a sectional view of part of the heel shroud of FIG. 14*a* along line D-D;

DETAILED DESCRIPTION OF THE EMBODIMENTS

Figure 1:
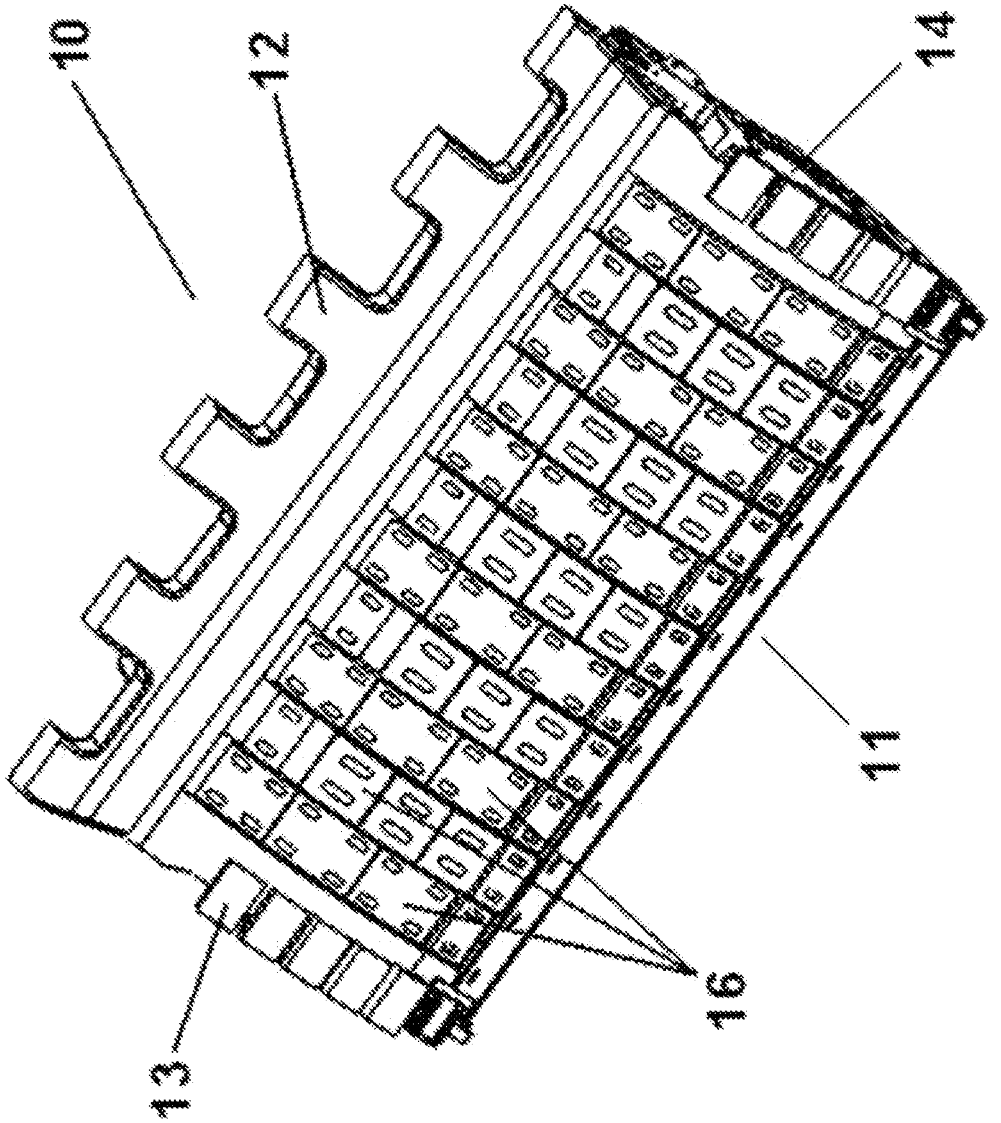
FIG. 1 is a pictorial representation of the bottom of a face shovel bucket with prior art wear pads welded to the outer face of the bottom of the bucket.

The prior art face shovel bucket 01 illustrated in FIG. 1 has a bottom panel 11 which extends rearward from a front cutting lip 12 and is contiguous with a rear wall (not shown), and two spaced apart opposing side walls 13 and 14. An array of wear pads 16 arranged in rows and columns are welded to the outer face of the bottom panel 11 to form an almost continuous external liner which can be removed and replaced. However, in order to remove the wear pads, the weld material has to be removed by gouging or grinding or similar operation which can be time-consuming and costly.

Figure 2:
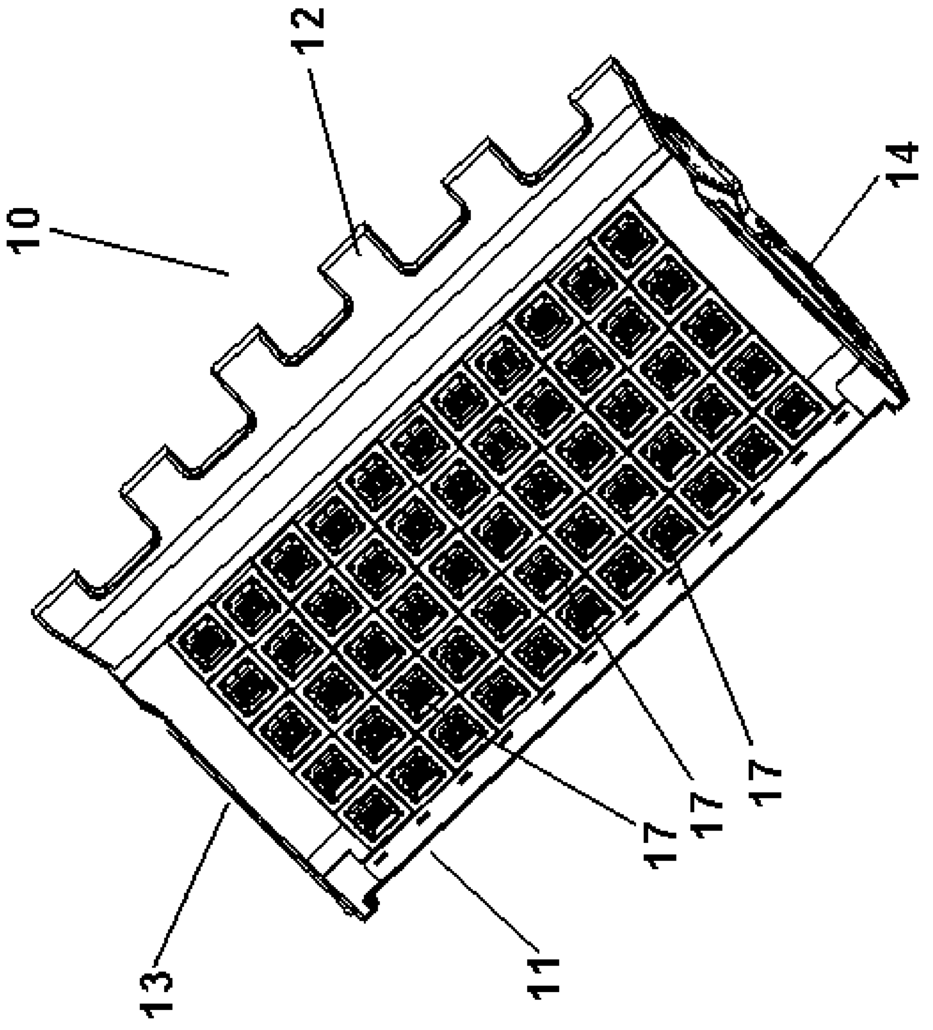
FIG. 2 is a pictorial representation of the bottom of a face shovel bucket with wear pads according to the present invention secured to the outer face of the bottom of the bucket.

The face shovel bucket 10 illustrated in FIG. 2 is the same as the face shovel bucket 01 illustrated in FIG. 1 except that it has been fitted with wear mounts and wear pads according to the present invention instead of the prior art wear pads as will be described in more detail later.

The wear mount 20 illustrated in FIGS. 3*a* to 3*f* is manufactured in one piece of cast steel and has a first portion (or mid portion) 21 of generally rectangular form with a leading end 22, an opposite trailing end 23, and two spaced apart opposite sides 24 and 25. Opposed pairs of protuberances 26 and 27, 28 and 29, and 30 and 31 extend outwardly from the sides 24 and 25 respectively, the protuberances being shaped to engage with complementary recesses provided in a wear pad as will be described later.

Figure 3B:
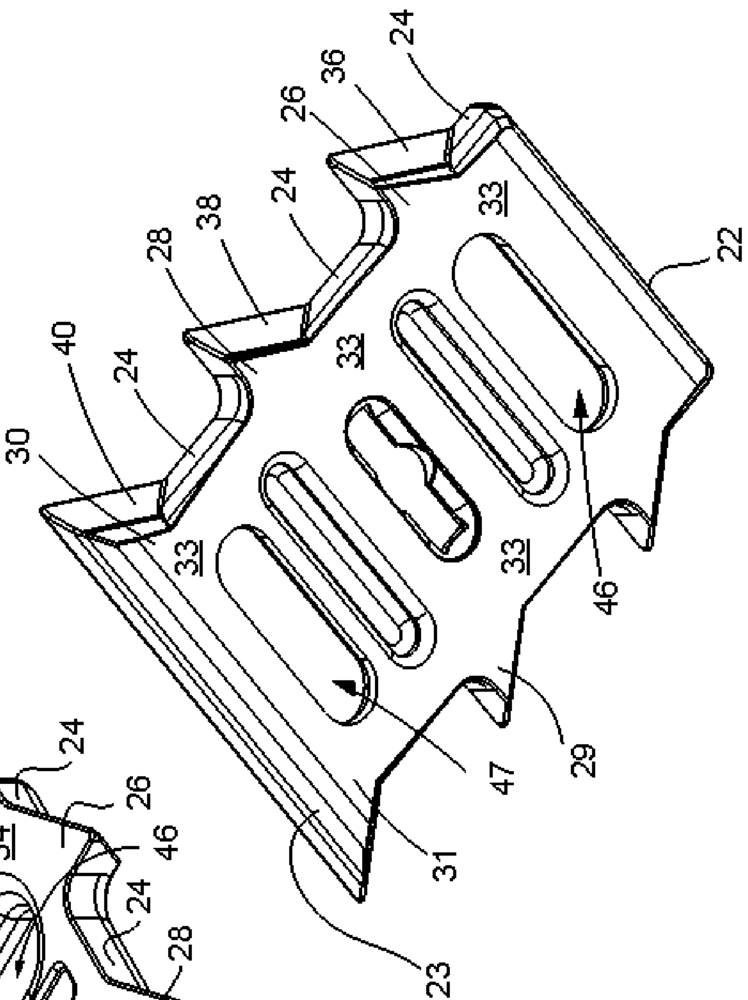
FIG. 3*b* is a pictorial representation of the weld on mount of FIG. 3*a* from the inner face.
Figure 3A:
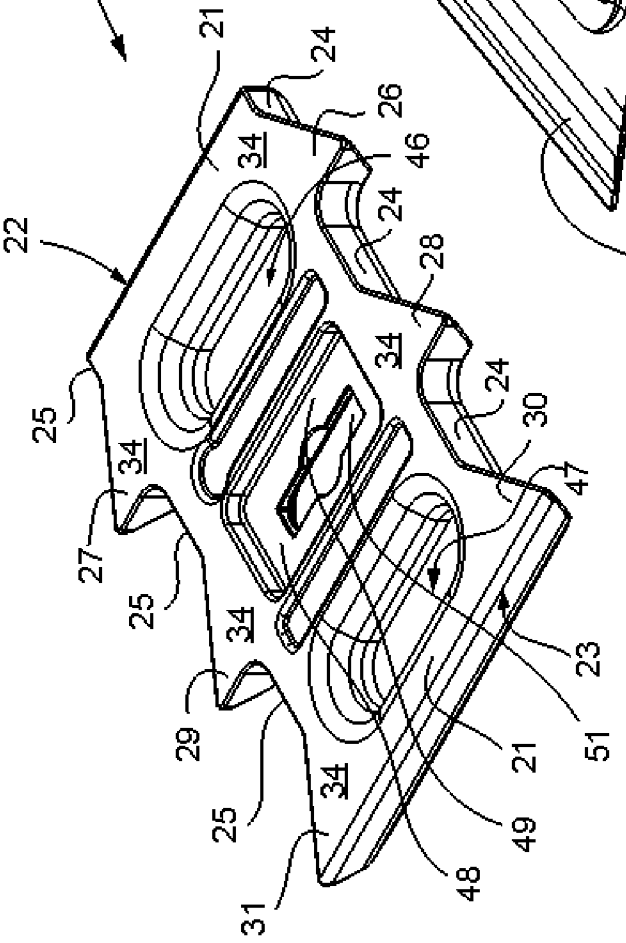
FIG. 3*a* is a pictorial representation of a weld on mount according to the present invention from the outer face and tailing end.
Figure 3D:
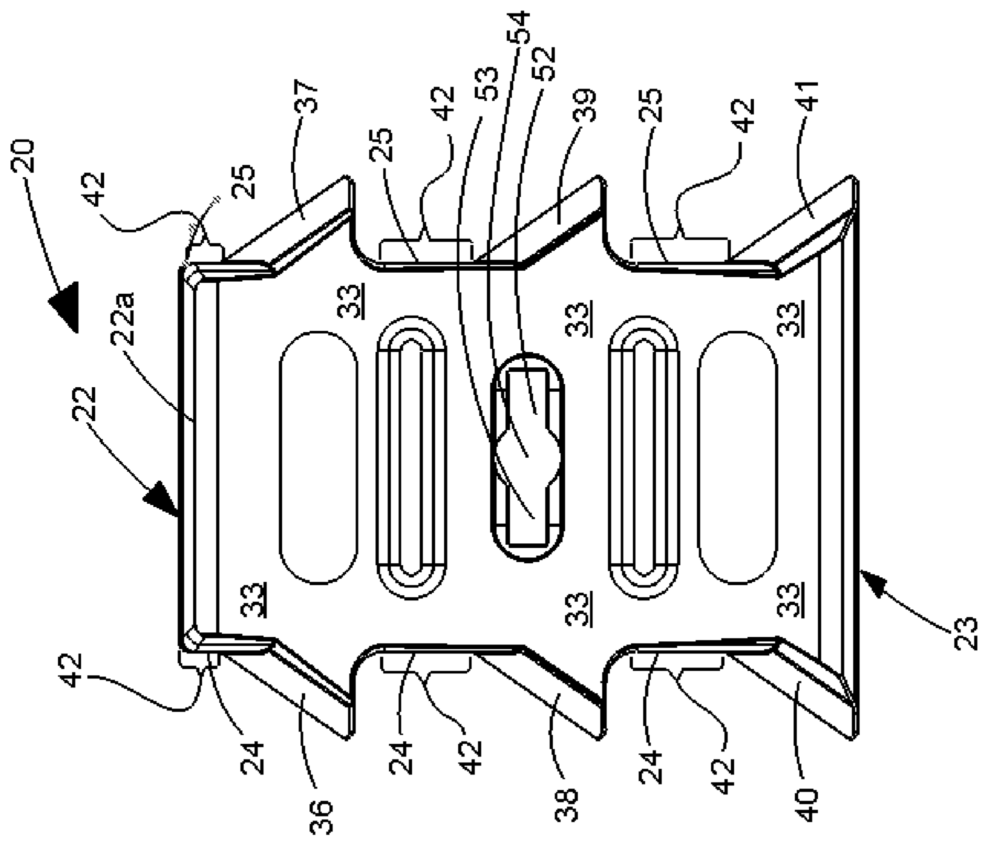
FIG. 3*d* is an inner face plan view of the weld on mount of FIG. 3*a;*
Figure 3C:
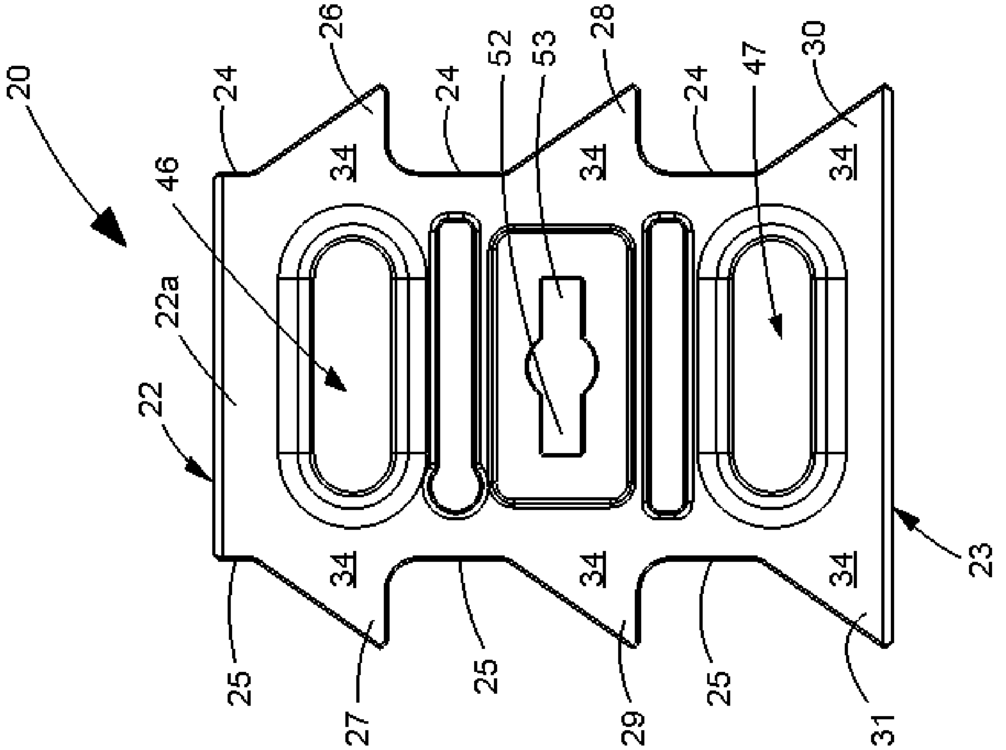
FIG. 3*c* is an outer face plan view of the weld on mount of FIG. 3*a;*
Figure 3F:
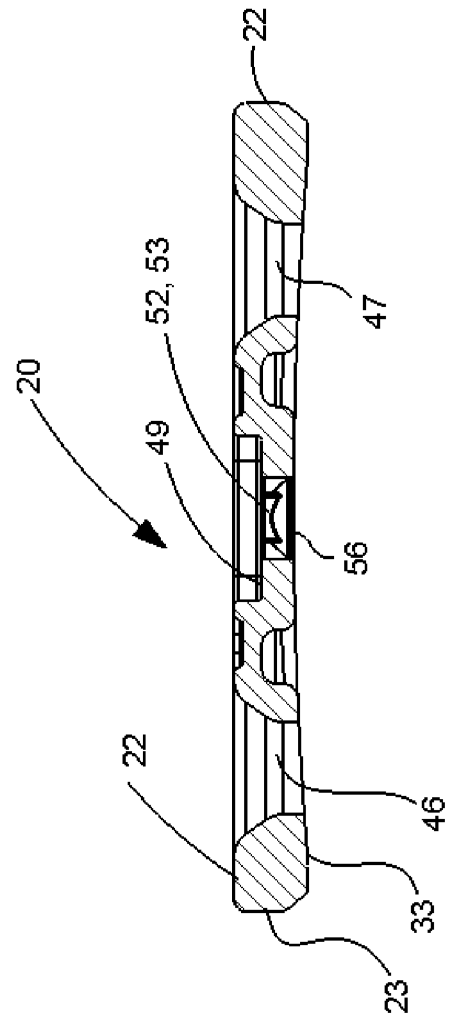
FIG. 3*f* is a cross-sectional side view of the weld on mount of FIG. 3*a* from one side along line A-A.
Figure 3E:
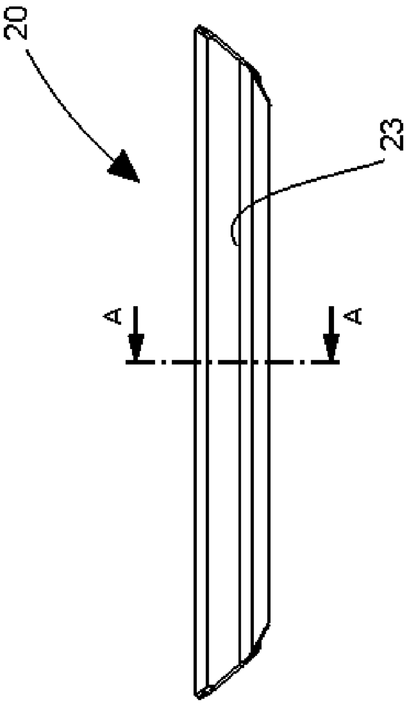
FIG. 3*e* is an end view of the weld on mount of FIG. 3*a* from the trailing end.

Suitably, the mount has a slightly curved lower face (or inner face) 33 as can be seen in FIG. 3*f* which is adapted to rest on the curved wear face of the panel to which the mounts are to be secured by welding, the lower face of the protuberances being contiguous to some extent with the lower face of the mid-portion.

The mount has a generally planar upper face (or outer face) 34 spaced from the lower face 33 and generally parallel thereto although not curved. However, in other embodiments, the upper face 34 could also be curved in much the same manner about the same axis but at a greater radius. In other embodiments the lower face 33 may be planar to suit a planar flat panel to be protected, for example, the bottom panel of a dragline bucket. In such case, the upper face 34 may also be planar. In some cases, the thickness of the mount may vary from end to end to achieve a flat or curved wear face as desired.

The leading end 22 extends fully across the width of the mid-portion 21 while the trailing end 23 extends fully across the width of the mid portion and across the width of the protuberances 30 and 31 such that the protuberances 30 and 31 together with the midportion define the trailing end while only the mid portion defines the leading end.

Advantageously, the leading faces 36 to 41 of the protuberances 26 to 31 taper rearwards away from the leading end 22 and outwards from the mid-portion 21 at about 55 degrees which allows three protuberances to fit along each side. The leading faces 36 to 41 also taper upwards from the lower face to the upper face at a true angle of about 55 degrees.

Advantageously, the spacing 42 between the adjacent protuberances, for example between protuberances 26 and 28 or 28 and 30 is selected to accommodate corresponding protuberances provided on the wear pads so that the wear pad can be pushed onto the mount and then slid into the locking position as will be described in more detail later.

Two passages 46 and 47 (the welding passages), one adjacent the leading end and one adjacent the trailing end extend through the first portion (or mid portion) and almost fully across the mid-portion, the passages being of sufficient width in the leading end towards trailing end direction to allow a MIG welding nozzle to fully weld the mount to the panel to which it is to be affixed by way of a fillet weld all around the internal perimeter of those two passages 46, 47.

A recess 48 is provided in the mount between the two welding passages, the recess being generally rectangular in shape and adapted to receive partially therein a locking member or locking block of generally rectangular prism form as will be described in more detail later. The recess 48 has a floor 49 which the locking member is intended to engage and an elongate passage 51 extends through the mid portion of from the floor 49 to the inner face 33. The elongate passage has two opposed narrow end portions 52 and 53 contiguous with a larger centre portion 54. Advantageously, the centre portion is generally circular in cross section and adapted to receive therethrough from the upper face of the midportion, the head of a plow bolt. Suitably, the narrow end portions are rectangular in cross section and sized to allow the square shank portion of the selected plow bolts to slide therein to their desired positions at the respective ends of the narrow and portions 52 and 53 without rotating about the bolt axis. As can be seen in FIG. 3*f*, recesses 56 are provided in the mid-portion to accommodate the heads of the plow bolts therein, the recesses being shaped to prevent the plow bolts from rotating relative to the mount.

The wear plate 60 illustrated in FIGS. 4*a* to 4*g* is manufactured in one piece of cast steel and is generally of square form. The wear plate has a first portion (or wear portion) 61 of generally rectangular form with a leading end 62, an opposite trailing end 63, and two spaced apart opposite side portions 64 and 65 depending from the wear portion 61.

The wear portion 61 has an upper face 66 adapted to bear against ore or spoil to be moved and a lower face 67 spaced from said upper face between the side portions 64 and 65 and adapted to rest on or adjacent the mount 20 when the mount is secured to a wear panel to be protected.

Opposed pairs of protuberances 68 and 69, 70 and 71, and 72 and 73 extend inwardly from the side portions 64 and 65 respectively, the protuberances being shaped to engage with complementary protuberances 26 to 31 provided on the mount 20. In that respect, it will be appreciated that the protuberances 68 to 73 of the wear plates have respective inner faces 68*a* to 73*a* which are arranged to fit within the respective spaces 42 of the mount 20.

Suitably, the lower face (or inner face) 67 is generally planar to match upper face (or outer face) 34 of the mount. However, in cases where the mount has a curved upper face, the inner face of the wear plate can have a corresponding curve.

Advantageously, the leading faces 78 to 83 of the protuberances 68 to 73 taper rearwards away from the leading end 22 and outwards away from the opposite side at about the same angle as the corresponding protuberances of the mount. The leading faces 78 to 83 also taper downwards away from the inner or lower face 67 towards the opposite side at a true angle of about 45 degrees.

A passage 86 is provided in the wear pad, more or less centrally located, the passage corresponding in shape to the recess 48 in the mount 20 and being generally rectangular in cross section parallel to the inner face 67. The passage is shaped and sized to receive therein the same locking member or locking block of generally rectangular prism form mentioned earlier. Two opposite further recesses 87 extend into the wear portion 61 from passage 87 for receiving therein a lifting tool for removing the wear pad from the mount when replacement is required.

Figure 4A:
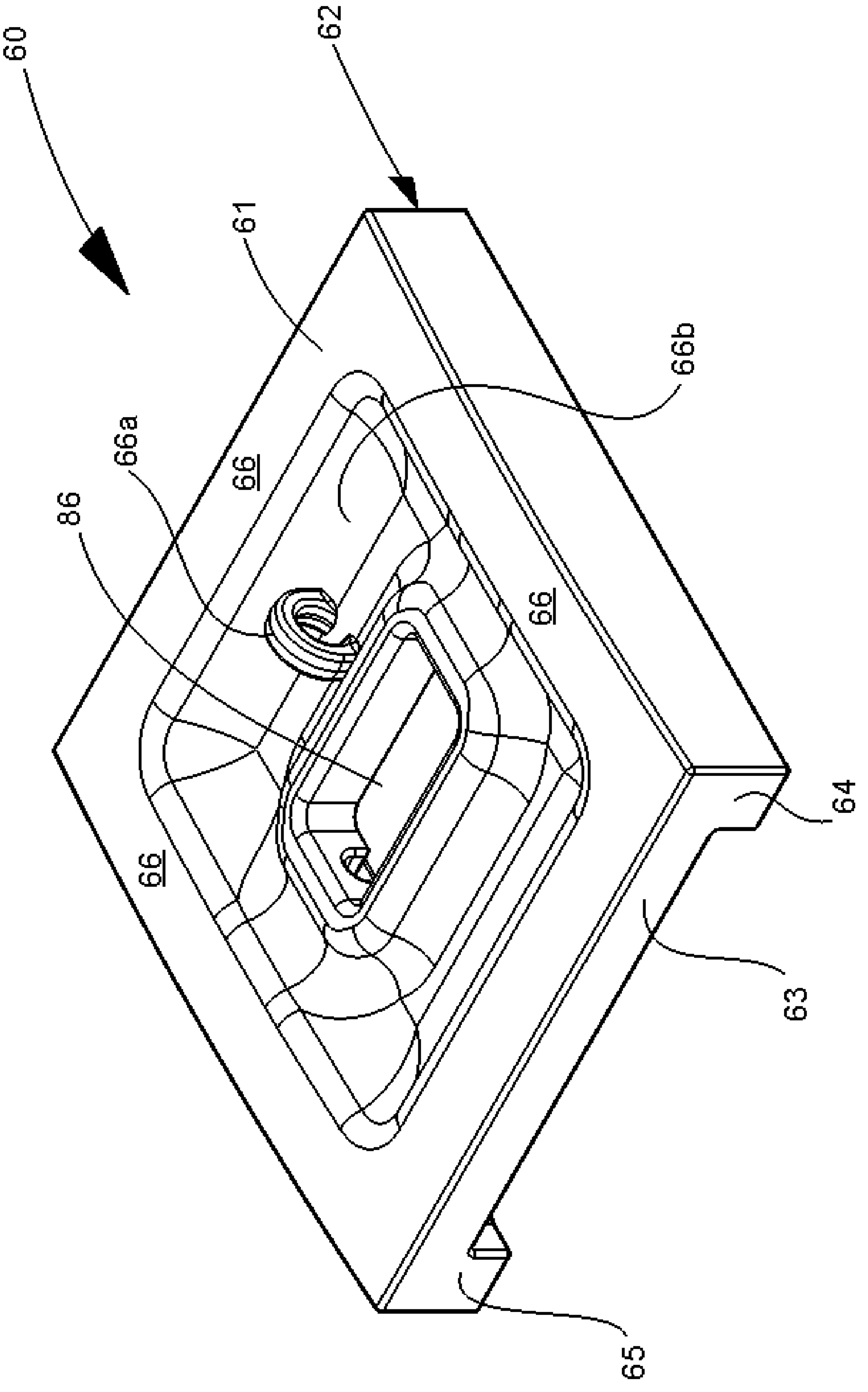
FIG. 4*a* is a pictorial representation of a wear pad according to the present invention from the wear face and trailing end.
Figure 4B:
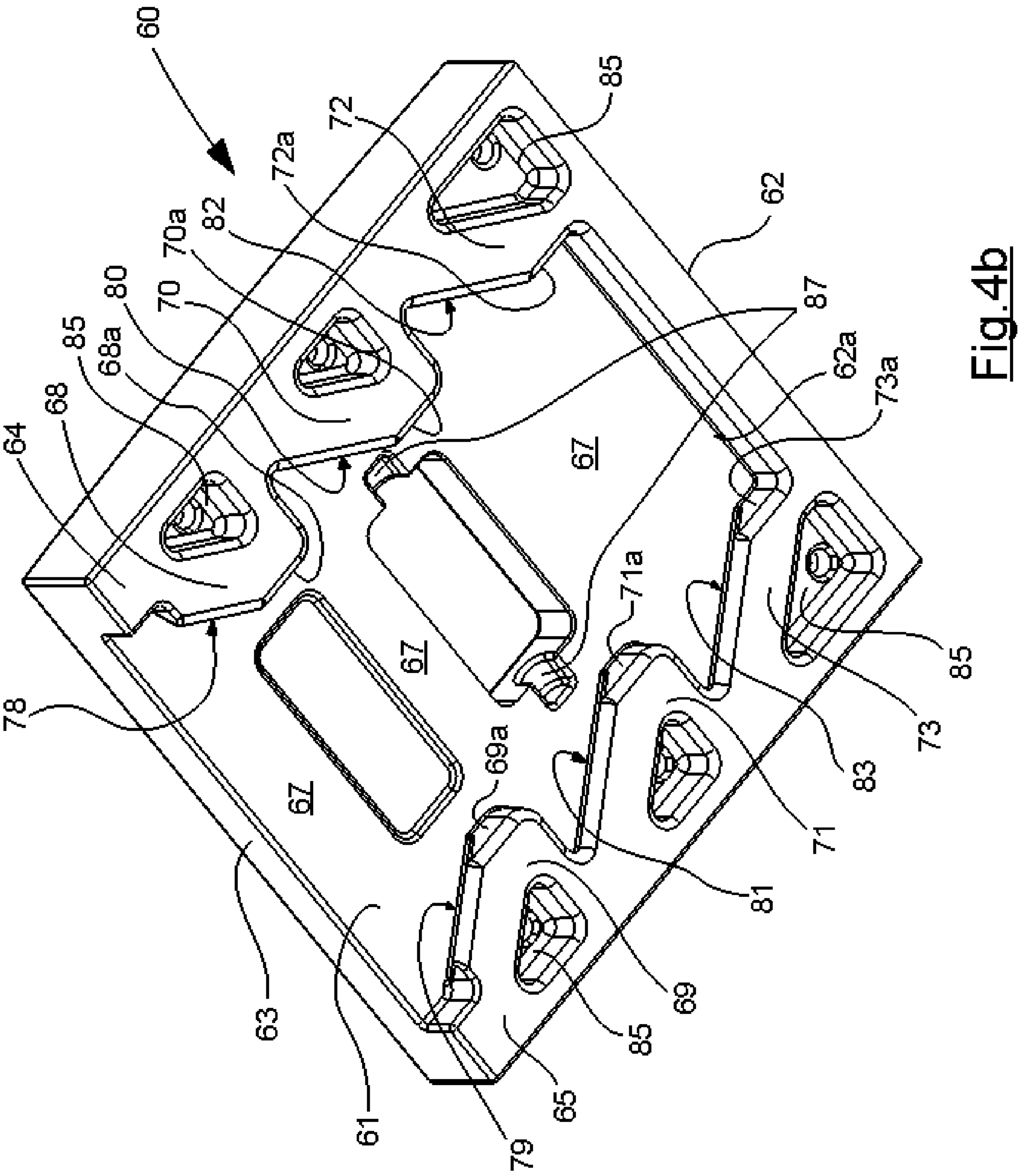
FIG. 4*b* is a pictorial representation of the wear pad of FIG. 4*a* from the upper side (the side which engages the weld on mount)
Figure 4D:
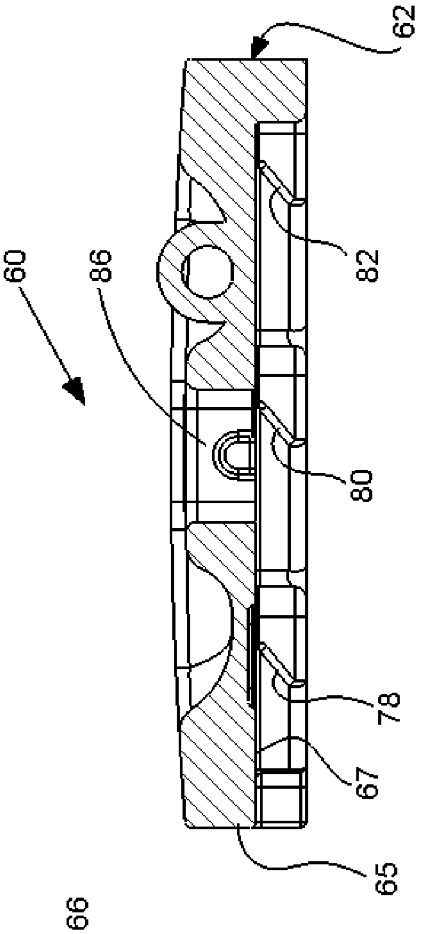
FIG. 4*d* is a sectional side elevation along line B-B of the wear pad of FIG. 4*a;*
Figure 4C:
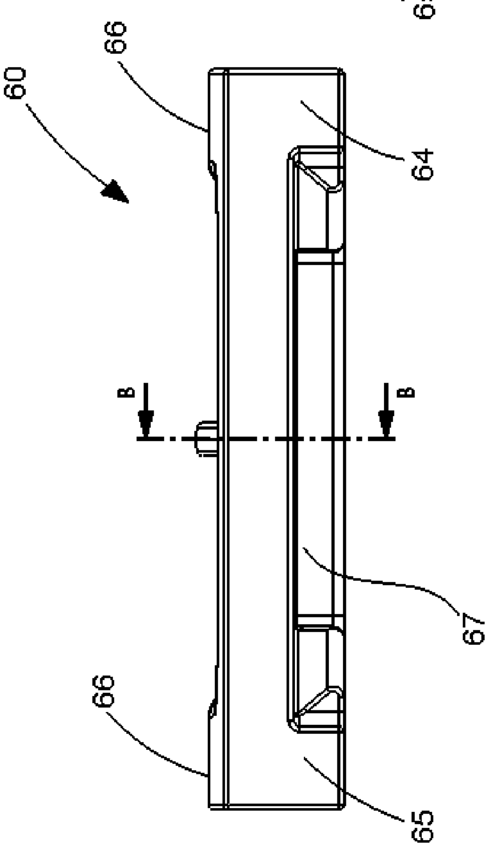
FIG. 4*c* is an end view of the wear pad of FIG. 4*a* from the trailing end.
Figure 4F:
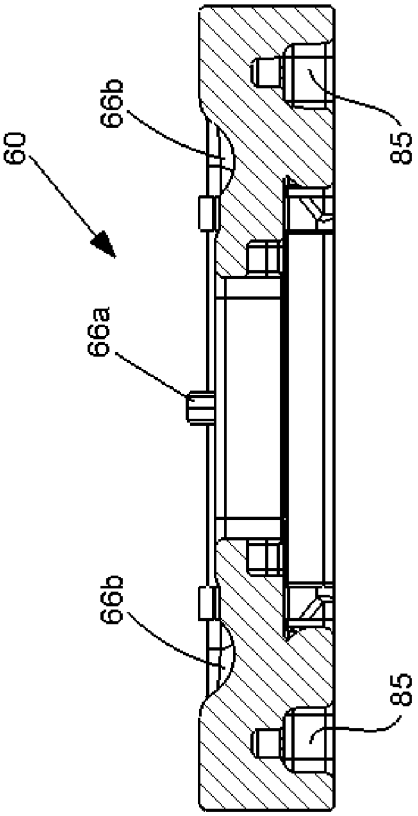
FIG. 4*f* is a sectional end view of the wear pad of FIG. 4*e* along line C-C.
Figure 4G:
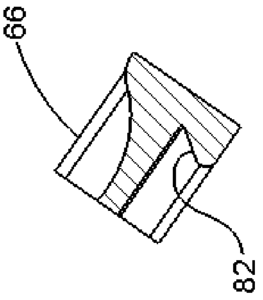
FIG. 4*g* is a sectional view of part of the wear pad of FIG. 4*c* along line D-D.
Figure 4E:
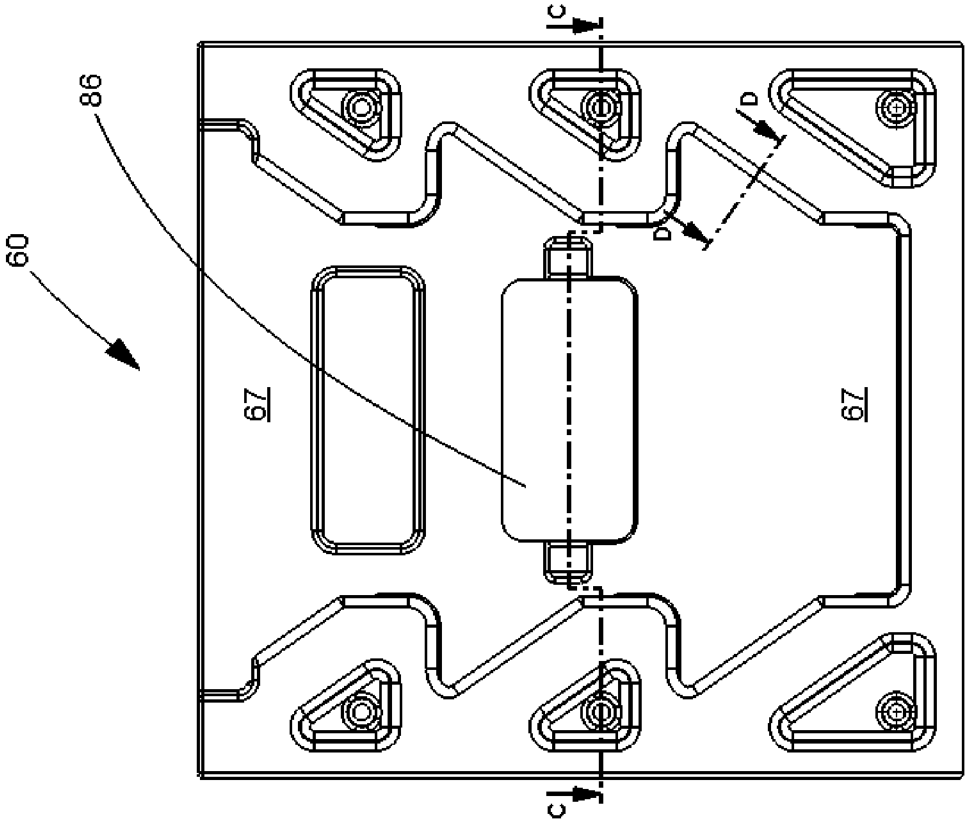
FIG. 4*e* is an inner face plan view of the wear pad of FIG. 4*a;*
Figure 4H:
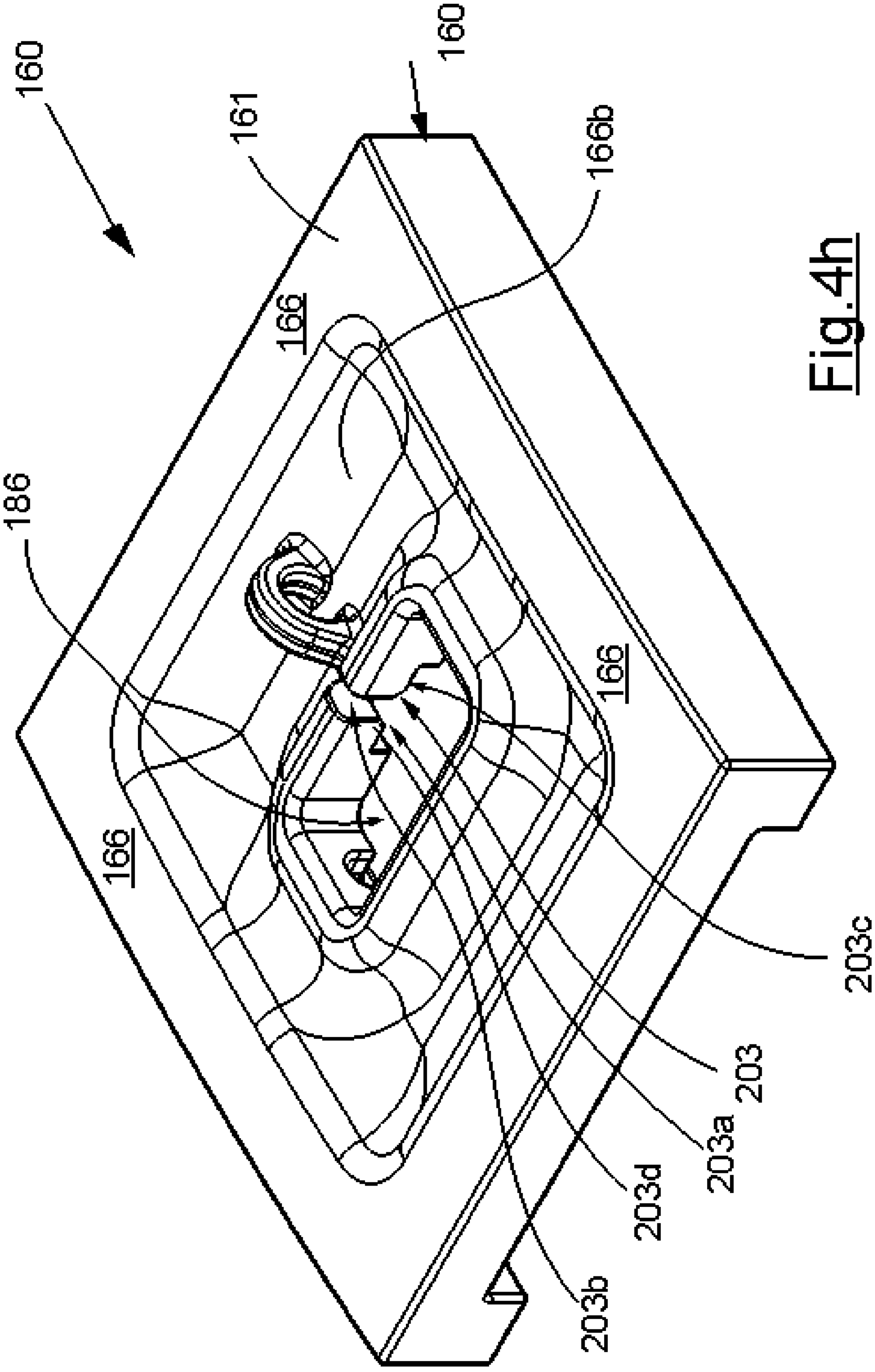
FIG. 4*h* is a pictorial representation of another wear pad according to the present invention from the wear face and trailing end.

The alternative wear pad 160 illustrated in FIG. 4*h* is the same as that illustrated in FIG. 4*a* in most respects and accordingly corresponding features will be referenced by corresponding numbers except prefaced by a "1". The main difference from wear pad 60 is that an additional recess 203 is provided for receiving therein a different tool for assisting in removal of the wear pad from the mount when replacement is required. For that purpose, the recess is generally shaped in cross section from side to side like an upside down "T" with a top portion 203*a* which forms the leg of the "T" and a bottom portion 203*b* which forms the head of the "T" thereby providing spaced apart shoulders 203*c* and 203*d* on opposite sides of the leg of the "T". The shoulders are suitably sized for engagement by a lifting tool as will now be described.

Figure 4J:
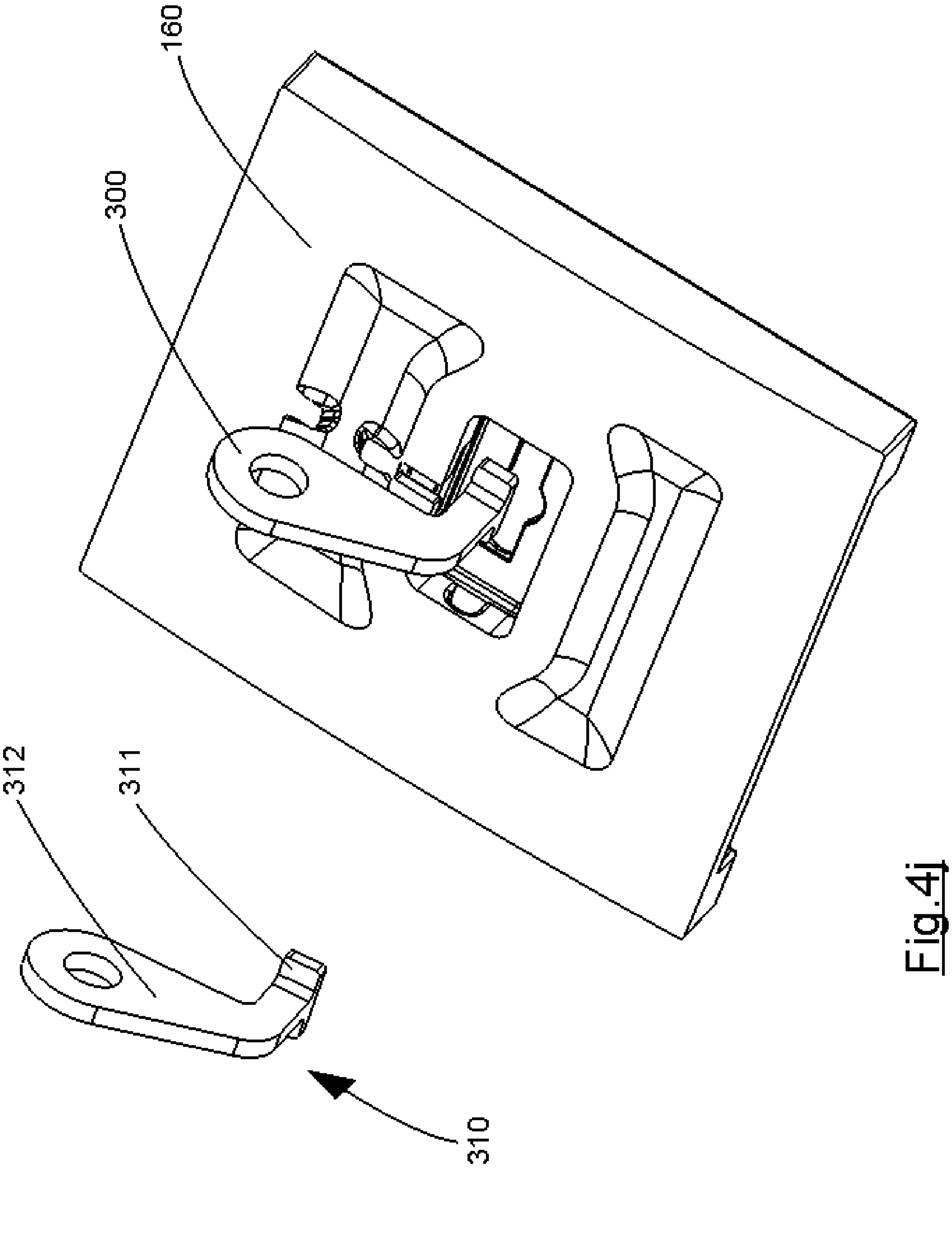
FIG. 4*j* is a pictorial representation of the wear pad of FIG. 4*h* with a tool partially in place ready to assist in removal of the locking block therefrom.
Figure 4K:
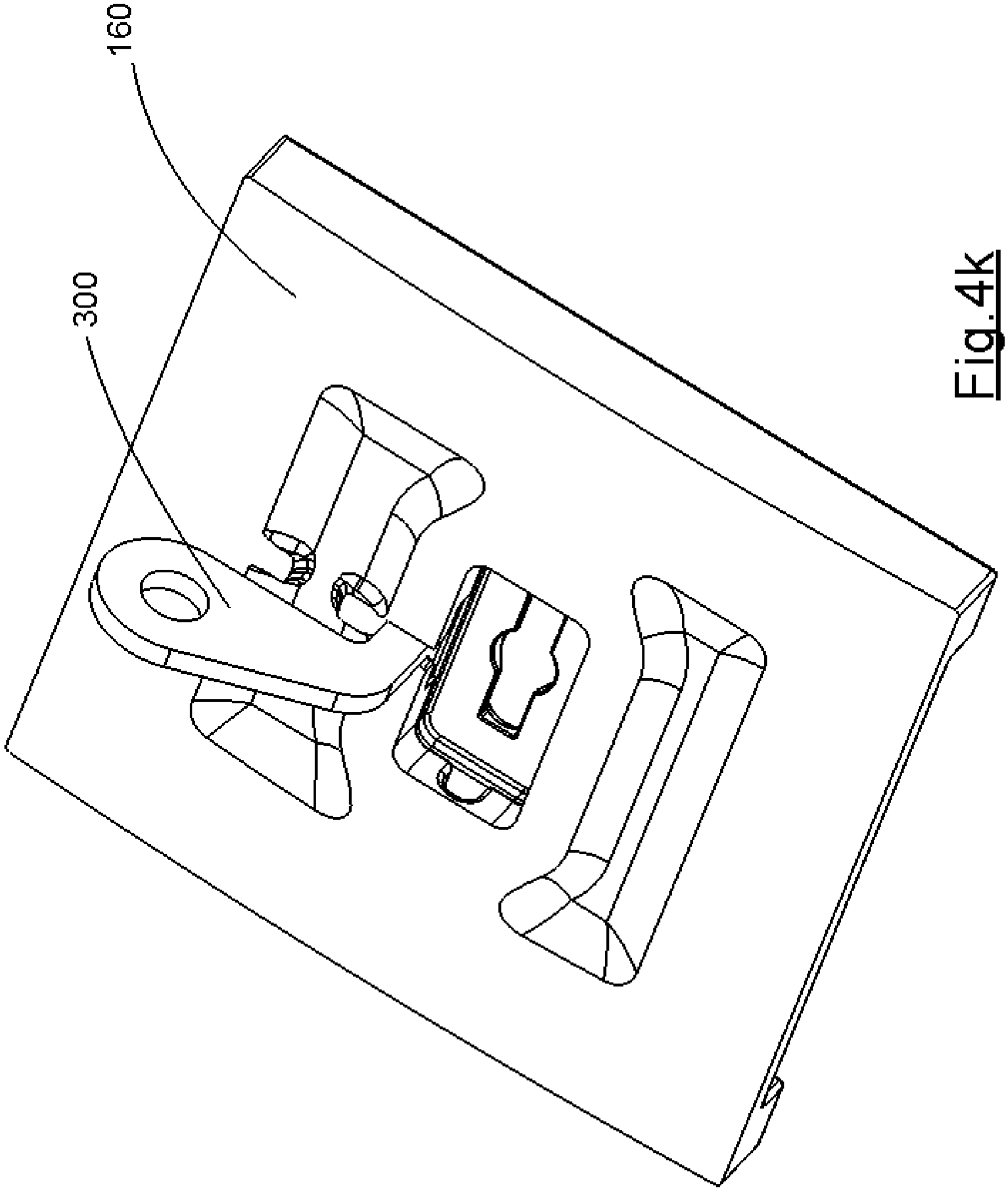
FIG. 4*k* is a pictorial representation of the wear pad of FIG. 4*h* with the tool fully in place ready to lift the locking block therefrom.

As can be seen in FIGS. 4*j* and 4*k*, the lifting tool 310 has a substantially upside down "T" shaped bottom portion 311 forming the head of the "T" suitably sized for engagement in recess portion 203*a* and an extended handle portion 312 forming the leg of the "T" and providing a lifting leg for the tool. Suitably, the bottom portion of the "T" is a comfortable fit in the bottom portion of the recess and the lifting leg is a comfortable fit in the handle portion of the recess whereby it supports the wear pad during removal of a worn wear pad.

Figure 4M:
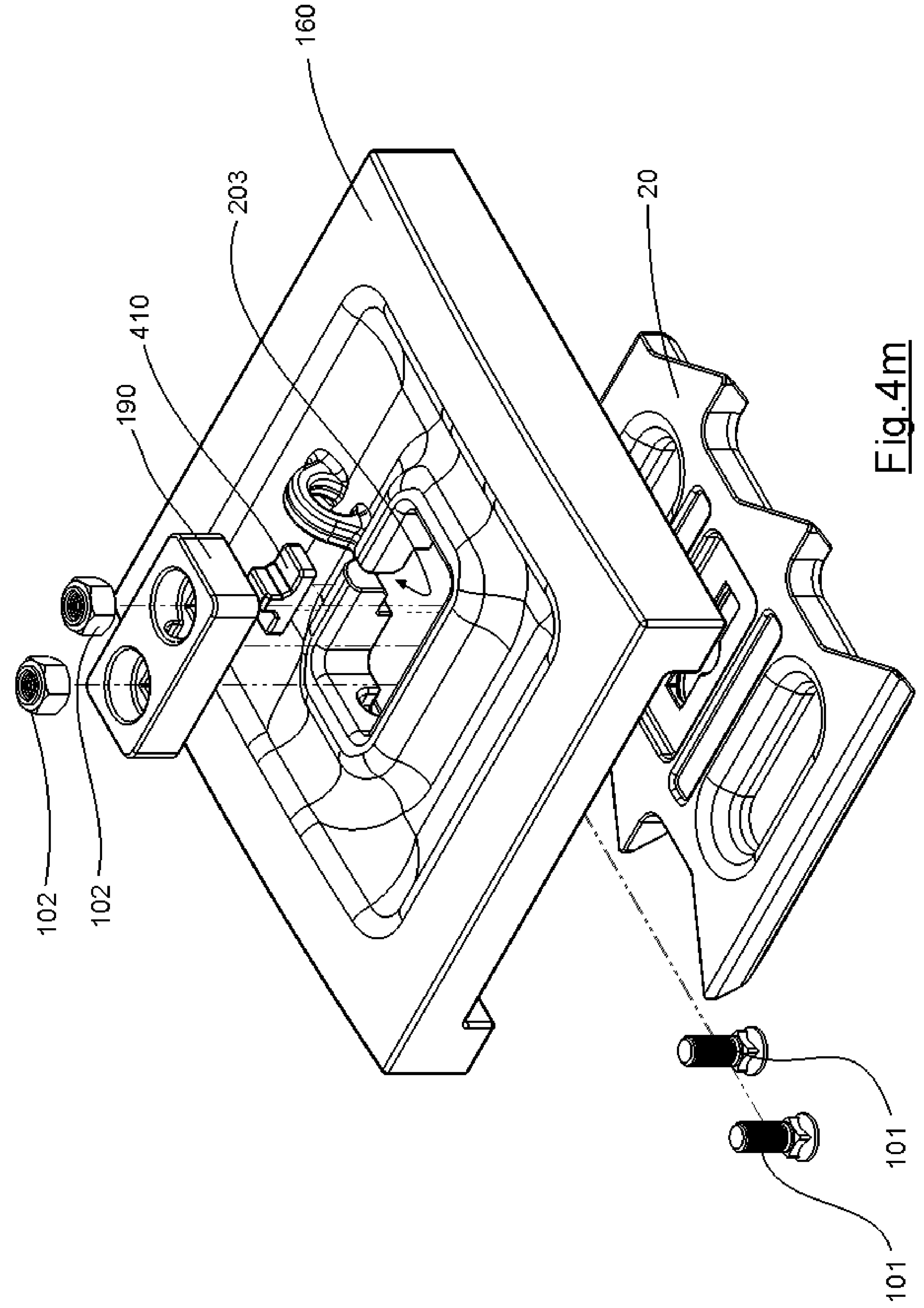
FIG. 4*m* is a pictorial representation of the wear pad of FIG. 4*h* with a plastic insert ready to be fitted in the tool recess.

As can be seen in FIG. 4*m*, an upside down "T"-shaped plastic plug 410 is also provided to fill recess 203 when a new wear plate is being fitted. In that respect, the plug fills recess 203 until it is removed after removal of retainer block 190 from passage 186 to inhibit build-up of fines therein until it is removed to allow access of the lifting tool 310.

Figure 5B:
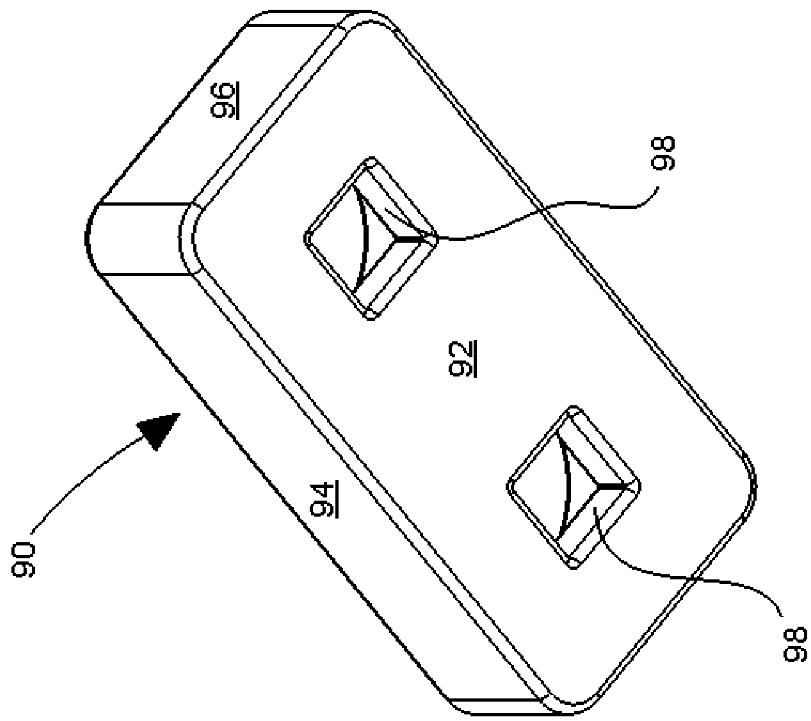
FIG. 5*b* is a pictorial representation of the locking member of FIG. 5*a* from an inner face.
Figure 5A:
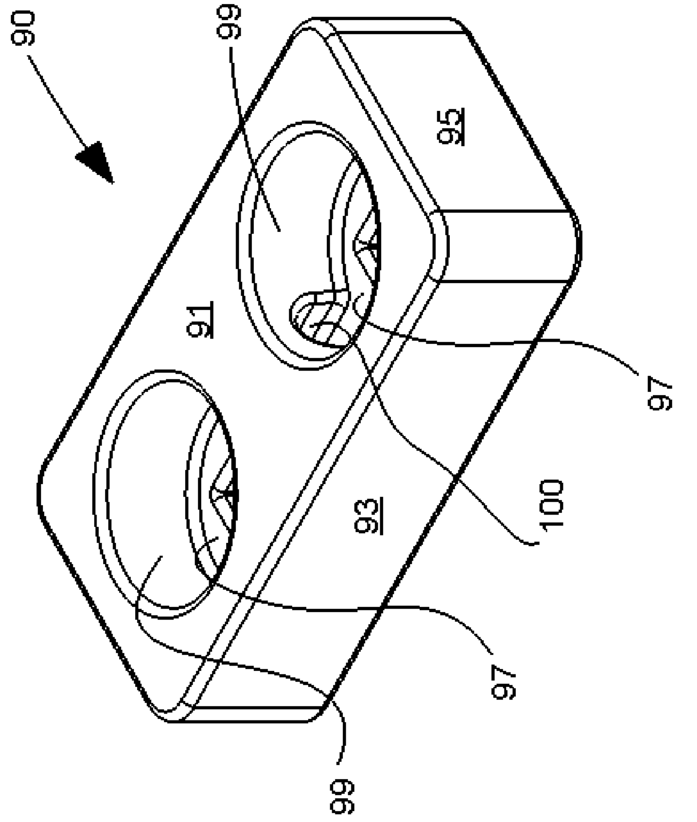
FIG. 5*a* is a pictorial representation of a locking member (or locking block) according to the present invention from an outer face.
Figure 5E:
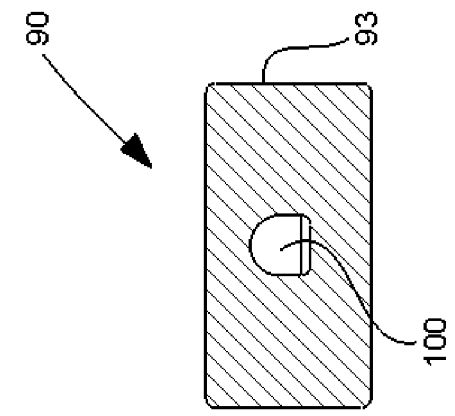
FIG. 5*e* is a sectional end elevation view of the locking member of FIG. 5*d* along line C-C.
Figure 5D:
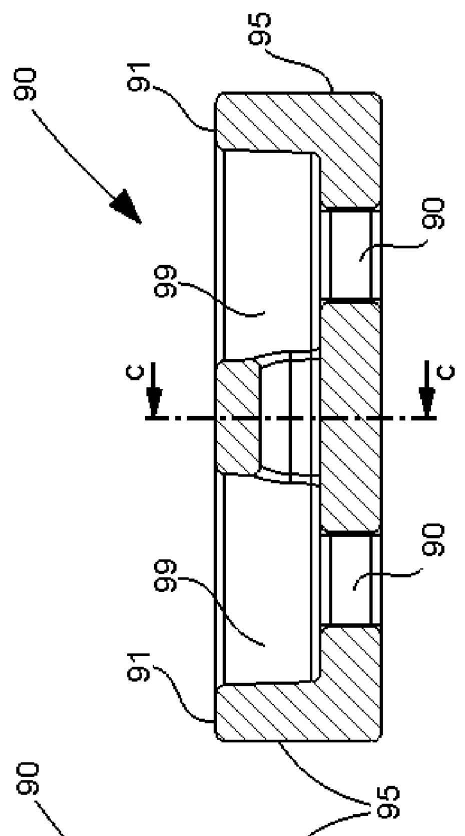
FIG. 5*d* is a sectional side elevation view of the locking member of FIG. 5*c* along line B-B.
Figure 5C:
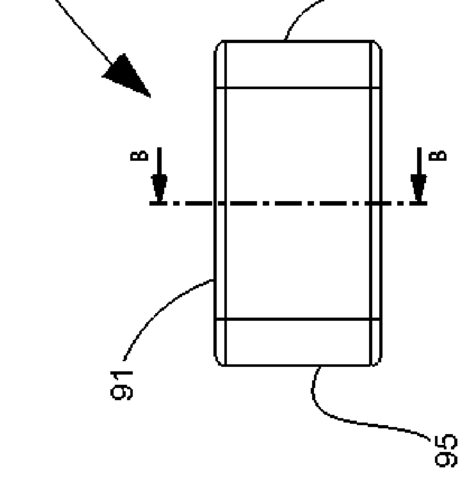
FIG. 5*c* is an end elevation view of the locking member of FIG. 5*a;*

The locking member (or locking block) 90 illustrated in FIGS. 5*a* and 5*b* is substantially a rectangular prism having an upper face 91, a lower face 92, opposed side faces 93 and 94, and opposed end faces 95 and 96. Two spaced apart passages 97 extend through the mounting block from the upper face 91 to the lower face 92, the passages 97 having an end portion 98 adjacent the lower face which is square in cross section and opens into a larger portion 99 adjacent the upper face which is circular in cross section. Suitably, the lower square cross-section portion is adapted to engage with the square had portion of a plow bolt while the upper circular cross-section portion is adapted to rotatably receive therein a nut for the plow bolt. A passage 100 extends from one of the cylindrical portions 99 to the other for receiving therein a lifting tool for lifting the mounting block from the wear pad when replacement is required.

In use, a plurality of mounts 20 are welded to the outer face of the bottom panel 11 of excavator or face shovel bucket 10 to form an array in which the bottom panel will be more or less entirely covered by the wear pads 60 when fitted to the mounts 20.

In the first step, mounts 20 are welded to the bottom panel of the bucket in the desired spaced apart positions as can be seen in FIGS. 8*a* to 8*d* by fillet welds along leading end 22 and trailing end 23 and within obround weld passages 46 and 47.

When all the mounts have been welded to the bottom panel, the wear pads 60 are fitted to the mounts. The fitting step involves aligning the protuberances 68 to 73 of the wear pad with the spaces 42 between adjacent protuberances 26 to 31 and then pushing the wear pad into the "release position". At that point, it will be appreciated that the wear pad is not secured to the mount. The securing step which follows requires the wear pad to slide along outer face 34 of the mount from the release position to the engaged position, wherein the tapered faces 78 to 83 of the wear plate protuberances engage with the complementary tapered faces 36 to 42 of the mount protuberances.

It will be appreciated that the arrangement of the tapered faces is such that the tapers pull the wear pad into facial engagement with the mount and also tighten the wear pad against the sides of the mount thereby preventing or at least inhibiting sideways movement of the wear pad relative to the mount, longways movement from the leading end towards the trailing end, screwing or pivoting movement of the wear pad relative to the mount about a perpendicular axis extending from the outer face of the mount, and skewing movement as well. Advantageously, leading end portion 22*a* of the mount 20 engages within leading end recess 62*a* of the wear pad close to the leading end 22 while trailing end 23 engages with tapered faces 78 and 79 of the wear pad.

Figure 6A:
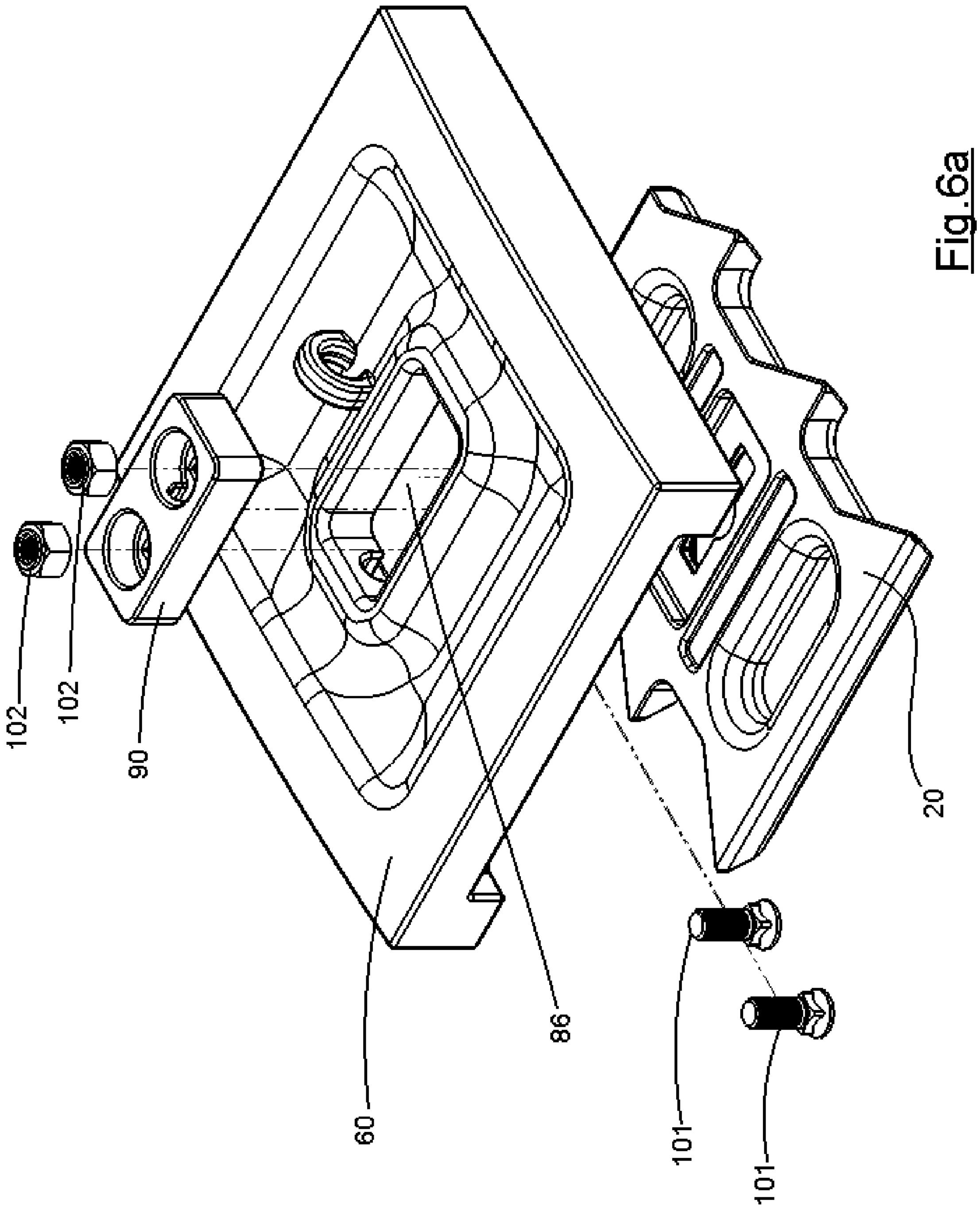
FIG. 6*a* is a pictorial representation of the mount of FIG. 3*a*, the wear pad of FIG. 4*a* and the mount of FIG. 5*a* in line for assembly and also showing plow bolts and nuts.
Figure 6B:
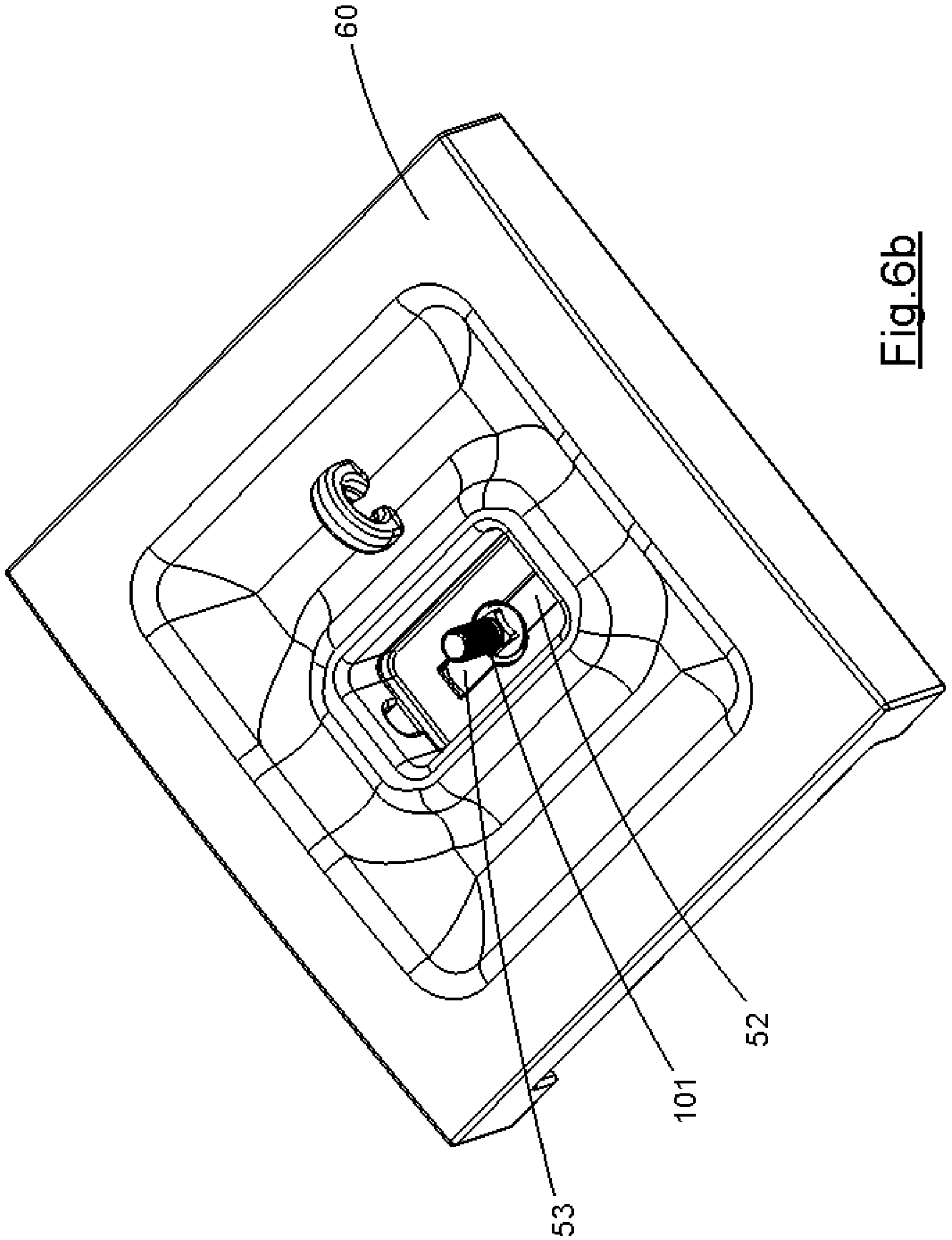
FIG. 6*b* is a pictorial representation of the mount of FIG. 3*a*, and the wear pad of FIG. 4*a* with one of the plow bolts being fitted and in an intermediate position.
Figure 6C:
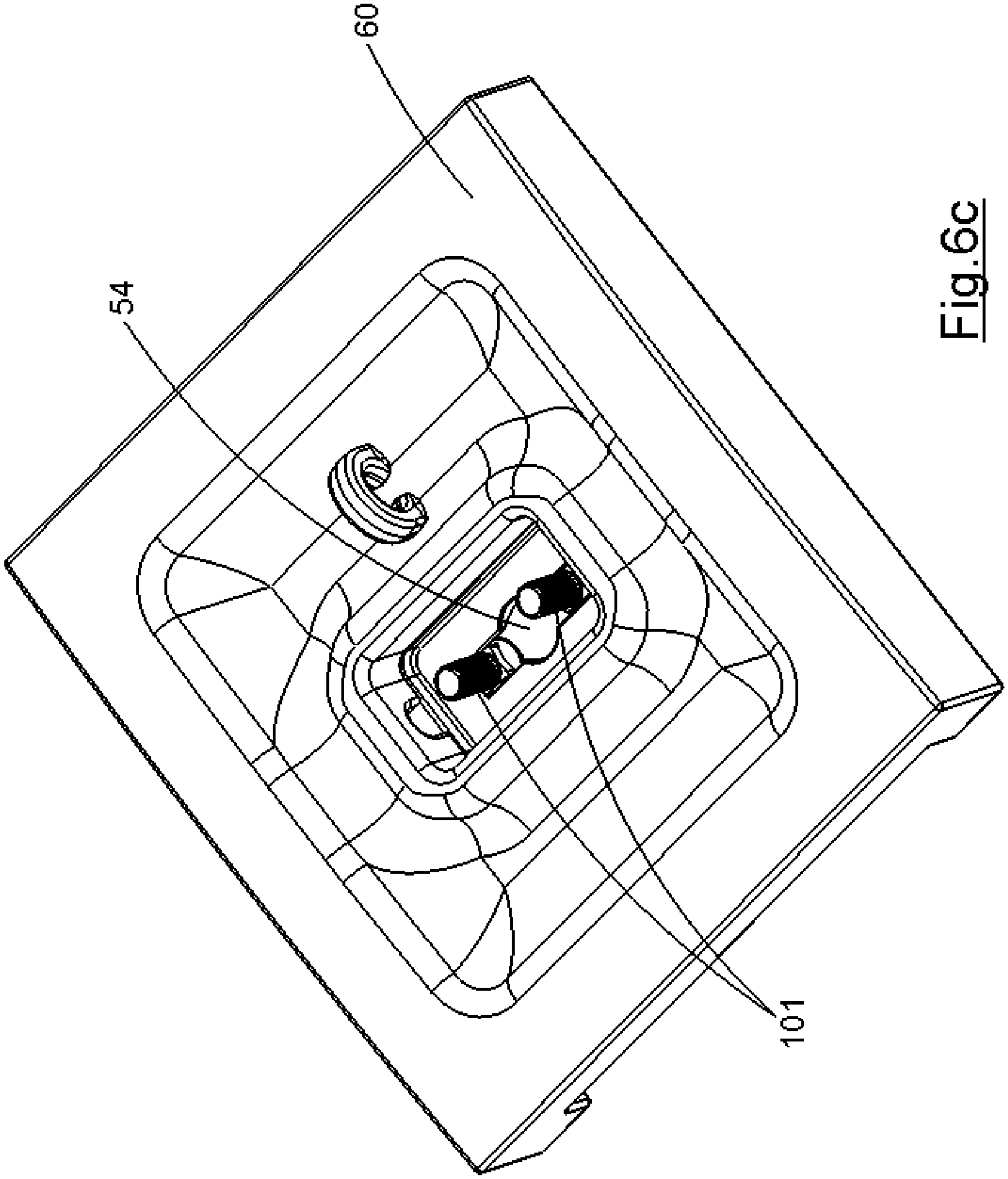
FIG. 6*c* is a pictorial representation of the mount of FIG. 3*a*, and the wear pad of FIG. 4*a* with the plow bolts fitted and ready for the locking member to be fitted.

Referring to FIGS. 6A-6C, upon the wear pad 60 being moved to the engaged position on the mount 20, the locking member (or locking block) 90 is ready to be fitted. Firstly, the plow bolts 101 are fitted to the mount 20. Initially, the head of the first plow bolt is pushed through large centre portion 54 of centre passage 51 and rotated about its longitudinal axis to align the square part of the shank with the narrow portion 52 or 53 of the passage and then the bolt is slid to one end. The same process is then carried out for the second plow bolt except that it is pushed to the other end of the remaining narrow portion so that the two bolts extend outwards from the floor 49 of recess 48.

Figure 6D:
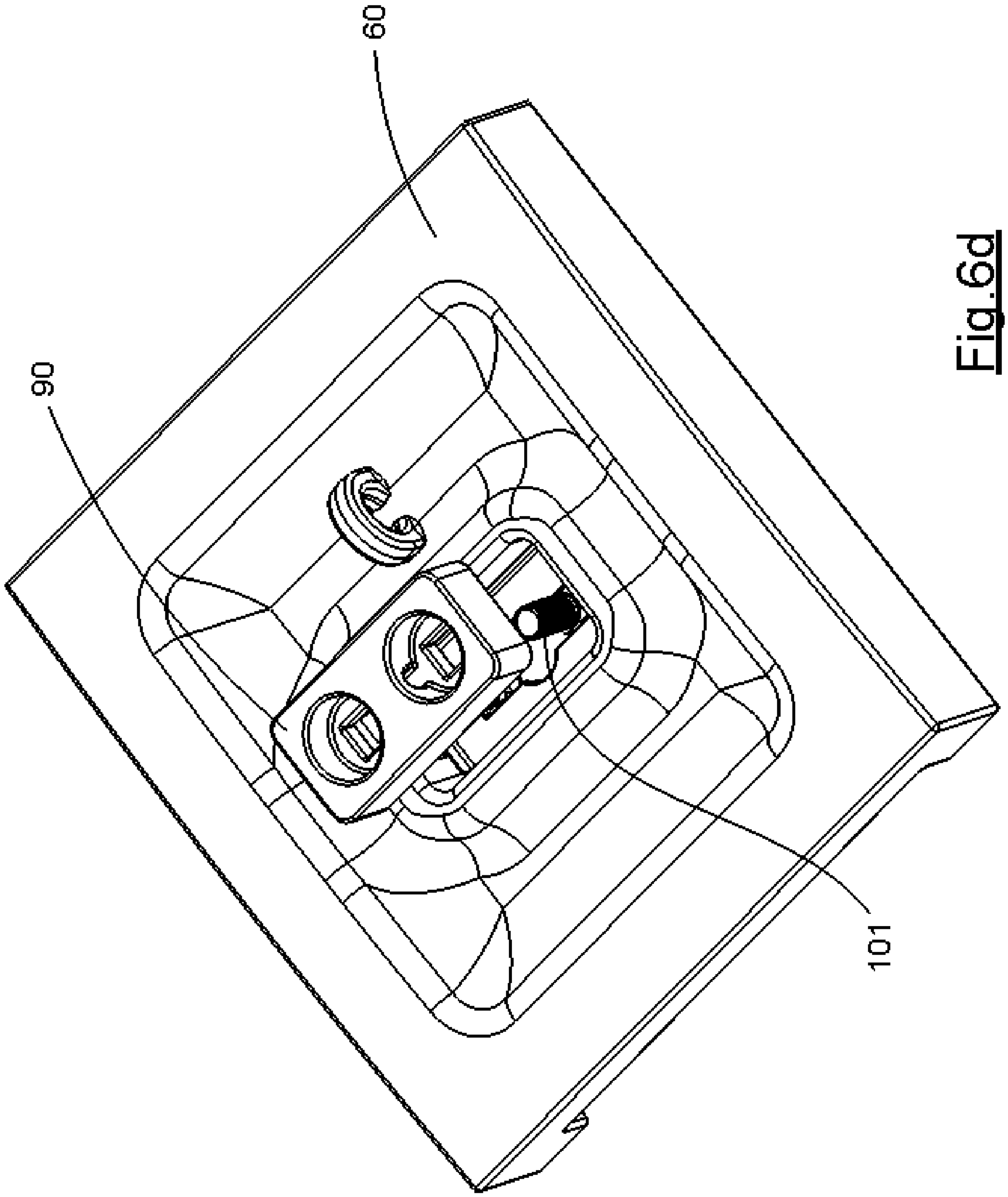
FIG. 6*d* is a pictorial representation of the mount of FIG. 3*a*, and the wear pad of FIG. 4*a* with the plow bolts fitted and the locking member being fitted.
Figure 6E:
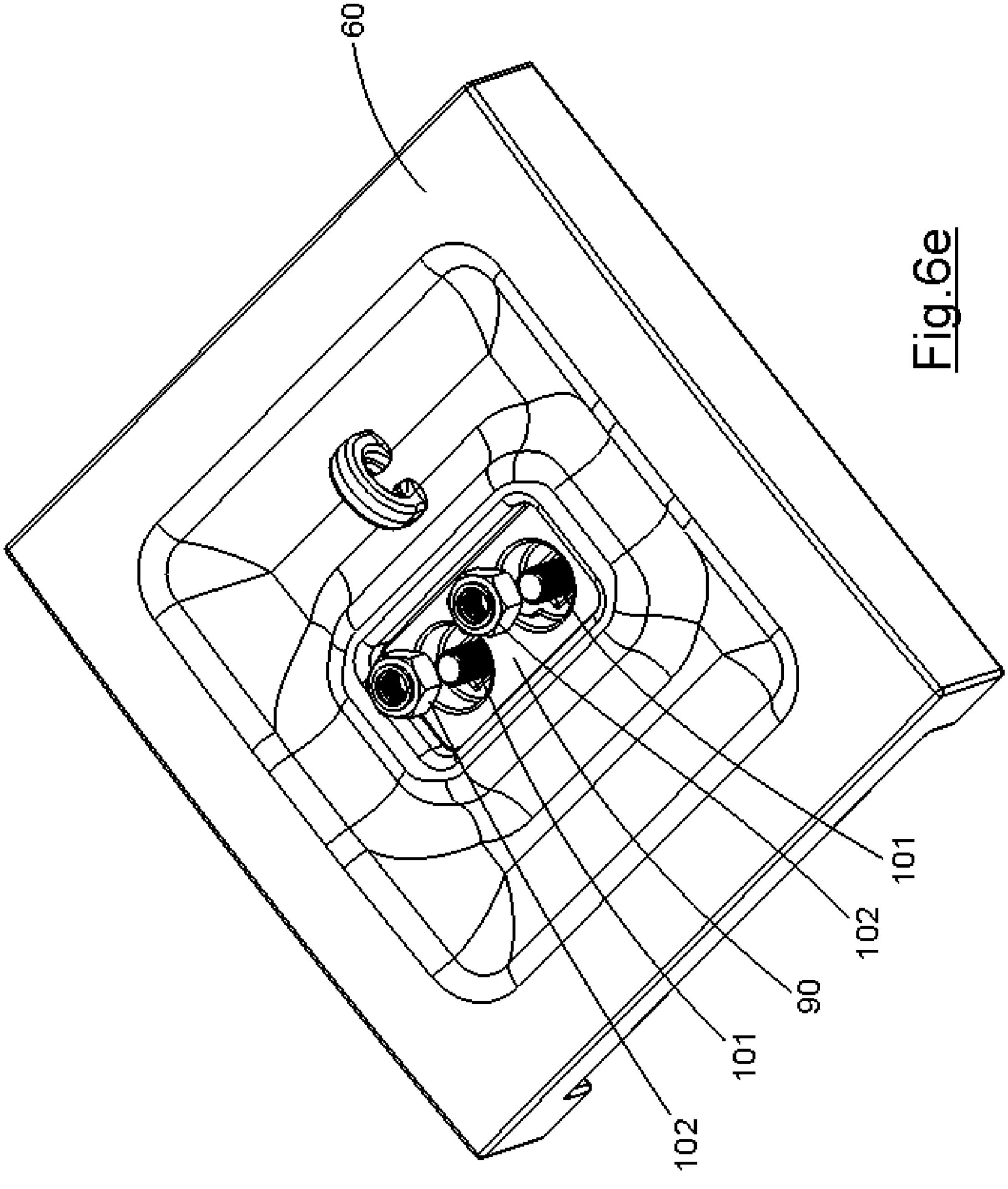
FIG. 6*e* is a pictorial representation of the mount of FIG. 3*a*, and the wear pad of FIG. 4*a* with the locking member fitted and the nuts loose.
Figure 6F:
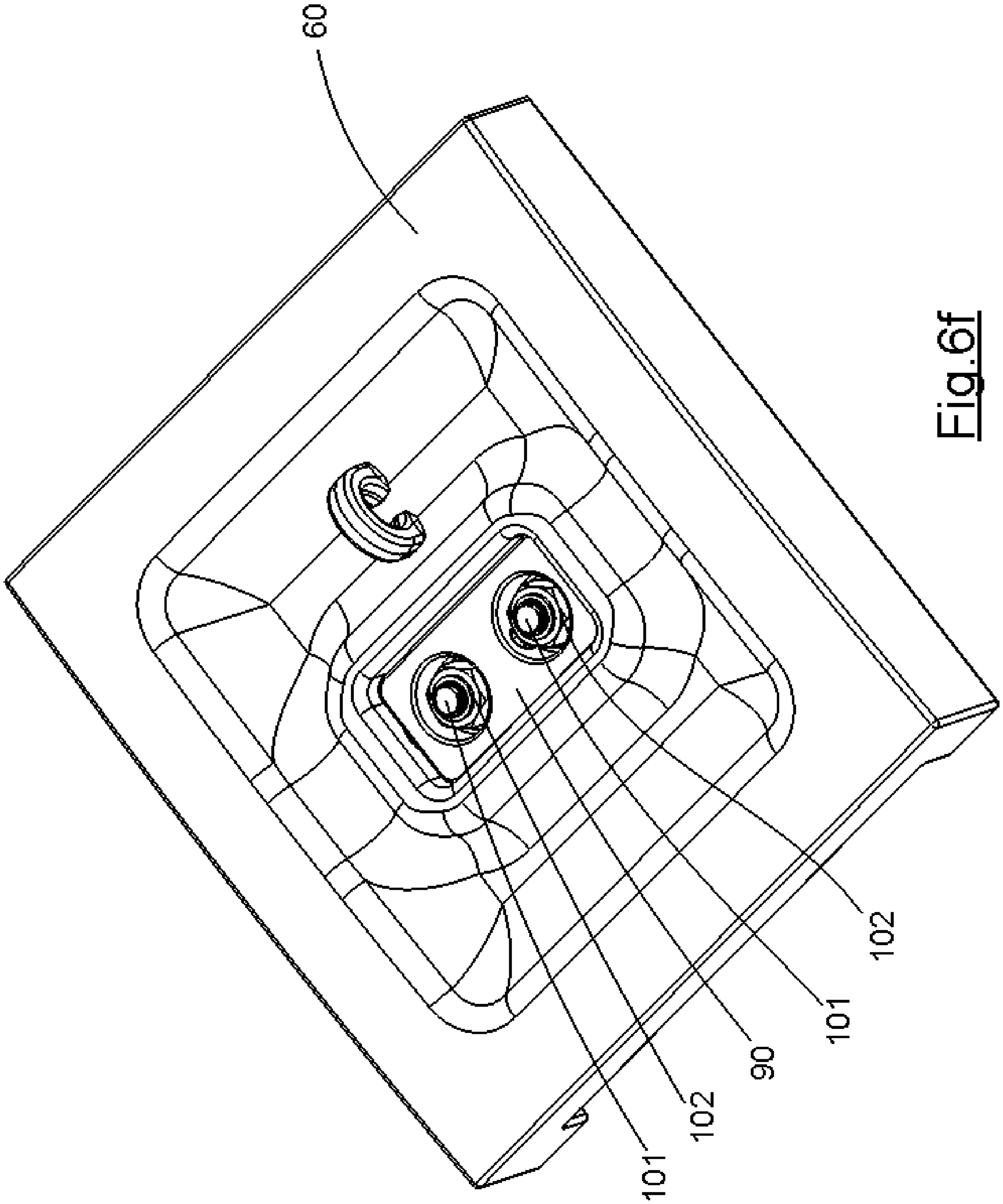
FIG. 6*f* is a pictorial representation of the mount of FIG. 3*a*, and the wear pad of FIG. 4*a* with the locking member fully fitted to lock the wear pad to the locking member which has already been welded to the bucket panel.
Figure 7A:
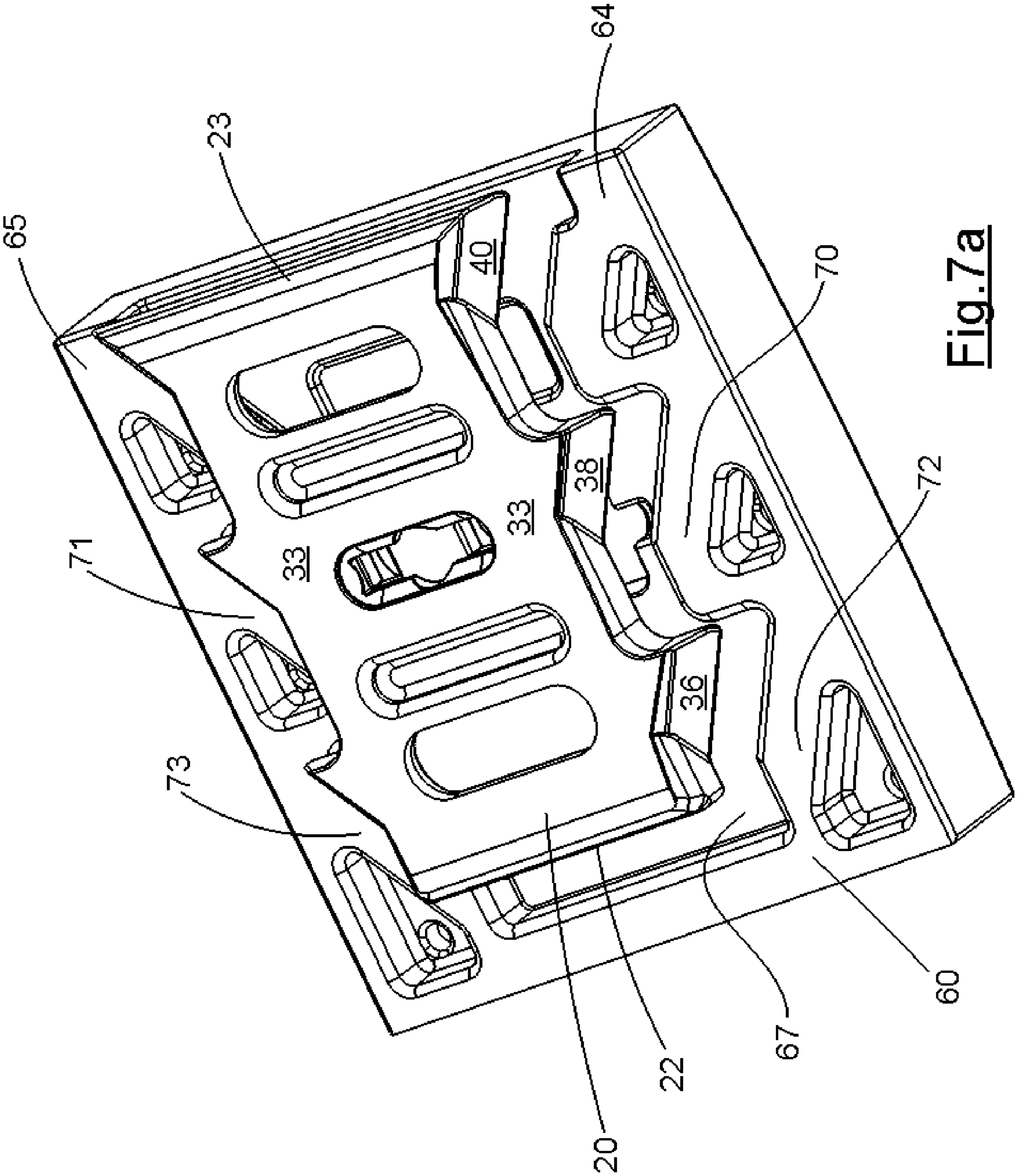
FIG. 7*a* is an upside-down pictorial representation of the first stage of fitting the wear pad of FIG. 4*a* to the weld on mount of FIG. 3*a* with the wear pad ready to be pushed onto the weld on mount into the release position.
Figure 7B:
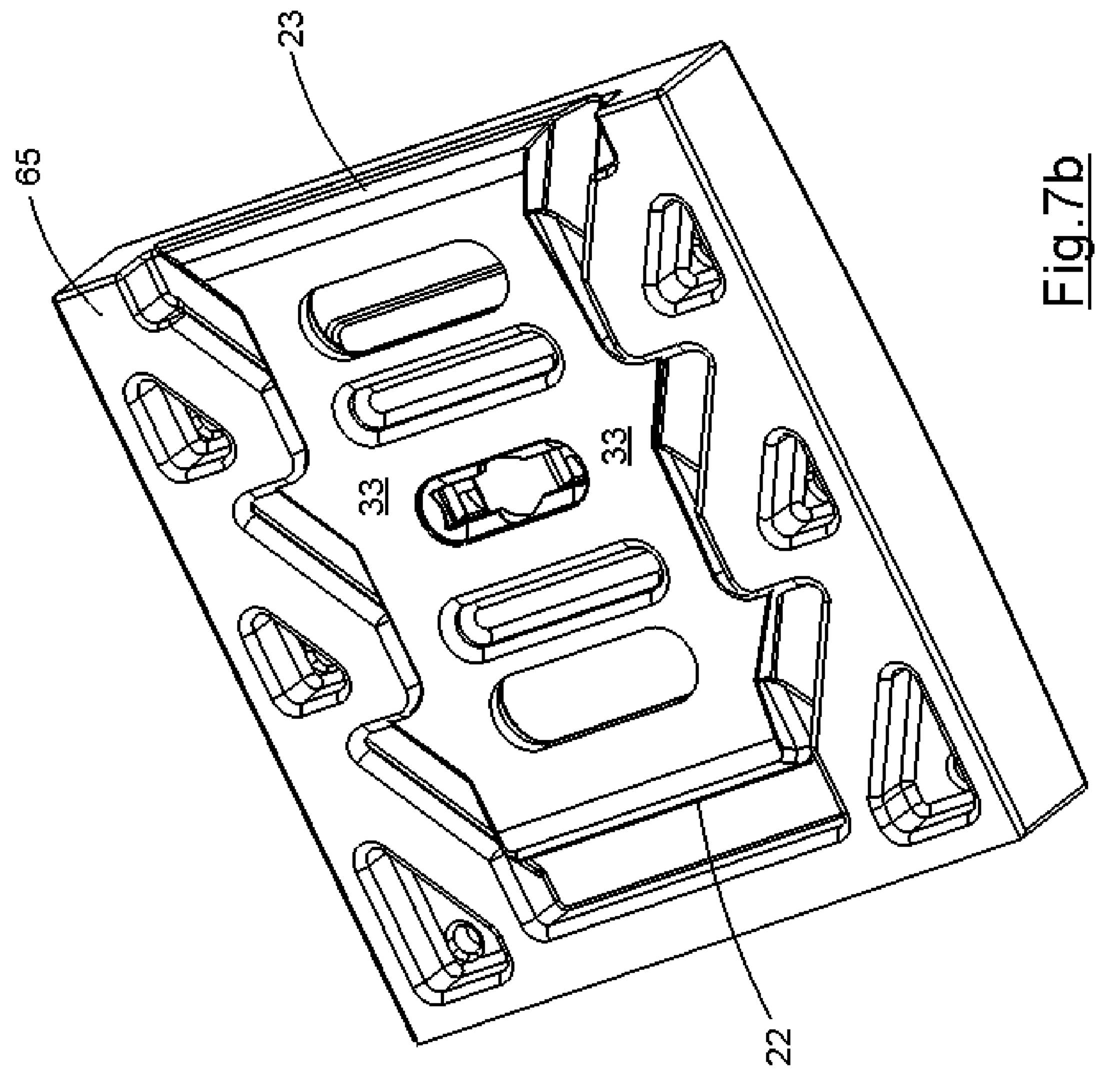
FIG. 7*b* is an upside-down pictorial representation of the second stage of fitting the wear pad of FIG. 4*a* to the weld on mount of FIG. 3*a* with the wear pad already pushed onto the weld on mount and in the release position.
Figure 7C:
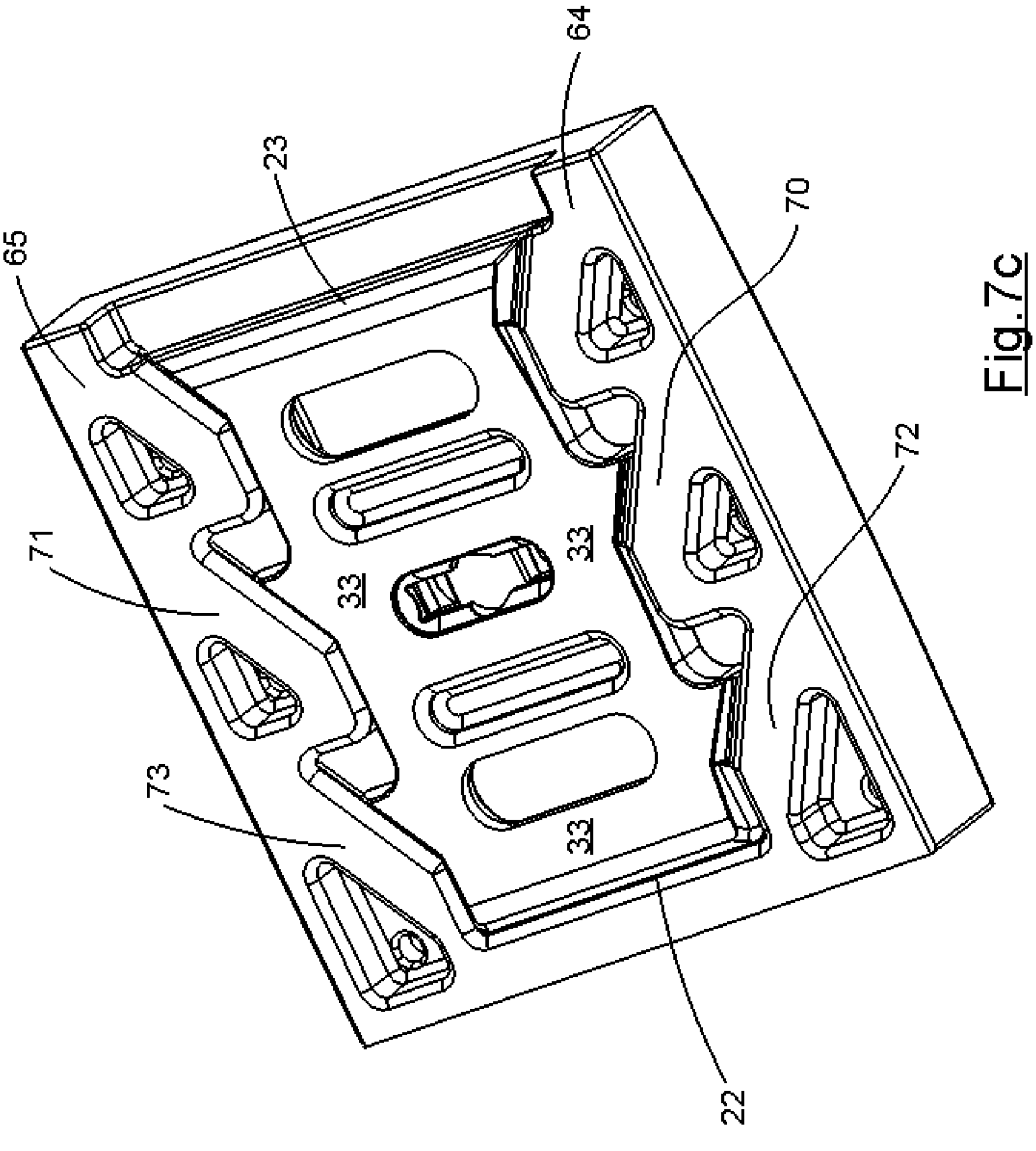
FIG. 7*c* is an upside-down pictorial representation of the third stage of fitting the wear pad of FIG. 4*a* to the weld on mount of FIG. 3*a* with the wear pad already slid into the engaged position.
Figure 7E:
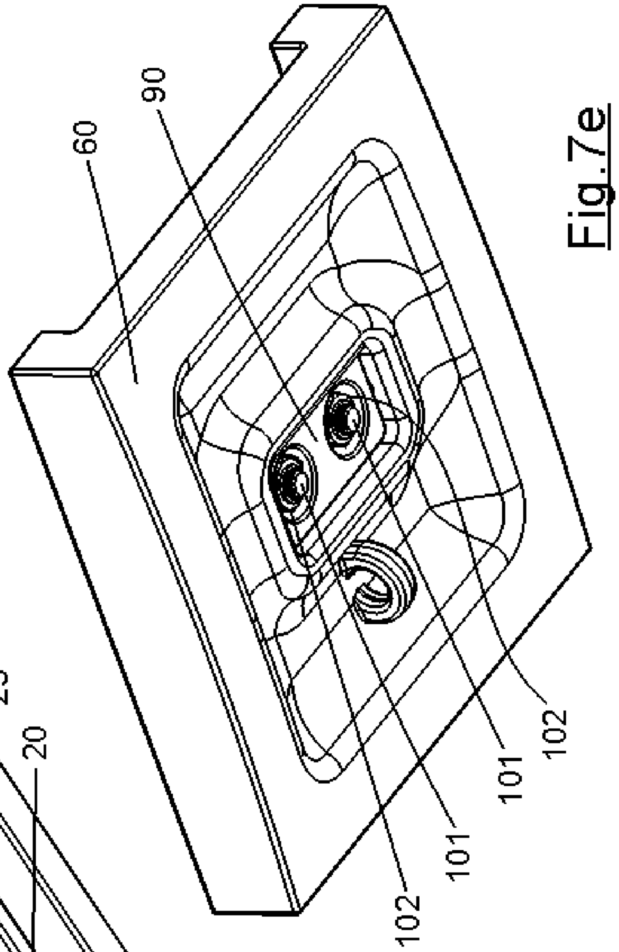
FIG. 7*e* is a view of the wear pad of FIG. 4*a* fitted to the weld on mount of FIG. 3*a* from the outer face with the locking member and plow bolts fitted.
Figure 7D:
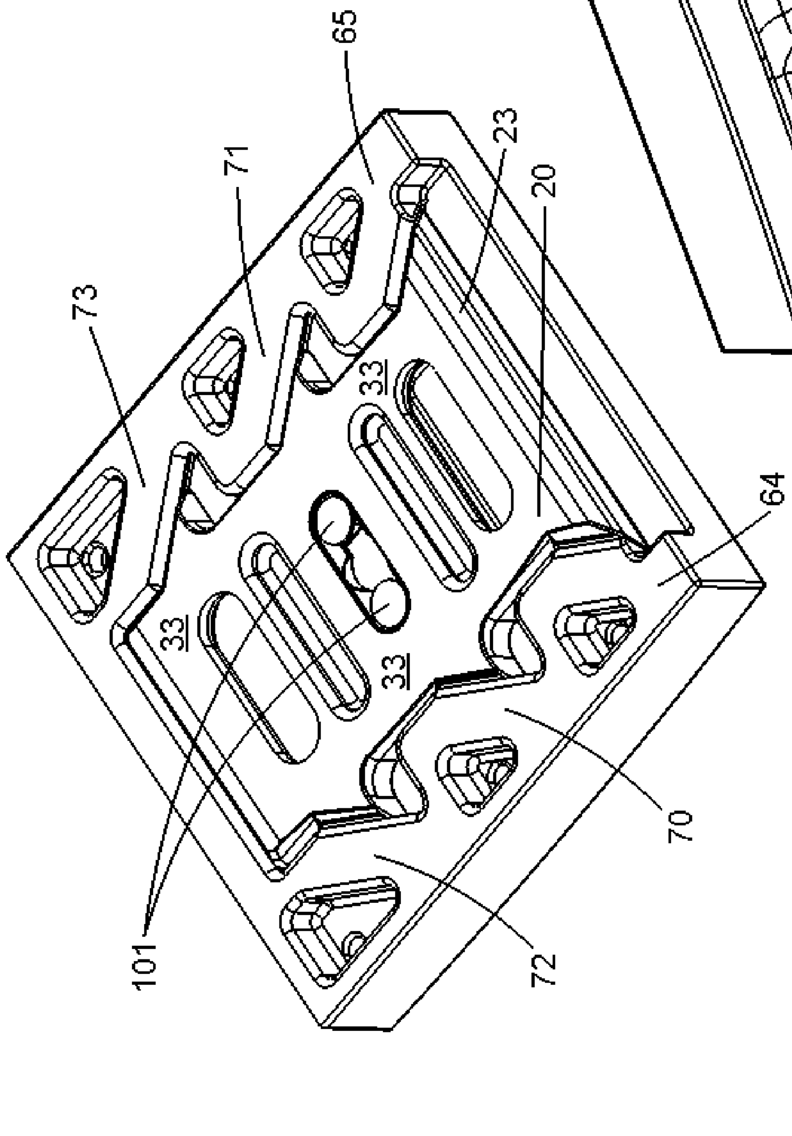
FIG. 7*d* is an underside view of the wear pad of FIG. 4*a* fitted to the weld on mount of FIG. 3*a* but with the plow bolts omitted.
Figure 8A:
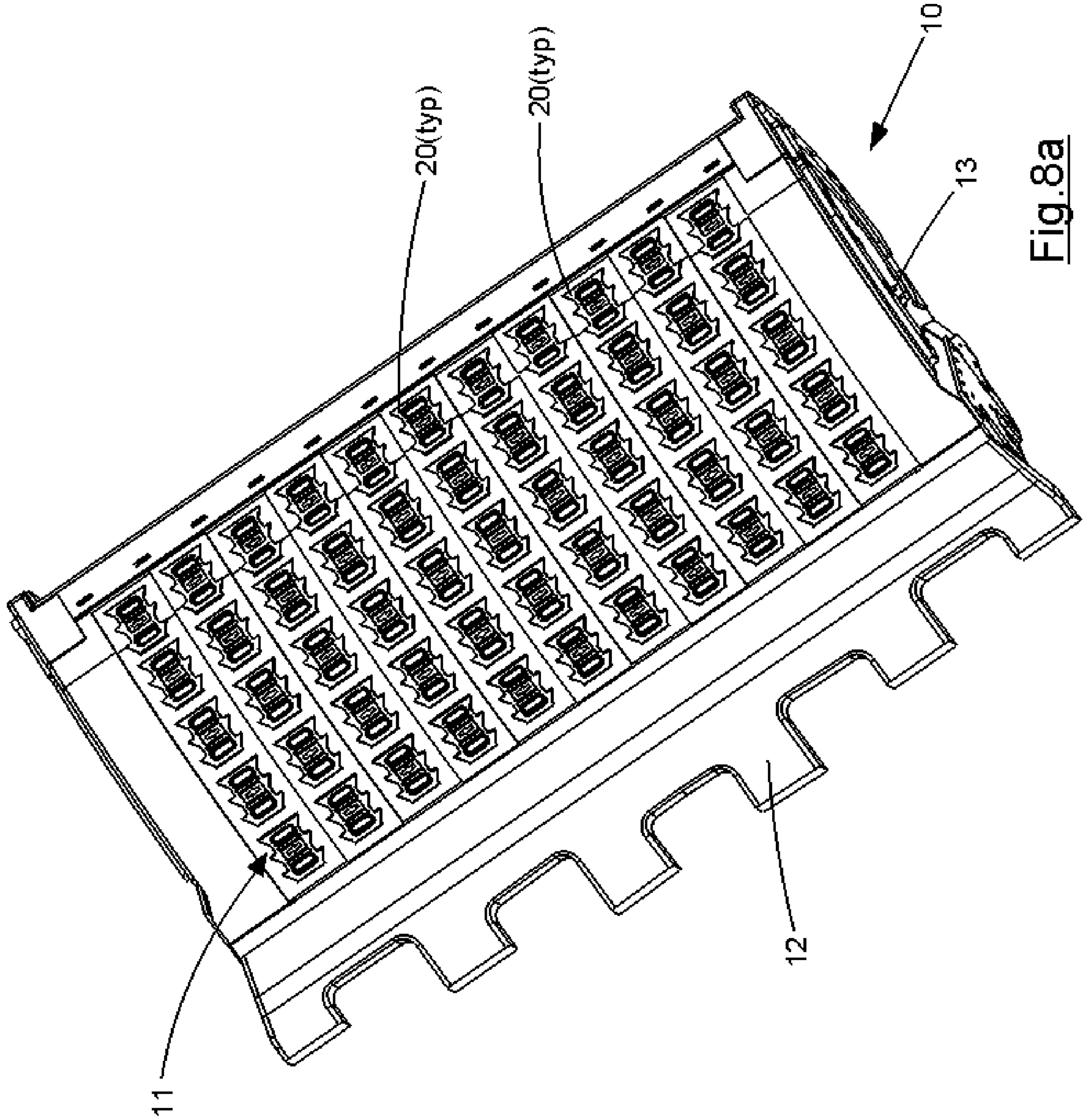
FIG. 8*a* is a pictorial representation of the underside of a face shovel bucket with the requisite number of weld on mounts of the type illustrated in FIG. 3*a* welded to the underside of the bucket ready to receive thereon the corresponding number of wear pads of the type illustrated in FIG. 4*a;*
Figure 8C:
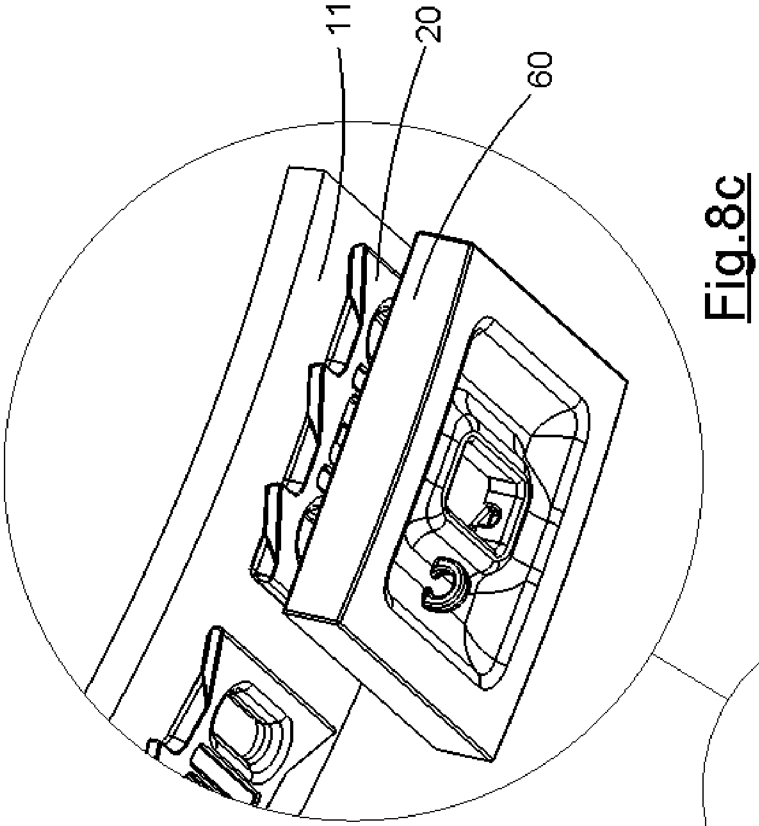
FIG. 8*b* and FIG. 8*c* are pictorial representations of the wear pads of the type illustrated in FIG. 4 are a being fitted to one column of weld on mounts.
Figure 8B:
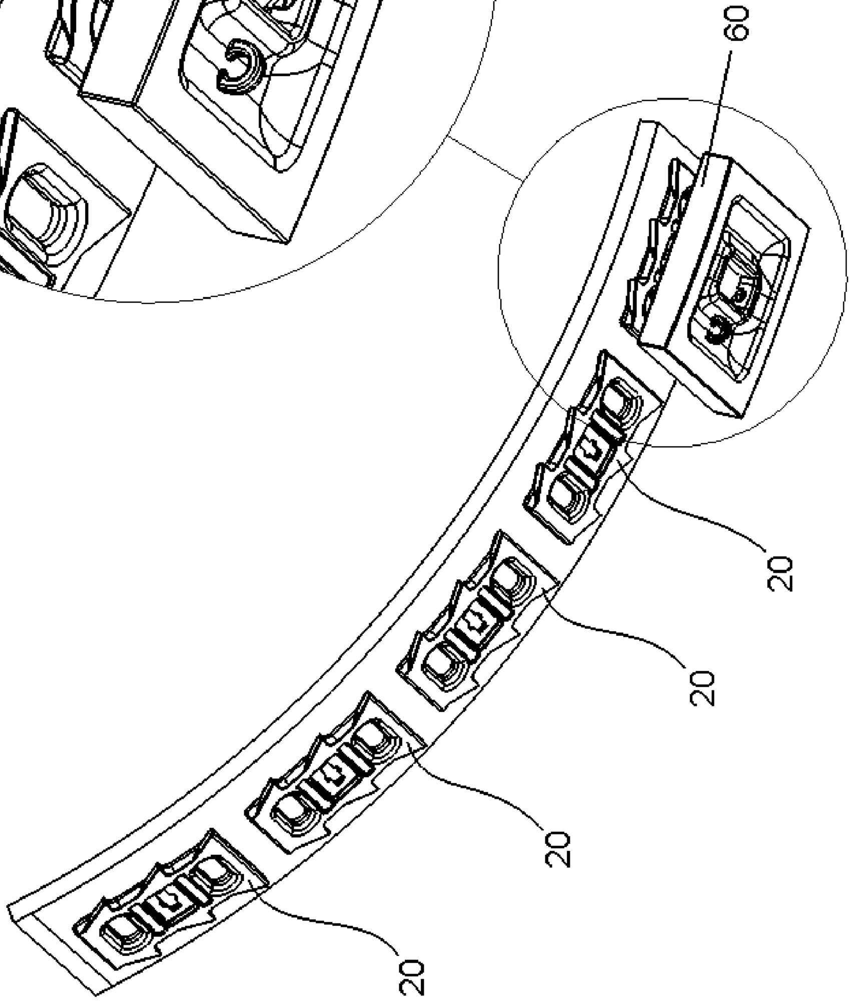
Figure 8D:
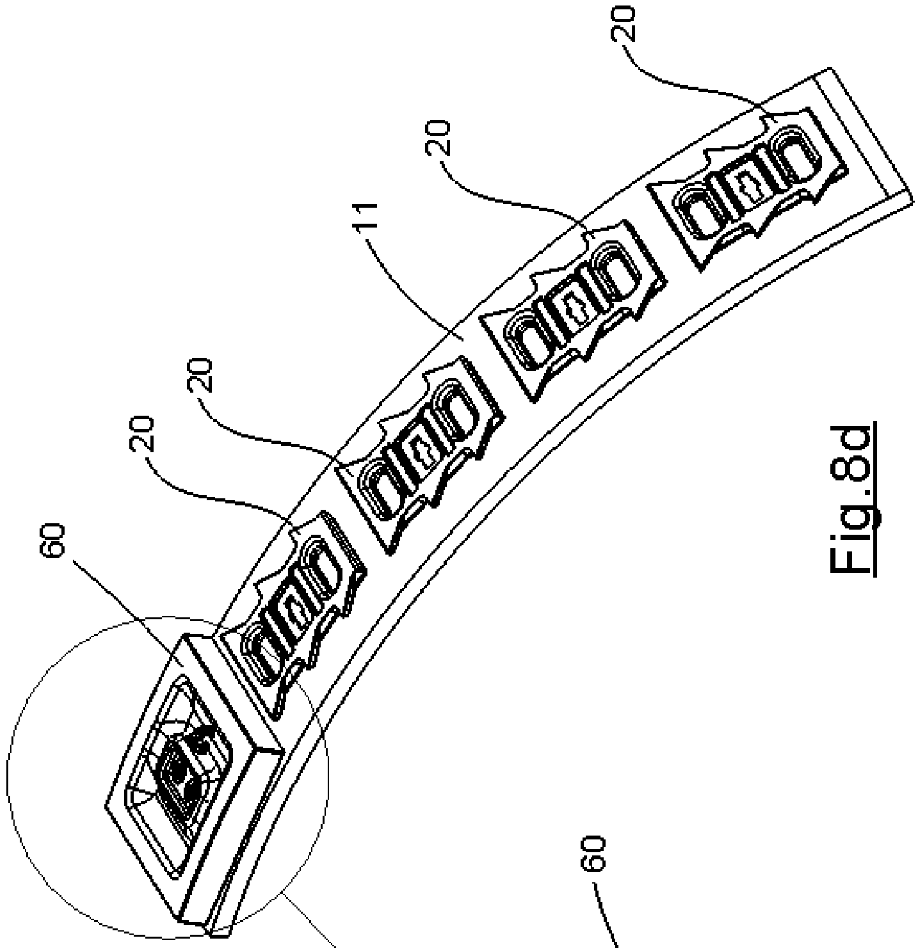
FIG. 8*d* and FIG. 8*e* are pictorial representations of two wear pads already fitted to two weld on plates.
Figure 8E:
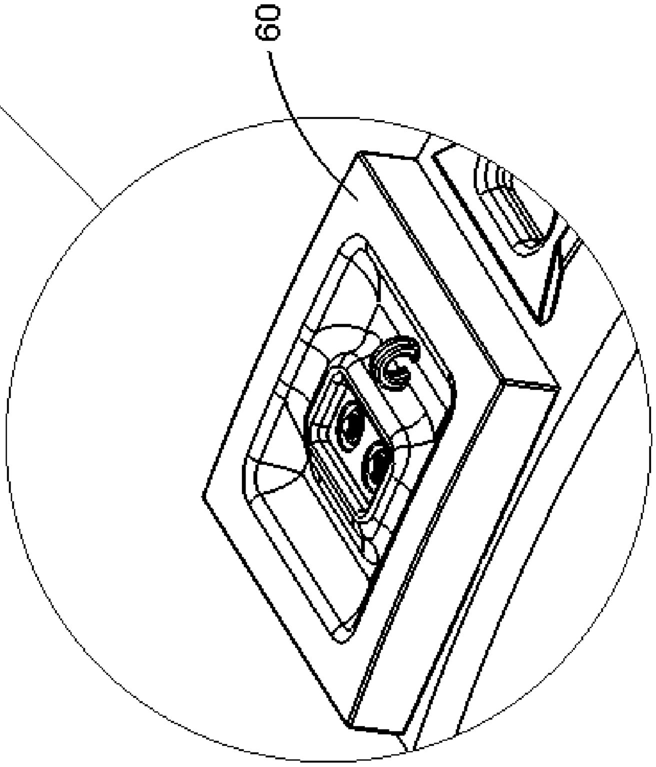
Figure 8G:
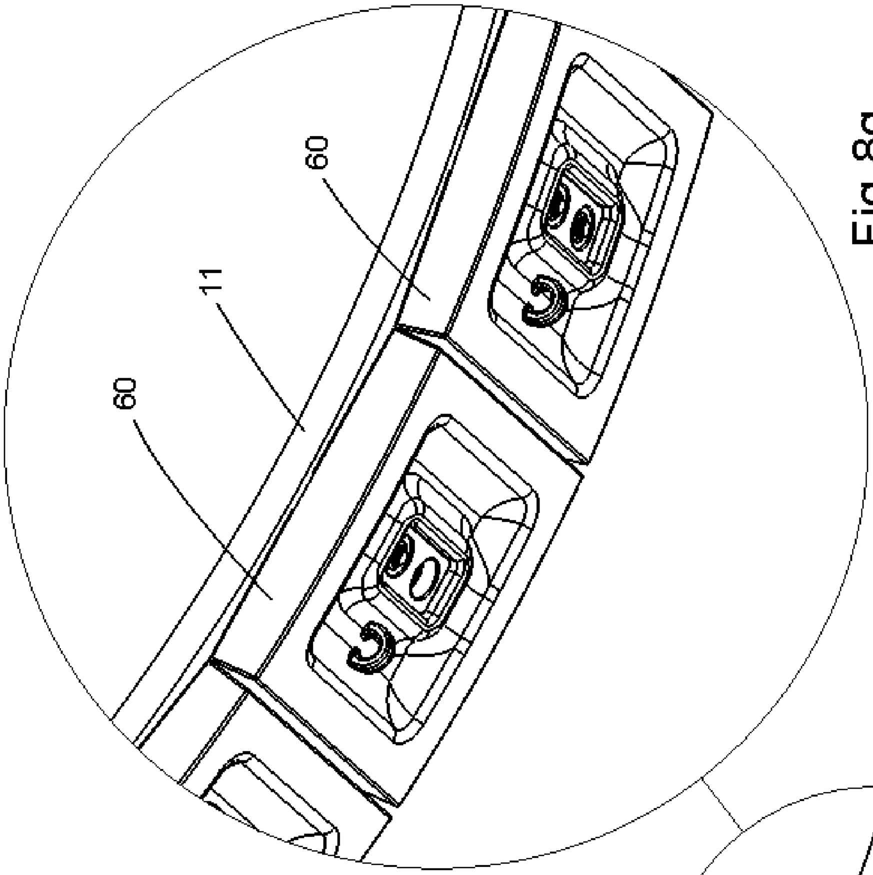
FIG. 8*f* and FIG. 8*g* are pictorial representations of a wear pad fitted to one mount in a column of weld on mounts.
Figure 8F:
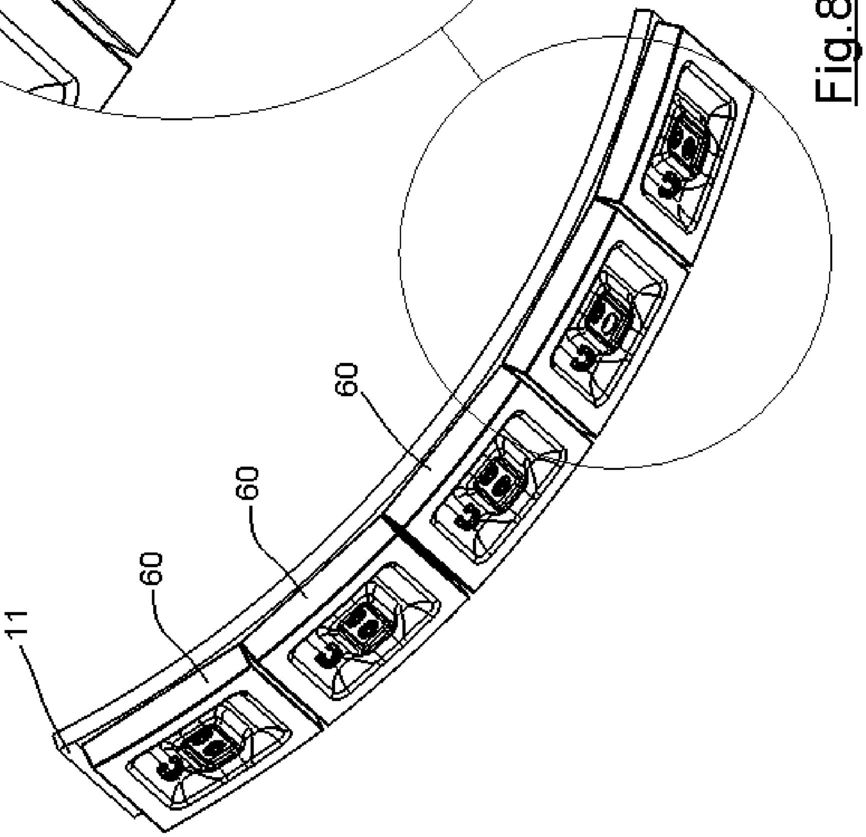
Figure 9:
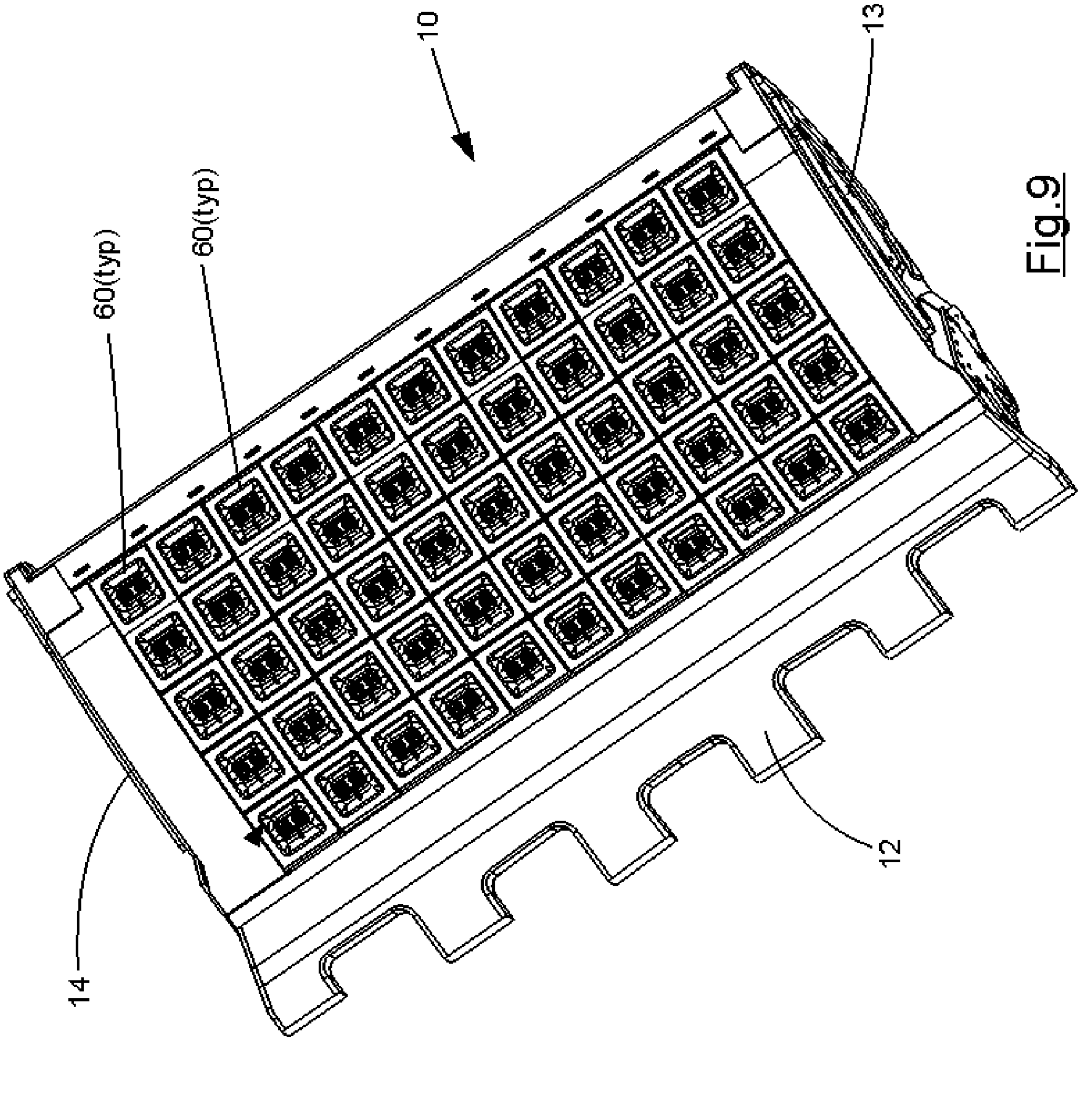
FIG. 9 is a pictorial representation of the underside of the face shovel bucket with wear pads fully fitted across the bottom face.

Referring to FIGS. 6D-6F, once the plow bolts are in position, the locking member is slid onto the two bolts 101 and then the nuts 102 are screwed onto the bolts and tightened thereby pulling the locking block into the passage 86 of the wear pad 60 and partially through that passage to engage in recess 48 of the mount 20. It will be appreciated that movement of the wear pad relative to the mount is prevented by engagement of the leading face of the locking member with the leading face of recess 48 and passage 86 as well as engagement of the trailing face of the locking member with the trailing face of recess 48 and passage 86.

As can be seen in FIG. 4*b*, a plurality of blind recesses 85 are provided in the wear pad and those passages terminate at a plane parallel to inner face 67 to provide a suitable wear indicator to the extent that a machine operator will know when to replace the pads when those passages become visible.

Figure 10:
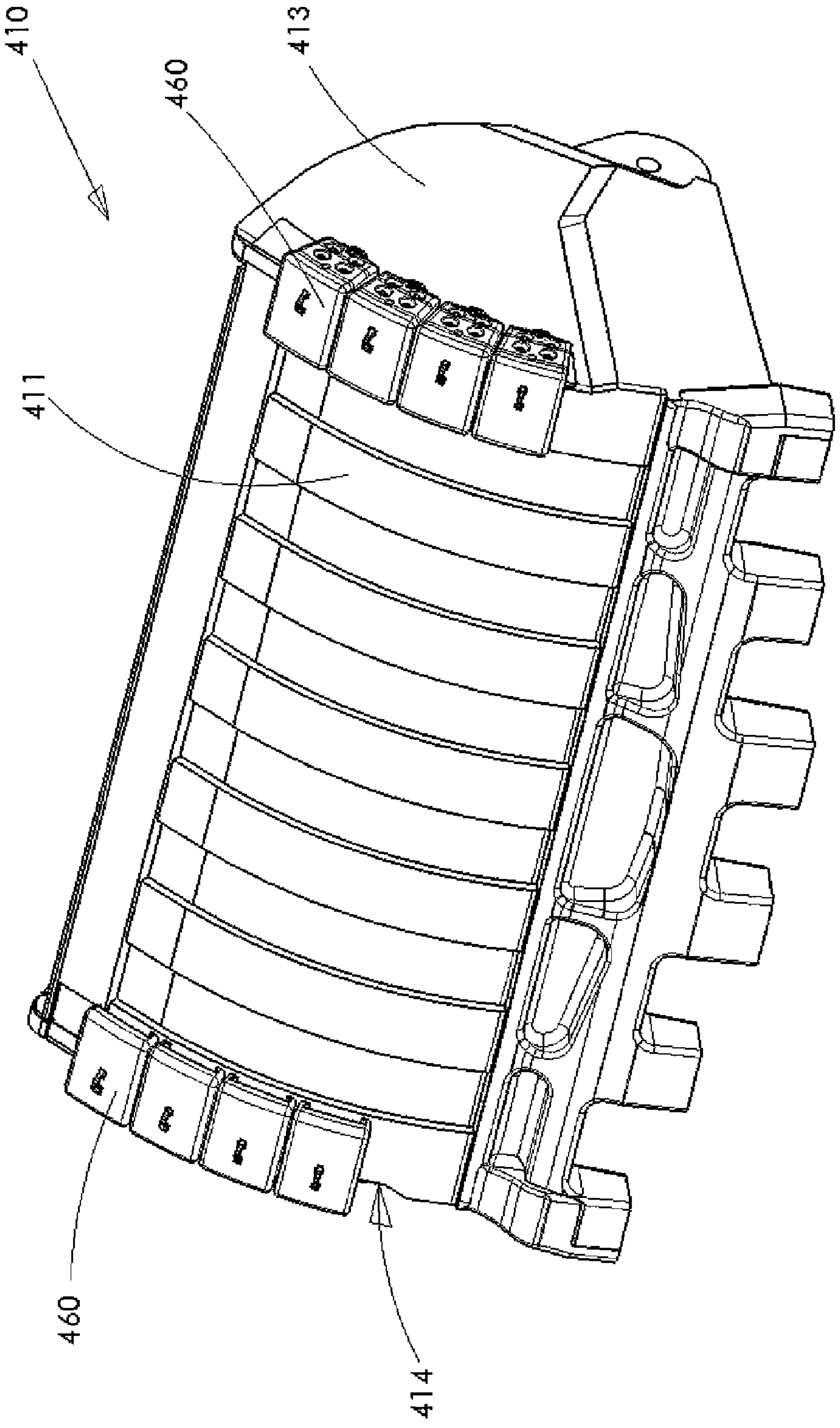
FIG. 10 is a pictorial representation of the bottom of a face shovel bucket with wear pads and heel shrouds according to the invention secured to the outer face and the side walls of the bucket.
Figure 11:
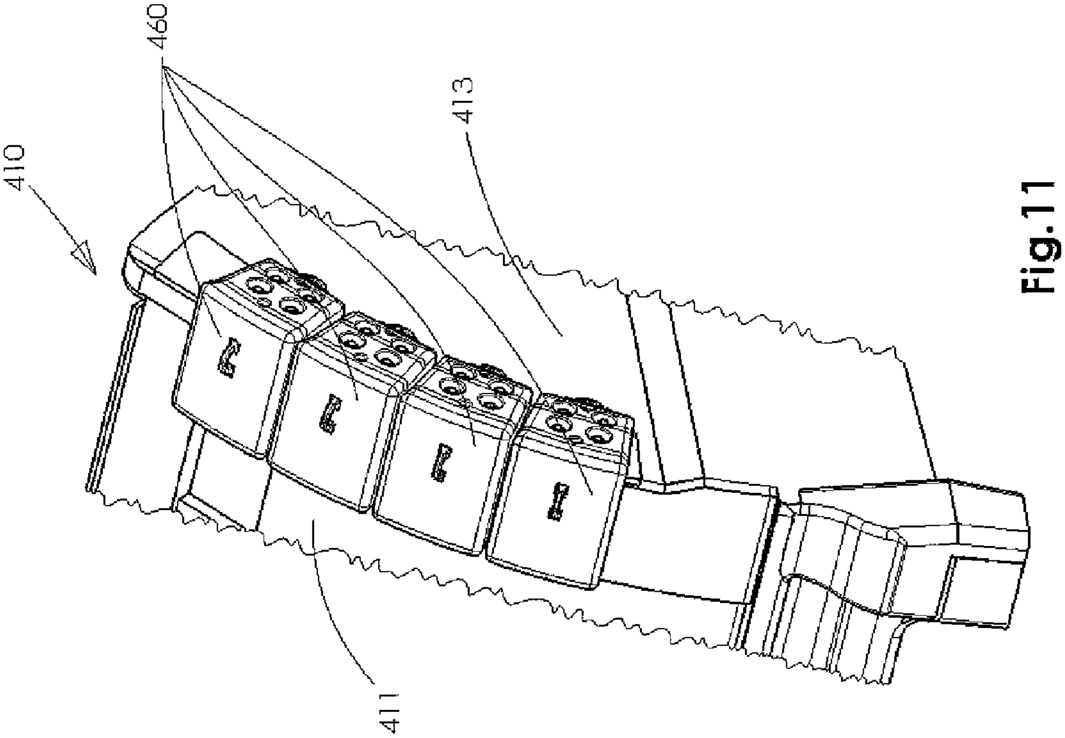
FIG. 11 is an enlarged view of a portion of the bucket shown in FIG. 10 showing the heel shroud fitted on a mount according to the invention.

The face shovel bucket 410 illustrated in FIG. 10 is the same as the face shovel bucket 10 illustrated in FIG. 2 except that it has been fitted with heel mounts 400 according to the invention and heel shrouds 460 according to the invention as will be now described in more detail.

Figure 12:
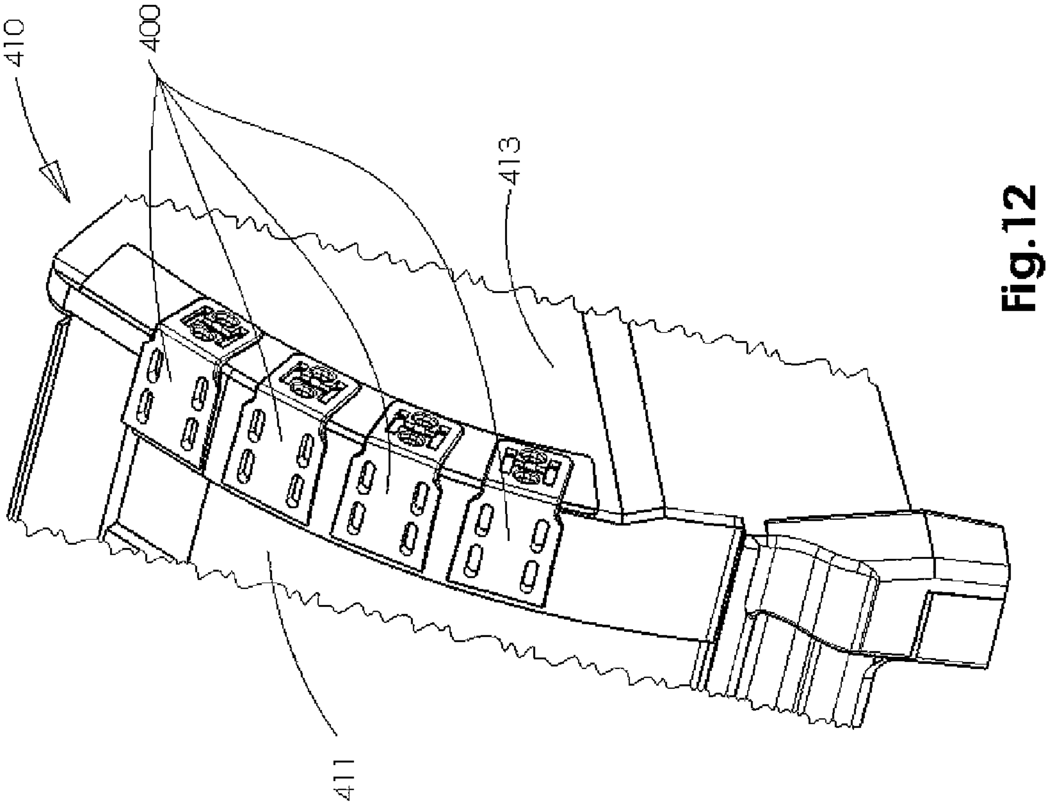
FIG. 12 is an enlarged view of the portion shown in FIG. 11 with the heel shroud removed from the mount according to the invention.

The heel mount 400 illustrated in FIGS. 13*a* to 13*f* is manufactured in one piece of cast steel and has a first portion 402 of generally rectangular form and a second portion 403 contiguous with the first portion and extending therefrom at right angles, whereby the first portion 402 can rest against the outer face of the bottom (or floor) 411 of the bucket 410 and the second portion 403 can rest against the outer face of the side wall 413 or 414 of the bucket as can be seen in FIG. 12 where the heel shrouds have been removed. Suitably, in other embodiments of the invention, the second portion extends from the first portion at an acute angle or an obtuse angle to suit the angle which the side wall of the bucket makes with the floor.

The first portion of the heel mount 400 has an upwardly tapered leading edge portion 422 and upwardly tapered opposite trailing edge portion 423 having respective outer edges 422*a* and 423*a* which in use are spaced from the outer face of the bucket floor to allow the heel shroud to slide thereon in much the same manner as previously described in relation to the wear pads. Suitably, the edge portions extend away from the second portion 403 and terminate at a free inner end 424 which in use will abut or almost abut wear pads of the type shown in FIG. 2 which are mounted to the outer face of the bucket floor.

Although each edge portion 422 and 423 is of a continuous form from the second portion 403 to the free inner end 424, in other embodiments of the invention, they are comprised of two separated protuberances having much the same form as the protuberances of the wear pad mounts illustrated in FIG. 3.

Figure 13B:
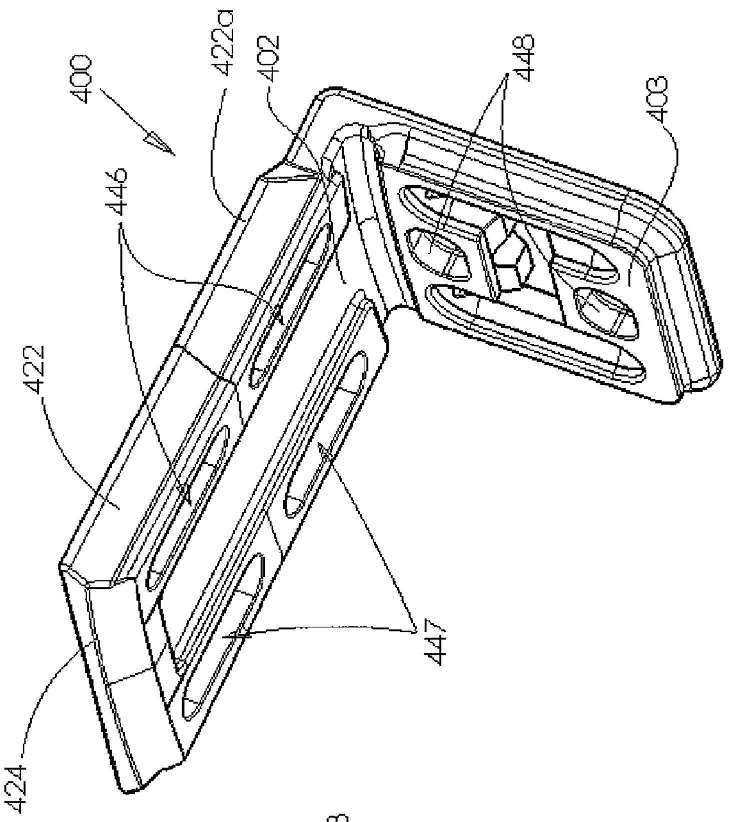
FIG. 13*b* is a pictorial representation of the weld-on mount of FIG. 13*a* looking at the inner face from the inner end.
Figure 13A:
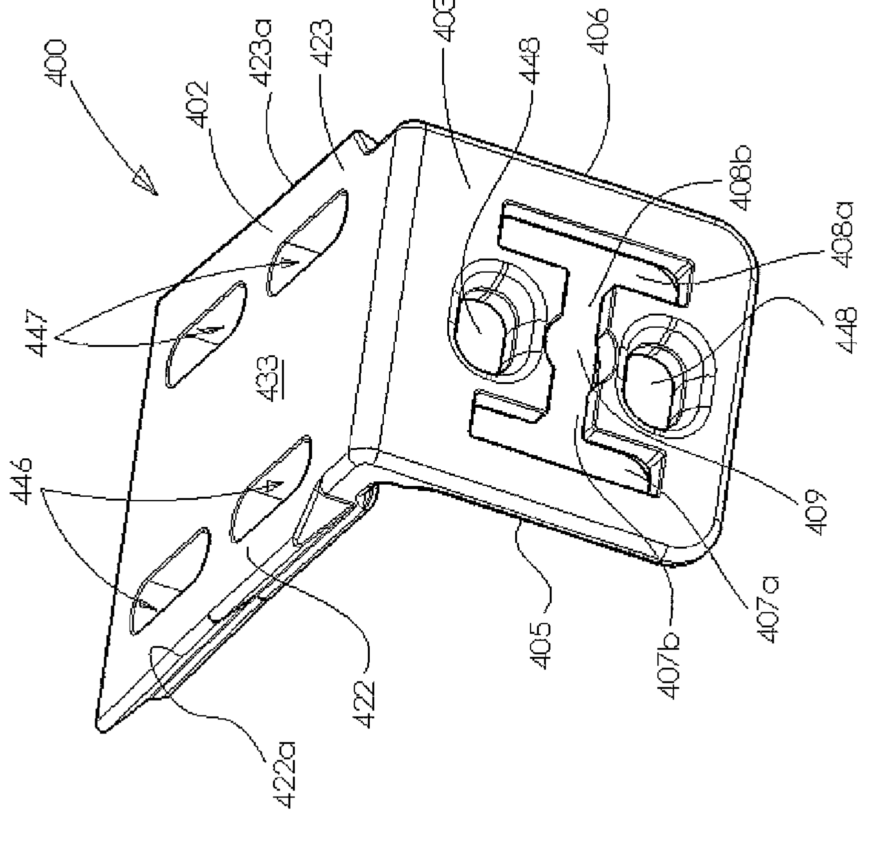
FIG. 13*a* is a pictorial representation of a weld-on mount for mounting a heel shroud according to the invention looking at the outer face from the inner end.
Figure 13D:
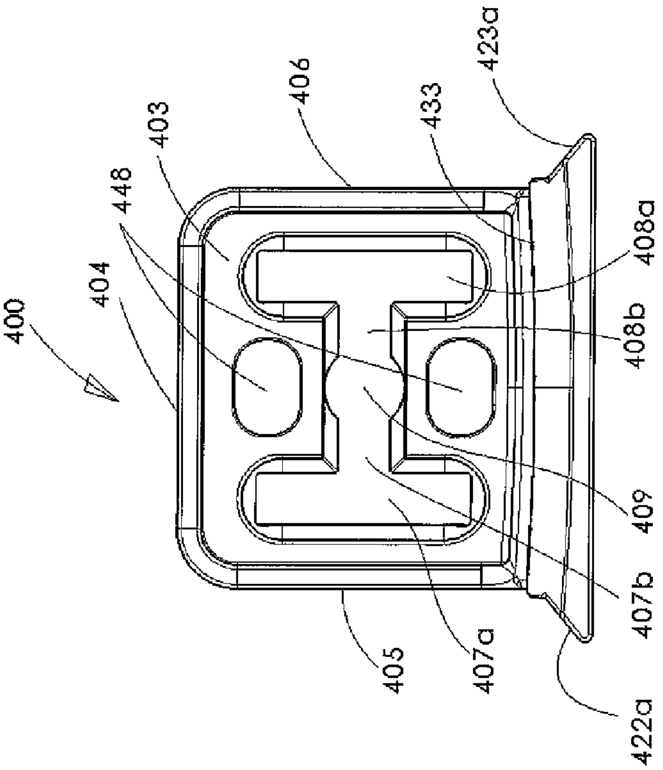
FIG. 13*d* is a plan view of the weld-on mount of FIG. 13*a* looking at the inner face.
Figure 13C:
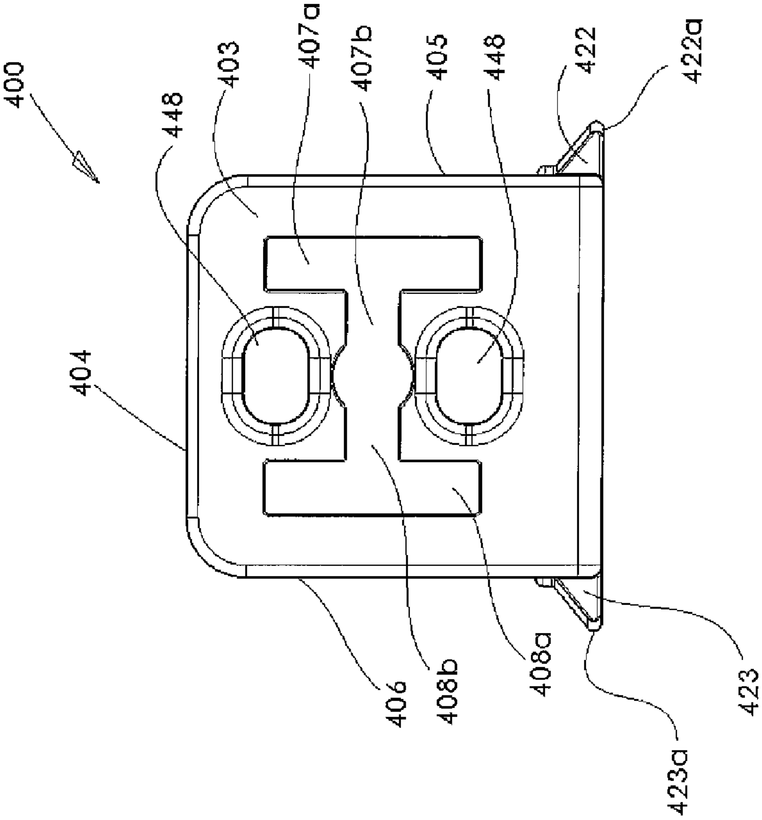
FIG. 13*c* is a plan view of the weld-on mount of FIG. 13*a* looking at the outer face.
Figure 13F:
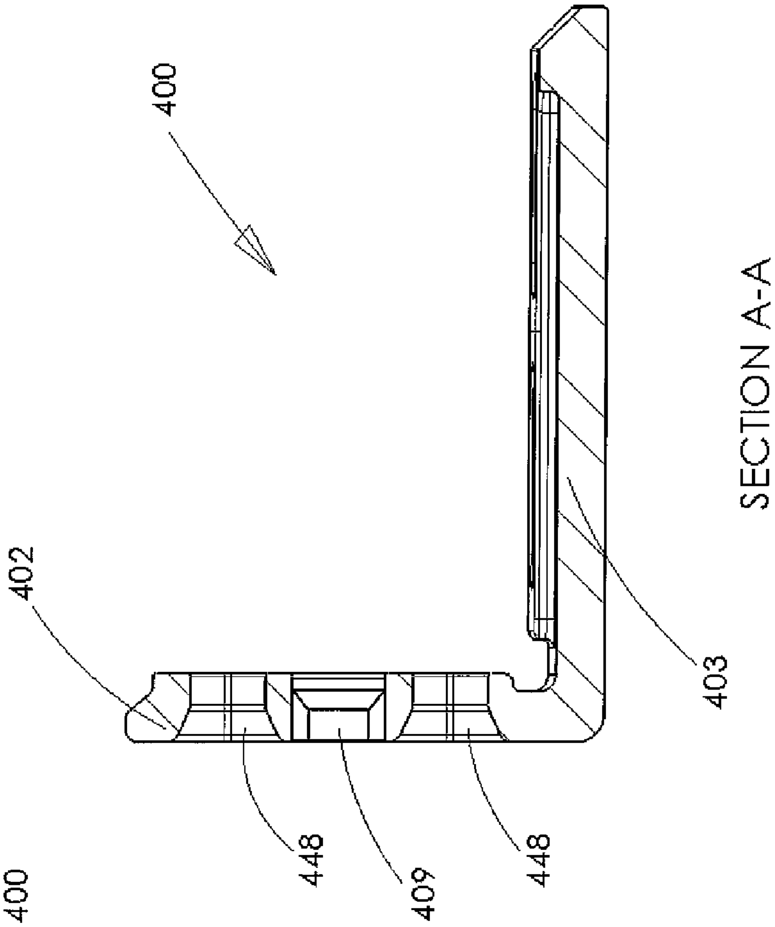
FIG. 13*f* is a cross-sectional side view of the weld-on mount of FIG. 13*a* from one side along line A-A.
Figure 13E:
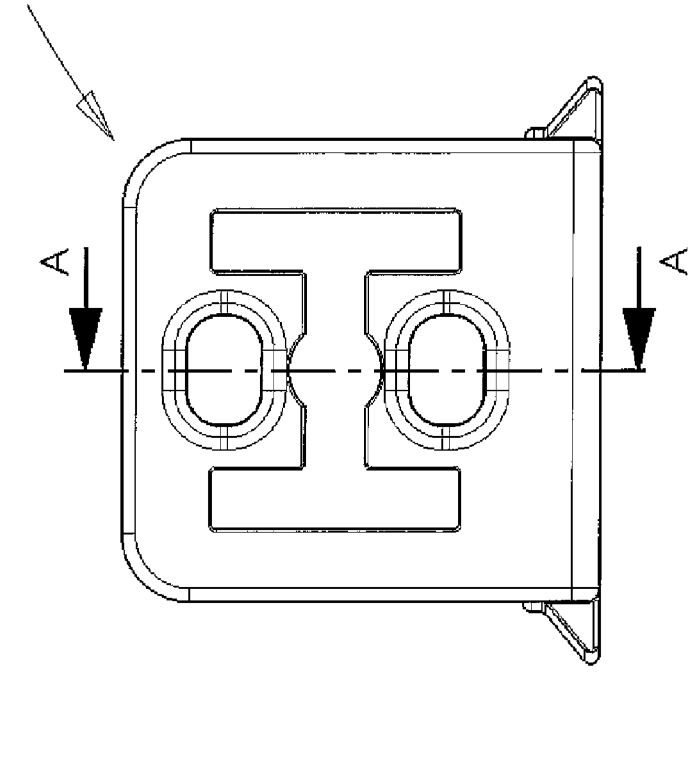
FIG. 13*e* is an end view of the weld-on mount of FIG. 13*a* from the trailing end.

Suitably, the first portion 402 of the mount 400 may have a slightly curved inner face 433 as can be seen in FIG. 13*d* which is adapted to rest on the curved wear face of the panel to which the mounts are to be secured by welding. However, in buckets where the panel to be protected is flat no curvature is required. In some embodiments of the invention, both the inner face and the outer face may be curved to suit the curvature of the bucket.

Two pairs of spaced apart passages 446 and 447 (the welding passages) extend fully through the first portion 402, one pair adjacent the leading edge and one pair adjacent the trailing edge, the passages being of sufficient width to allow a MIG welding nozzle to fully weld the mount to the panel to which it is to be affixed by way of a fillet weld all around the internal perimeter of the passages.

The second portion 403 of the mount 400 has similar spaced apart welding passages 448 located centrally thereof for welding the mount to the side panel of the bucket.

The second portion 403 is substantially rectangular in form extending away from the first portion 402 and is generally defined by two parallel spaced apart side edges 405 and 406 which terminate in a free end edge 404 distal from the first portion 402.

Two spaced apart parallel slots 407*a* and 408*a* are provided in the second portion adjacent the respective side edges and parallel thereto for supporting a bolt head therein. The two slots 407*a* and 408*a* open to a centrally located passage 409 which has a diameter substantially larger than the width of each passage via entry slots 407*b* and 408*b* in a manner similar to that shown in FIG. 3. In another version, the two slots 407*a* and 407*b* open to the respective side edges 405 and 406 via respective entry slots which extend generally at right angles to their respective support slots in which case the access passage 409 is not required.

Advantageously, each slot is configured to house the head of a number of plow bolts and for that purpose has a wider tapered portion configured to engage the conical portion of the plow bolt head contiguous with a narrower rectangular portion (when viewed in cross section) to engage the square part of the plow bolt head. At the inner side the conical (or tapered) face joins another flat face configured to house the cylindrical part of the plow bolt head. The slot is suitably configured such that the plow bolts can be fitted after the mount has been welded to the bucket side wall and the bolt is retained in the slot by engagement of the end of the head against the outer face of the bucket wall. That is to say, the face of each slot has two opposed parallel generally rectangular faces which are shaped and sized to slidingly receive and engage the opposite side faces of the square part of the head of a selected plow bolt to prevent rotation of the plow bolt about its longitudinal axis.

It will be appreciated that a number of plow bolts can be fitted to each slot via the entry slot and slidingly moved into the support slots and therealong to a predetermined position.

Typically, the predetermined positions will be at the blind end of the support slot which will be described in more detail later. In this particular embodiment, each slot accommodates two bolts which are fitted to the opposite end portions of the respective slots.

The wear part 460 illustrated in FIGS. 14*a* to 14*g* is manufactured as one piece of cast steel with a first portion 461 and a second portion 462 extending from an end portion of the first portion and contiguous therewith substantially at a right angle. The first portion is of generally rectangular form with a leading edge portion 463 and an opposite trailing edge portion 464. Similarly, the second portion has a leading edge portion 465 and a trailing edge portion 466 which are contiguous with the leading and trailing edge portions of the first portion. The outer faces of the contiguous edge portions effectively form a generally "L" shaped face.

The leading and trailing edge portions include opposed protuberances extending inwards towards each other to define lip portions 463*a* and 464*a* which are configured to engage the respective leading and trailing edge portions 422 and 423 of the first portions of the mount to hold the first portion of the heel shroud onto the first portion of the mount when in the engaged position.

The first portion 461 has an outer face 467 adapted to bear against ore or spoil to be moved and an inner face 468 which extends between the leading and trailing edge portions 463 and 464 and is adapted to rest on or adjacent the mount 400 when the mount is secured to a wear panel to be protected.

The second portion 462 has a recess 469 extending between the leading and trailing edge portions 465 and 466 which is configured to receive therein more or less the whole of the second portion 403 of the mount 400. Suitably, the recess is defined in part by an inner face 469*a* which is configured to abut the outer face 403*a* of the second portion of the mount.

Figure 14A:
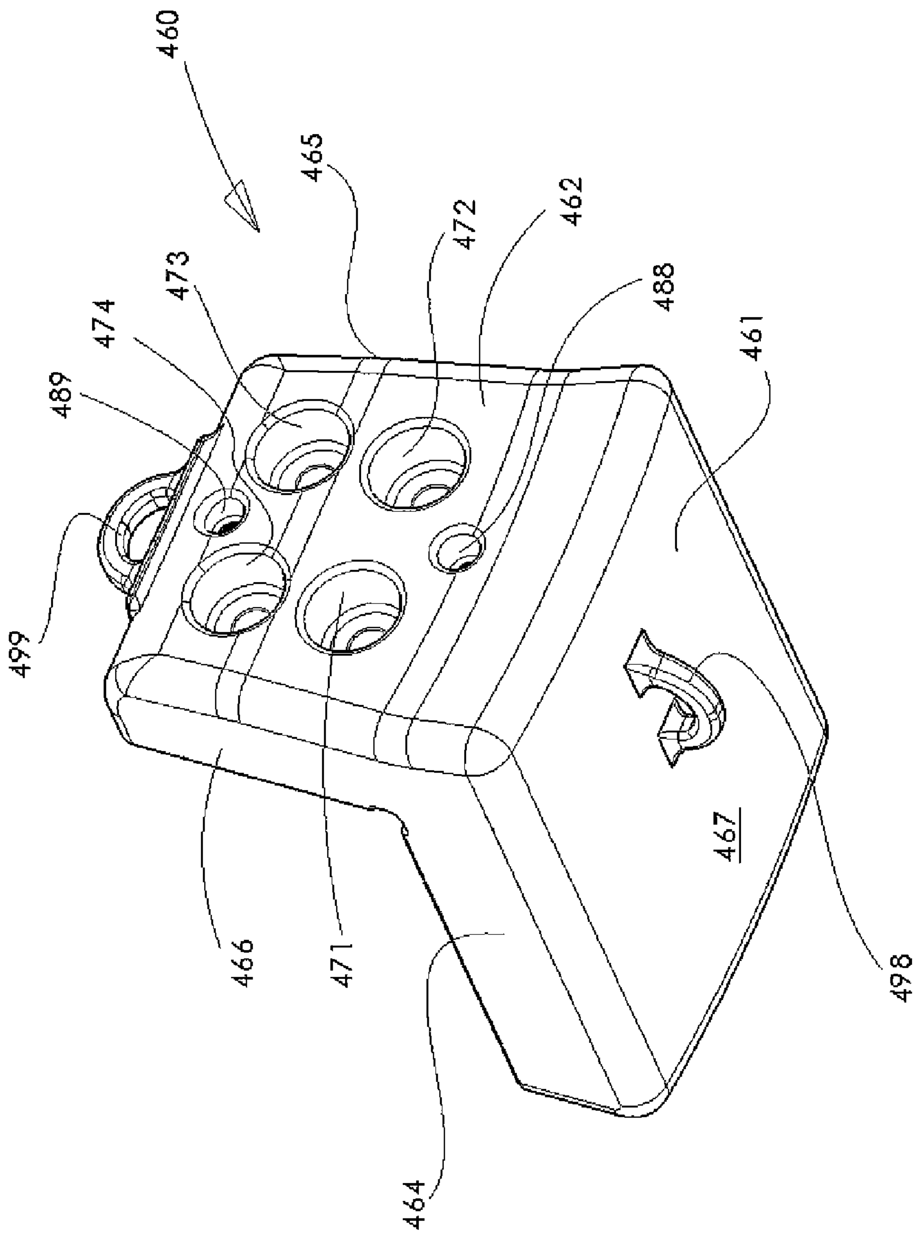
FIG. 14*a* is a pictorial representation of a wear part being a heel shroud according to the present invention looking at the wear face (outer face) from the trailing end.
Figure 14B:
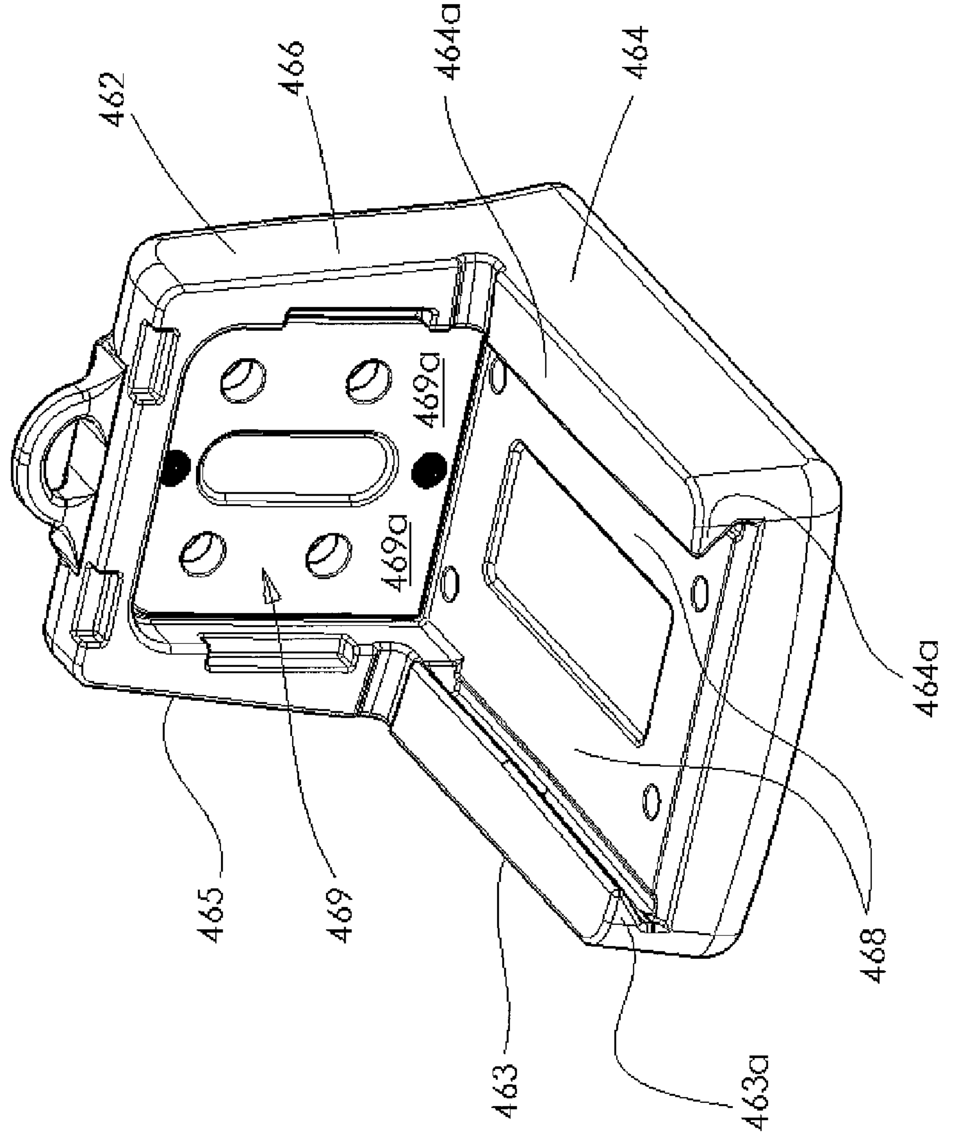
FIG. 14*b* is a pictorial representation of the heel shroud of FIG. 14*a* looking at the inner face (the face which engages the weld on mount)
Figure 14C:
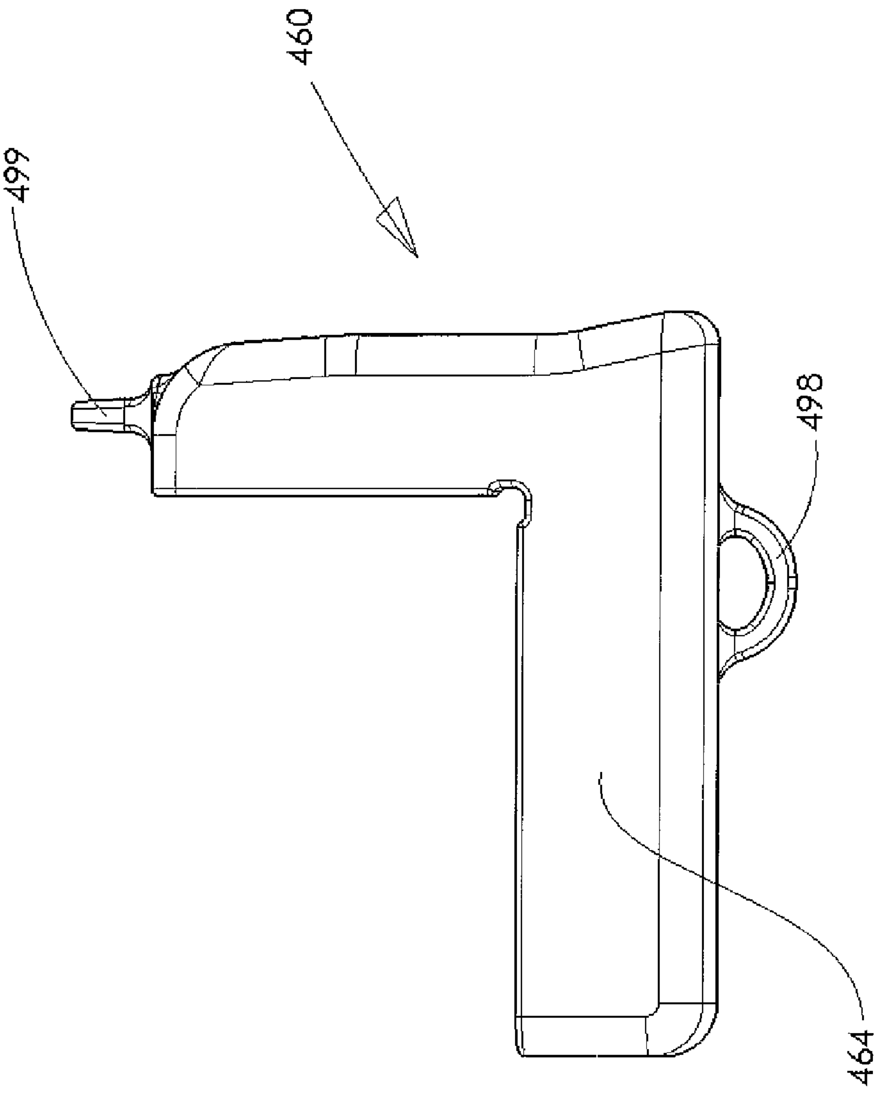
FIG. 14*c* is an end view of the heel shroud of FIG. 14*a* from the trailing end.
Figure 14D:
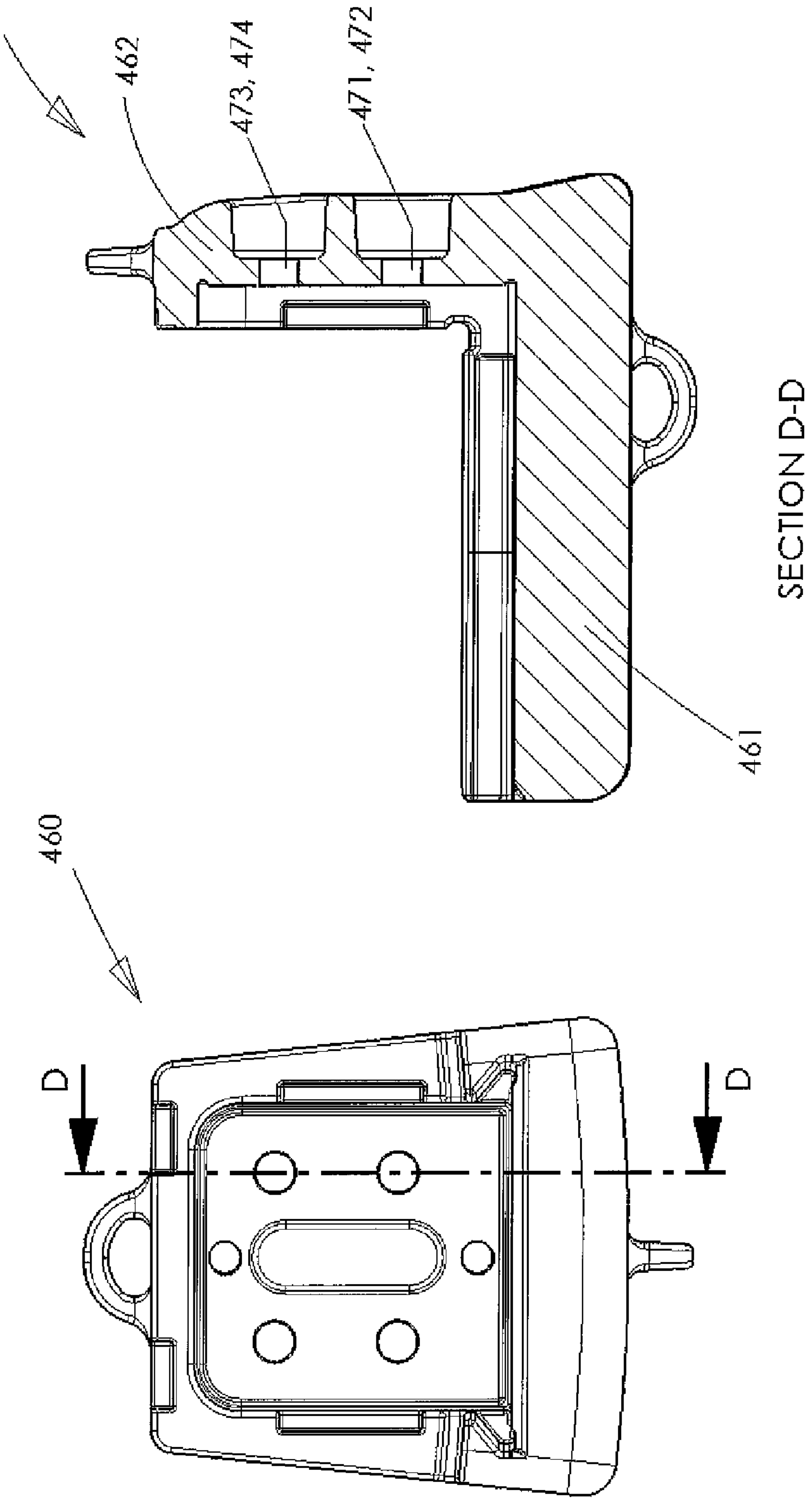
FIG. 14*d* is a sectional side elevation along line B-B of the heel shroud of FIG. 14*a;*
Figure 14F:
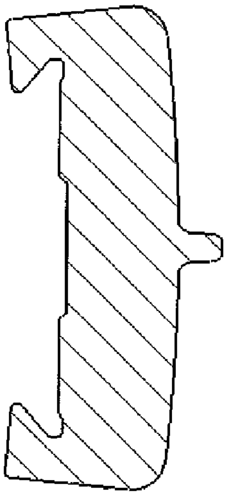
FIG. 14*f* is a sectional end view of the heel shroud of FIG. 14*a* along line C-C.
Figure 14E:
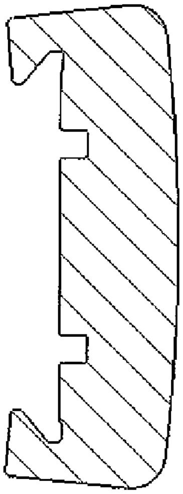
FIG. 14*e* is a plan view of the inner face of the heel shroud of FIG. 14*a;*
Figure 14E:
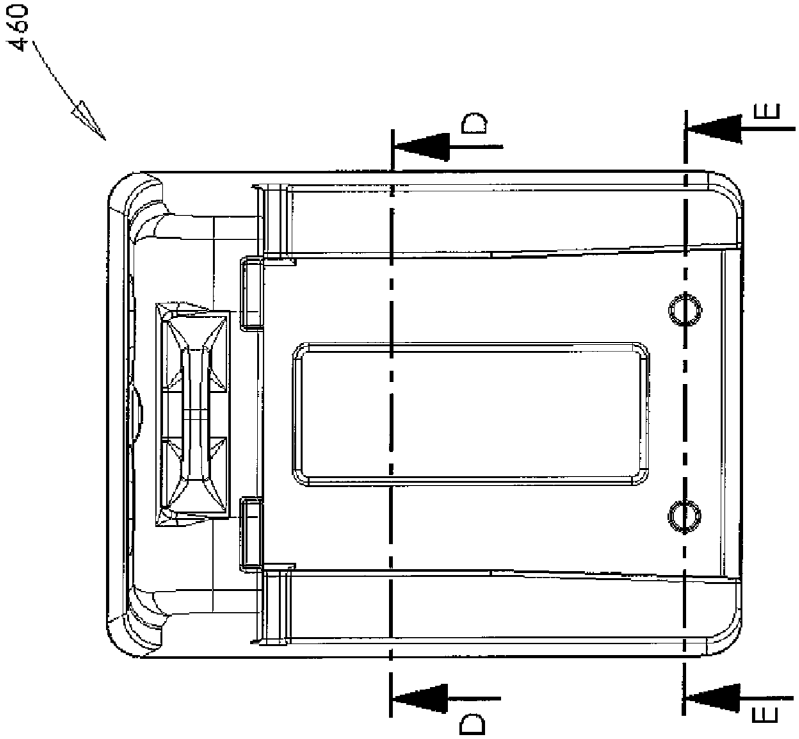
Figure 14H:
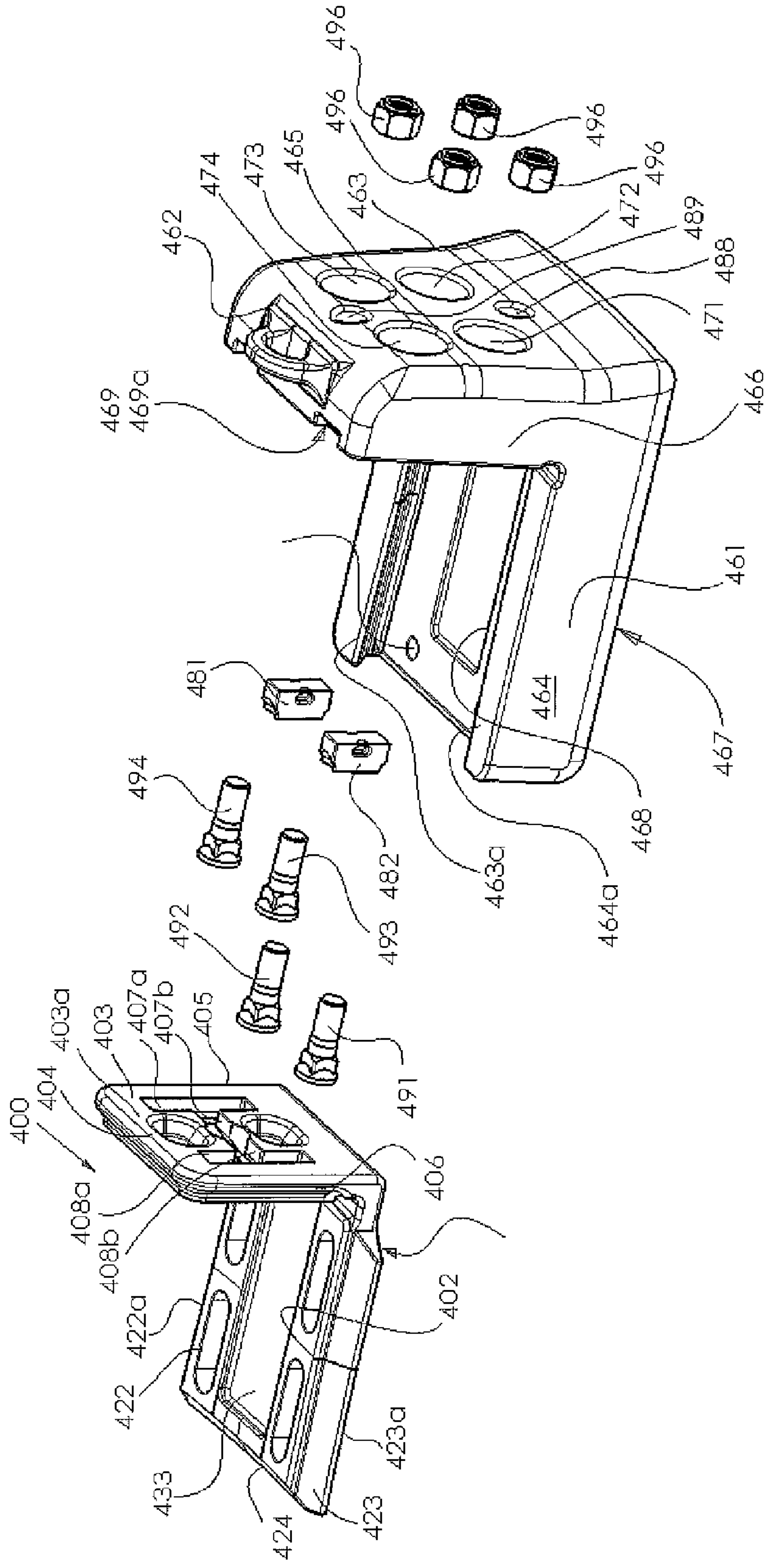
FIG. 14*h* is a pictorial representation of the weld-on mount of FIG. 13*a* and heel shroud of FIG. 14*a* with other components in line for assembly.

Four bolt holes or passages 471 to 474 are provided in the second portion 462 of the heel shroud and are arranged to align substantially with the end portions of the bolt support slots 407*a* and 407*b* in the second portion of the mount 400, whereby when fitted the bolts 491 to 494 respectively will extend from the slots, and through the second portion of the heel shroud whereupon nuts 496 can be screwed onto the respective bolts thereby locking the heel shroud to the mount. Threaded jacking holes 488 and 489 are also provided in the second portion 462 to assist with removal of the heel shroud from the mount when required for replacement. Lifting lugs 498 and 499 are provided on the respective first and second portions to assist with installation of the heel shrouds on the mounts, As can be seen in FIG. 14*h*, before the heel shroud is fitted to the mount, bolt retainer 481 is fitted between the two bolts in slot 407*a* and bolt retainer 482 is fitted between the two bolts in slot 408*a* to locate the respective bolts at their predetermined positions at the ends of the respective slots.

Advantageously, the bolt retainers are shaped to fill the slots between the respective bolts so that the outer face of each retainer is level with the face 403 of the second portion of the mount, whereby the inner face 469*a* of the heel shroud will engage with the bolt retainers and hold them in place. It will also be appreciated that the ends of the retainers are shaped to engage the opposed flat faces of the square portion of the bolt heads and the adjacent conical portions. Consequently, the bolt heads will be effectively fully engaged on all flat sides of the square portion and fully around the conical portion. Effectively, the arrangement of the slots and the bolt retainers creates an artificial bore shaped to fully engage the bolt head and engagement of the bolt retainer by the inner face of the wear part holds the bolt retainer securely in place.

It will be appreciated that the heel shroud is fixed in position by several mechanisms. Firstly, the lips or protuberances 422 and 423 of the mount engage with the lips 463*a* and 464*a* of the heel shroud to fix the shroud against movement perpendicular to the bucket floor, secondly, the second portion of the mount engages in the recess 469 of the heel shroud thereby inhibiting movement of the second portion of the heel shroud in a leading or trailing direction, and thirdly, the bolts lock the heel shroud to the mount and inhibit sideways movement of the heel shroud.

Figure 15B:
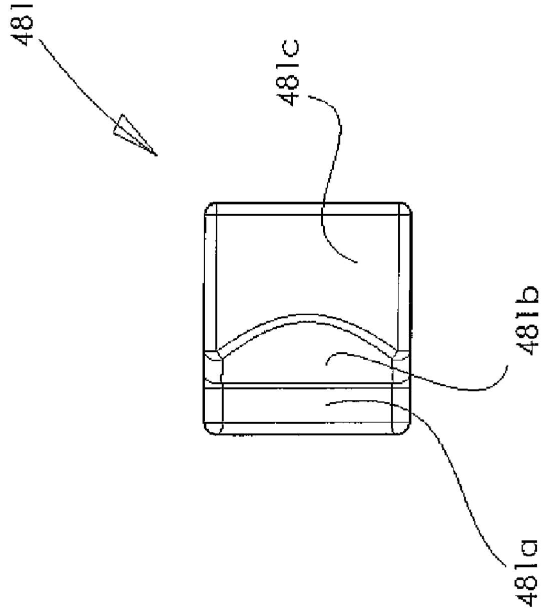
FIG. 15*b* is a plan view of the component of FIG. 15*a;*
Figure 15A:
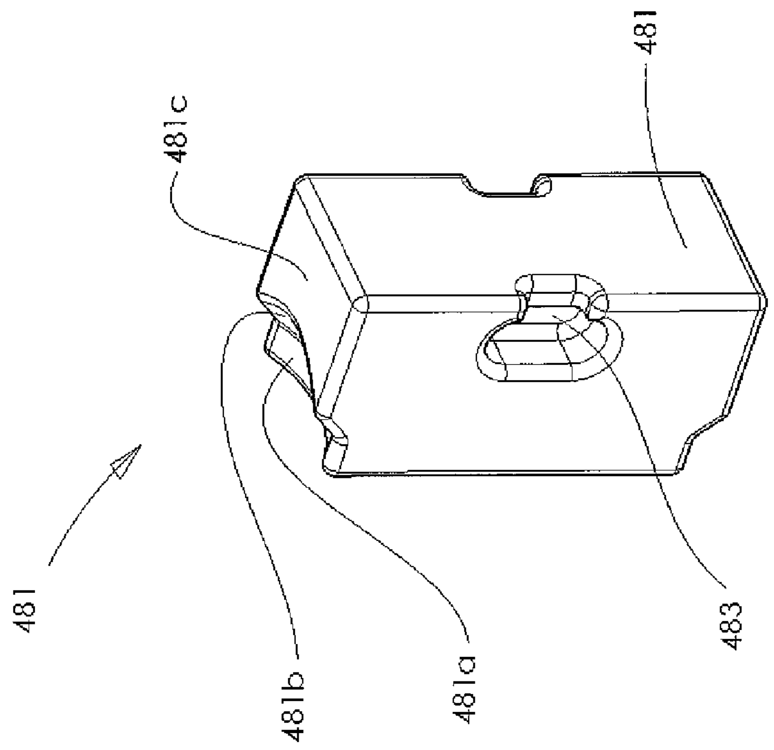
FIG. 15*a* is a pictorial representation of a bolt retainer component for locking the heel shroud of FIG. 14*a* to the mount as seen in the assembly of FIG. 14*h;*
Figure 16:
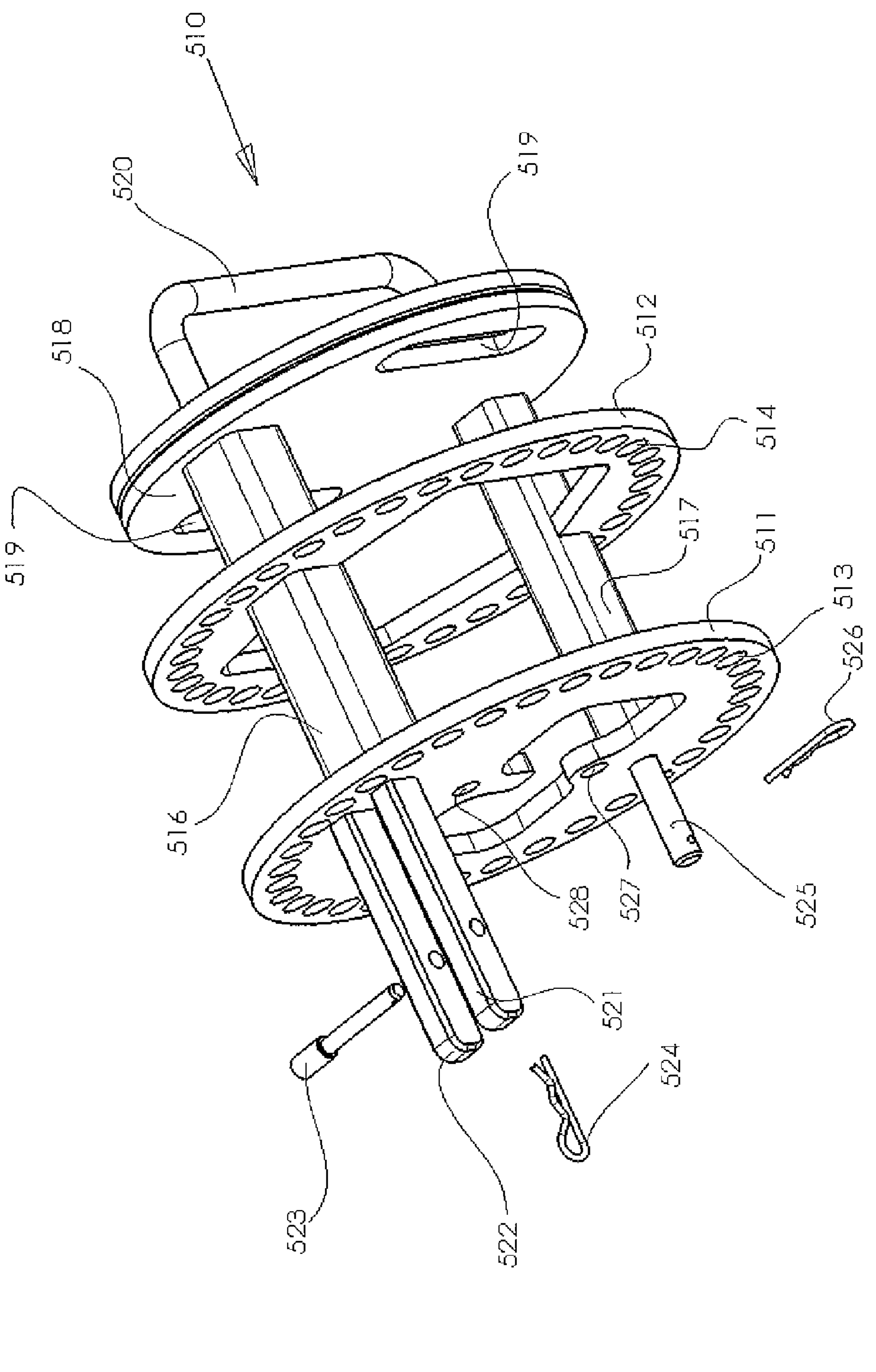
FIG. 16 is a pictorial representation of a device for assisting the installation and removal of heel shrouds according to the present invention.

The bolt retainers 481 and 482 are identical so only one will be described. They are substantially rectangular prisms with identical end portions suitably shaped to partially engage with the heads of each pair of plow bolts 491 and 493 or 492 and 494 (as the case may be). As can be seen in FIG. 15, the end portion is cast or machine with a cylindrical segment 481*a* corresponding to a corresponding segment of the cylindrical head portion of a plow bolt and a contiguous conical segment 481*b* corresponding to the adjacent conical portion of the plow bolt which in turn is contiguous with a flat face 481*c* corresponding to one of the flat faces of the plow bolt head. A passage 483 extends through the bolt retainer to form a lifting point.

Suitably, when a plow bolt is fitted to slot 407*a* or slot 408*a*, one flat face of the head will engage the flat face defining the end of the slot, two opposite flat faces of the head will engage the flat side faces defining the slot and the remaining flat face of the head will engage the flat end face 481*c* of the bolt retainer. Similarly, the conical face will engage the corresponding conical face about the slot and the conical face of the bolt retainer while the cylindrical face of the bolt head will engage the cylindrical face about the slot and the segment of cylindrical face of the bolt retainer. Advantageously, the bolt head will be fully supported, and the bolt retainer will be held in position in the slot by the wear part in one direction and by the plow bolt at the opposite end of the slot.

The fitting device 510 illustrated in FIG. 15 includes a front round plate 511 and a similar rear round plate 512 spaced from the front plate. The front plate has a ring of holes 513 therein adjacent its periphery and rear plate 514 therein has a corresponding ring of holes 515 therein. The holes in the two plates are axially aligned and suitably sized to mount a shackle thereto for connection to a hoist or crane by a chain or other suitable rigging.

The two round plates are fixed to each other by two diametrically opposite elongate rectangular members 516 and 517 extending between the plates and beyond the rear plate and is welded thereto. Another plate 218 is mounted to the rectangular members and spaced behind the rear plate and parallel thereto. That plate has opposite hand holes 519 and a rearwardly extending handle to provide for manually adjusting the position of the device.

Two spaced apart elongate lifting members 521 and 522 extend from the front plate perpendicular thereto and a removable pin 523 extends through aligned holes extending through the outer end portions of the two lifting members and is secured thereto by an "R" pin 524. Additionally, a stabilising member or pin 525 extends forward from the front plate diametrically opposite the two lifting members.

Figure 17:
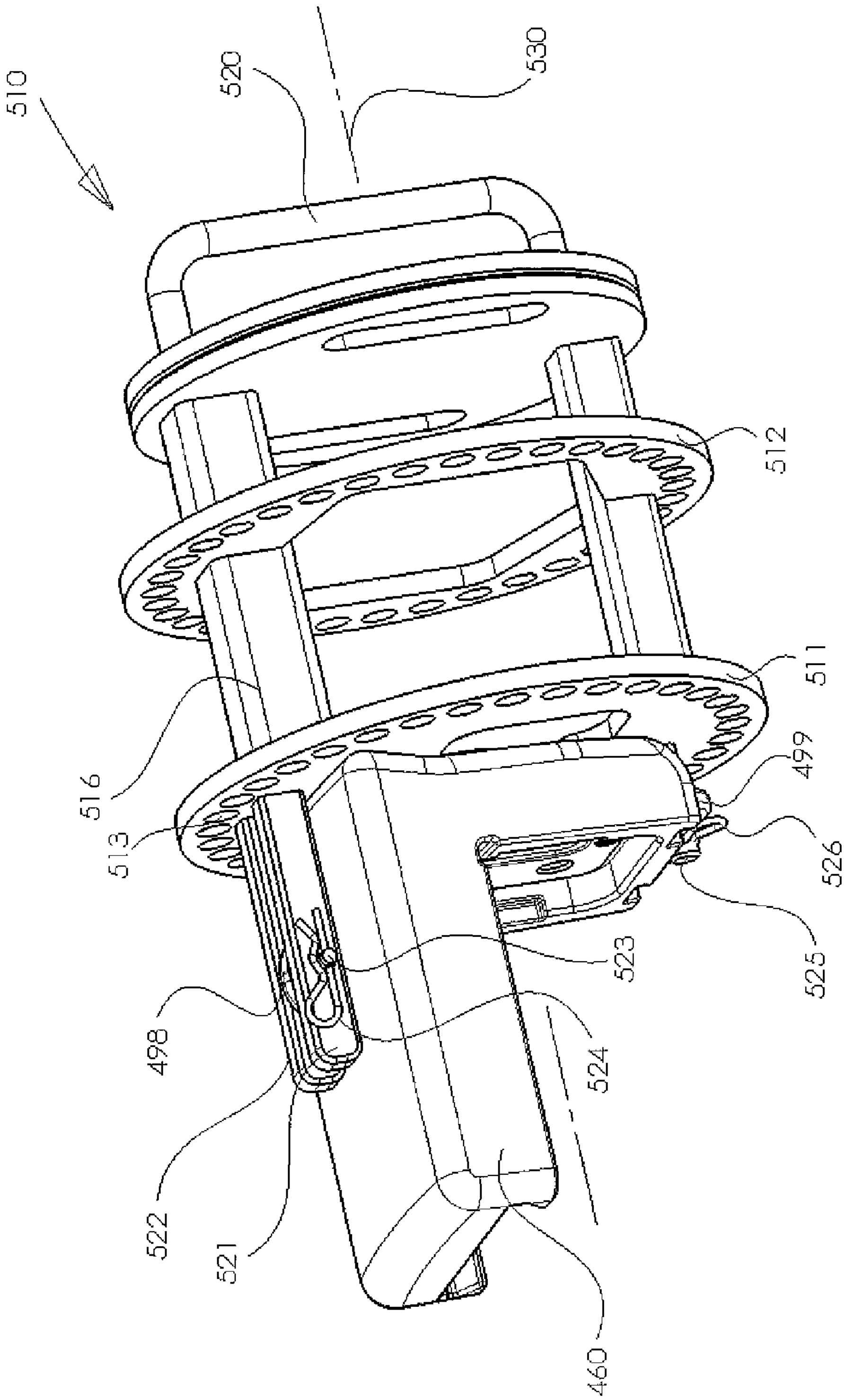
FIG. 17 is a pictorial representation of the device of FIG. 16 with the heel shroud of FIG. 14*a* mounted thereto.

As can be seen in FIG. 17, a heel shroud 460 is secured to the front plate in three locations, firstly by way of pin 523 extending through upper lifting lug 498 and secondly by pin 525 extending through lower lifting lug 499 and been secured by R pins 523 and 526 respectively. Thirdly, the heel shroud is secured by one or two bolts passing through holes 527 or 528 in the front plate of the device depending on the size of the heel shroud and screwing into the jacking holes 488 and 489.

In order to fit a heel shroud to a bucket, the heel shroud is mounted to the front plate as shown in FIG. 17 and the device together with the mounted heel shroud is lifted by fitting a D shackle to one of the holes 513 in the front plate. The hole selected for the D shackle depends on the position of the heel shroud being fitted, that is, the angle which the shroud makes to the heel of the bucket. In that respect, the hole is selected so that when the device is lifted, the heel shroud will rotate about the longitudinal axis 530 of the device through an arc depending on the hole selected.

In order to remove the device from the newly fitted heel shroud, the D shackle is moved to a selected hole in the rear plate instead of the front plate because the device without the heel shroud will be much lighter and consequently the lifting point should be further from the bucket. Once the D shackle has been moved the bolt/s are removed from the jacking holes to fully release the device.

While the foregoing description has been given by way of illustrative example of the invention, it will be understood that the invention may be embodied in many other forms and all such forms are deemed to fall within the broad scope and ambit of the invention as defined by the appended claims.

What is claimed is:

1. A protection system including:

a mount adapted to be fixed to a wear panel of equipment or machinery, said mount including a first portion having a face adapted to rest against or engage a first face of the wear panel to be protected, said first portion including fixed engagement means adapted to slidingly engage with complementary fixed engagement means of a wear part, and a second portion of said mount extending from said first portion at or near one end thereof and adapted to engage an adjacent second face orthogonal or substantially orthogonal to the first face of the wear panel, said second portion having one or more passages therethrough configured to allow entry of a respective head of one or more bolts in one direction and lateral sliding movement of the one or more bolts along the one or more passages in a direction orthogonal to said one direction to a predetermined position along said one or more passages, such that the one or more bolts extend outwardly from the second portion of the mount;

said wear part adapted to be releasably mounted to said mount, said wear part having a first wear portion including first fixed engagement means adapted to slidingly engage the fixed engagement means of said first portion of said mount and secure said wear part to said mount against lift-off forces, and a second wear portion of said wear part positioned orthogonal or substantially orthogonal to said first wear portion and adapted to engage said second portion of said mount to secure the wear part to the mount against slide-off forces, said second portion of said wear part having one or more passages or recesses therein and arranged to at least partially align with respective ones of said one or more passages through said second portion of said mount when said wear part and said mount are in an engaged position; and wherein the one or more bolts are adapted to extend through said one or more passages in the second portion of said mount and said one or more passages in said second portion of said wear part to secure said wear part when in the engaged position to said mount against slide-off forces orthogonal or substantially orthogonal to lift-off forces.

2. A mount for a protection system, said mount including:

a first portion having a face adapted to rest against or engage a first face of a wear panel to be protected and a second portion extending from said first portion and adapted to engage an adjacent face of the wear panel orthogonal or substantially orthogonal to the first face, said second portion having an elongated passage therethrough, the elongated passage having a narrow portion and a larger portion contiguous with said narrow portion and configured to allow entry of a respective head of one or more bolts therethrough in one direction and subsequent sliding movement of each of the one or more bolts therealong in an orthogonal direction and to a selected predetermined position along the narrow portion of said elongated passage; and wherein the respective head of each one or more bolts is insertable into elongated passage and slides laterally along the elongated passage in the orthogonal direction to the respective selected predetermined position, the narrow portion being adapted to engage the head of the one or more bolts to retain the one or more bolts in the selected predetermined position.

3. A wear part for a protection system, the wear part including:

a first wear portion and a second wear portion extending from said first wear portion, said first wear portion being adapted to protect a first wear panel of equipment or machinery and said second wear portion being adapted to protect a second wear panel of the equipment or machinery adjacent and orthogonal or substantially orthogonal to the first wear panel, the first wear portion having a first mounting face adapted to engage a first face of a mount secured to the first wear panel to be protected, and said second wear portion including a second mounting face orthogonal or substantially orthogonal to the first mounting face of said first wear portion and adapted to engage a second face of said mount orthogonal or substantially orthogonal to said first face of said mount so as to rest against the second wear panel of the equipment to protect the second wear panel;

said first wear portion having two spaced apart side portions defining said first mounting face therebetween, wherein one or more fixed protuberances extend inwardly from each of said side portions towards the opposite side portion and are spaced apart and extend over a portion of said first mounting face, said one or more fixed protuberances being adapted to engage complementary fixed engagement means of the mount to which the wear part is to be fixed and configured, such that the wear part can slide onto the mount from one end to locate the wear part on the mount with the one or more fixed protuberances of the first wear portion engaging the complementary fixed engagement means of the mount to secure the wear part against lift-off forces; and said second wear portion having one or more passages extending therethrough, the one or more passages being adapted to receive respective bolts for securing the wear part to the mount against slide-off forces.

4. The protection system according to claim 1, wherein the one or more bolts are plow bolts, and wherein the predetermined position includes a recess shaped to engage the respective head of the one or more plow bolts against rotation.

5. The protection system according to claim 1, wherein the mount has one or more openings extending therethrough to provide suitable locations for welding the mount to the wear panel to be protected.

6. The protection system according to claim 5, wherein the one or more openings in said mount comprise at least one opening in the first portion and at least one opening in the second portion.

7. The protection system according to claim 1, wherein said fixed engagement means of said first portion of said mount includes one or more protuberances adapted to slidably engage with complementary protuberances of the wear part.

8. The protection system according to claim 7, wherein said one or more protuberances include a tapered portion or portions adapted to engage a complementary tapered recess or recesses on the complementary wear part, the tapered portion or portions and complementary tapered recess or recesses being arranged to force the wear part into closer face-to-face engagement with the mount to provide complementary engagement therebetween.

9. The protection system according to claim 8, wherein the complementary engagement between the wear part and mount includes the tapered portion or portions arranged to tighten the wear part onto the mount against lateral movement or twisting and/or pivoting movement as the wear part slides from a disengaged position to the engaged position.

10. The protection system according to claim 1, wherein the second portion of the wear part includes a recess adapted to receive therein at least part of the second portion of the mount to which the wear part is to be fixed when in the engaged position.

11. A method of fixing a wear part to a mount comprising:

providing a mount, a bolt and a nut, and a wear part according to claim 3;

said mount including a first portion having a face adapted to rest against or engage a first face of a wear panel to be protected and a second portion extending from said first portion and adapted to engage an adjacent face of the wear panel orthogonal or substantially orthogonal to the first face, said second portion having an elongated passage therethrough, the elongated passage having a narrow portion and a larger portion contiguous with said narrow portion and configured to allow entry of a respective head of one or more bolts therethrough in one direction and subsequent sliding movement of each of the one or more bolts therealong in an orthogonal direction and to a selected predetermined position along the narrow portion of said elongated passage; and wherein the respective head of each one or more bolts is insertable into elongated passage and slides laterally along the elongated passage in the orthogonal direction to the respective selected predetermined position, the narrow portion being adapted to engage the head of the one or more bolts to retain the one or more bolts in the selected predetermined position;

said bolt having a head and a shank extending from said head and including a thread adapted to receive said nut; and entering said bolt in said elongate passage and laterally sliding said bolt along said elongate passage to the predetermined position, fitting said wear part to said mount with the shank of said bolt extending through a bolt hole in said wear part and fitting the nut to the shank of said bolt.

12. The wear part for a protection system according to claim 3, wherein said second wear portion has a recess adapted to receive therein at least part of the mount to which the wear part is to be fixed when in an engaged position.

13. The protection system according to claim 1, wherein the wear part has at least one threaded jacking passage therein.

14. The protection system according to claim 1, wherein each of said one or more passages is adapted to receive two or more bolts therethrough and said protection system further includes a removable spacer between at least two adjacent bolts.

15. The protection system according to claim 14, wherein said removable spacer is configured to engage the respective heads of said at least two adjacent bolts to assist in preventing movement of said at least two adjacent bolts relative to said mount.

16. The protection system according to claim 14 wherein said removable spacer is configured to engage the respective heads and/or shanks of two adjacent bolts.

17. The protection system according to claim 14 wherein said removable spacer is configured to be retained in said one or more passages of the second portion of the mount by said wear part.

18. The protection system according to claim 4 wherein the mount has one or more openings extending therethrough to provide suitable locations for welding the mount to the wear panel to be protected.

* * * * *